US012670138B2

(12) United States Patent
Schilders

(10) Patent No.: US 12,670,138 B2
(45) Date of Patent: *Jun. 30, 2026

(54) IN-SITU MESSAGING HISTORY IN GRAPH-BASED MODELS

(71) Applicants: INFOSYS LIMITED, Bangalore (IN);
INVERTIT INC., Columbus, IN (US)

(72) Inventor: Steven Schilders, Columbus, IN (US)

(73) Assignees: Infosys Limited, Bangalore (IN);
InvertIT Inc., Columbus, IN (US)

( * ) Notice: Subject to any disclaimer, the term of this patent is extended or adjusted under 35 U.S.C. 154(b) by 7 days.

This patent is subject to a terminal disclaimer.

(21) Appl. No.: 18/589,406

(22) Filed: Feb. 27, 2024

(65) Prior Publication Data

US 2024/0289311 A1      Aug. 29, 2024

Related U.S. Application Data

(60) Provisional application No. 63/448,711, filed on Feb. 28, 2023, provisional application No. 63/448,724, filed on Feb. 28, 2023, provisional application No. 63/448,831, filed on Feb. 28, 2023, provisional application No. 63/448,738, filed on Feb. 28, 2023, provisional application No. 63/448,747, filed on Feb. 28, 2023.

(51) Int. Cl.
| | |
|---|---|
| *G06F 16/21* | (2019.01) |
| *G06F 16/28* | (2019.01) |
| *G06F 16/901* | (2019.01) |

(52) U.S. Cl.
CPC .......... *G06F 16/219* (2019.01); *G06F 16/288* (2019.01); *G06F 16/9024* (2019.01)

(58) Field of Classification Search
None
See application file for complete search history.

(56) References Cited

U.S. PATENT DOCUMENTS

| | | | | |
|---|---|---|---|---|
| 9,047,334 B1 * | 6/2015 | Cheriton | ............. | G06F 16/2365 |
| 11,599,514 B1 * | 3/2023 | Agrawal | ............. | G06F 16/2282 |
| 11,886,422 B1 * | 1/2024 | Li | ........................ | G06F 16/2379 |
| 2022/0237019 A1 * | 7/2022 | Berry | ........................ | G06F 9/54 |
| 2023/0055373 A1 * | 2/2023 | Vlachou-Konchylaki | .................. | |
| | | | | H04L 41/145 |

* cited by examiner

*Primary Examiner* — Richard L Bowen
(74) *Attorney, Agent, or Firm* — Finnegan, Henderson, Farabow, Garrett & Dunner, LLP

(57) ABSTRACT

An overlay system is provided that includes processing circuitry and a storage element that stores an executable graph-based model including various active nodes, various history message nodes, and various history overlay nodes. Each active node is associated with one or more history overlay nodes that facilitate the creation and maintenance of one or more history message nodes associated therewith. The processing circuitry receives a contextualized stimulus and identifies an active node and one or more history message nodes in the executable graph-based model based on the context. The processing circuitry creates one or more history nodes (e.g., one or more historical versions of the corresponding active node) based on the one or more history message nodes. Further, the processing circuitry executes an operation associated with the stimulus based on the identified active node, the one or more history overlay nodes, and the created one or more history nodes.

20 Claims, 19 Drawing Sheets

400

600A

Subscribe

Executable graph-based model 100 at T1

Executable graph-based model 100 at T7

600G

Executable graph-based model 100 at T8

600H

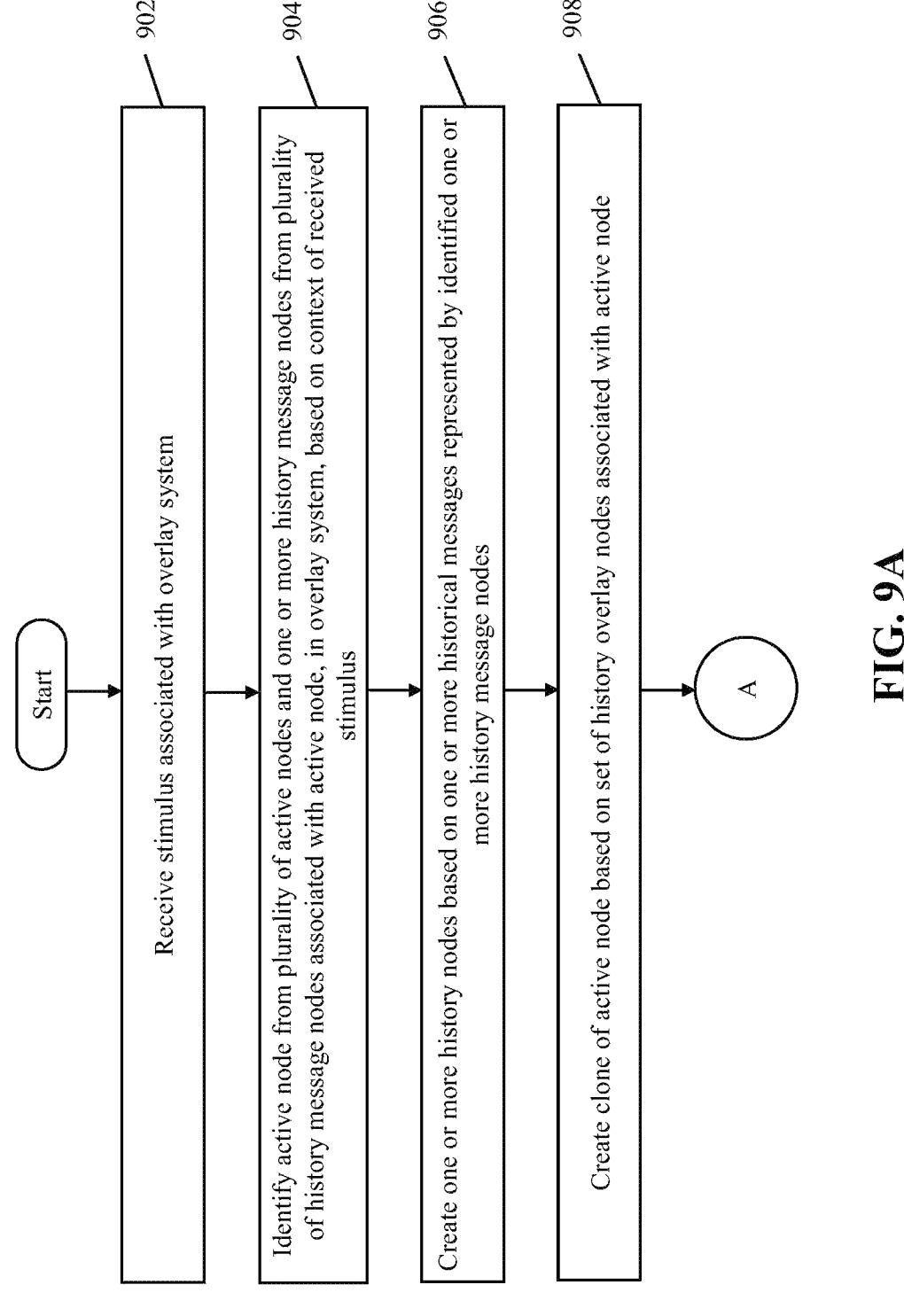

900

902 — Receive stimulus associated with overlay system

904 — Identify active node from plurality of active nodes and one or more history message nodes from plurality of history message nodes associated with active node, in overlay system, based on context of received stimulus 906 — Create one or more history nodes based on one or more historical messages represented by identified one or more history message nodes 908 — Create clone of active node based on set of history overlay nodes associated with active node Start

IN-SITU MESSAGING HISTORY IN GRAPH-BASED MODELS

CROSS-REFERENCE TO RELATED APPLICATIONS/INCORPORATION BY REFERENCE

This patent application refers to, claims priority to, and claims the benefit of U.S. Provisional Application Ser. No. 63/448,738, filed Feb. 28, 2023; 63/448,724 filed Feb. 28, 2023; 63/448,831, filed Feb. 28, 2023; 63/448,711, filed Feb. 28, 2023; 63/448,747, filed Feb. 28, 2023; and 63/449,224, filed Mar. 1, 2023. Each of the above-referenced applications is hereby incorporated herein by reference in its entirety.

FIELD OF THE DISCLOSURE

Various embodiments of the present disclosure relate generally to graph-based models. More specifically, various embodiments of the present disclosure relate to in-situ messaging history in graph-based models.

BACKGROUND

In domains such as robotics, artificial intelligence, machine learning, or the like, storing system data in storage elements and utilization of the stored data for performing various domain operations is crucial. The stored data, once utilized, undergoes modification and a new version of the data is generated. Consequently, a previous version of the data (e.g., historical data) is not available in the system. The historical data is crucial for various operations (such as trend analysis, predictive analysis, auditing, automating a task, detecting long-term anomalies, or the like). Traditionally, to ensure the availability of historical data, the historical data is stored in an external storage element. As the historical data is stored externally, retrieval of the historical data incurs delays which are undesirable during time-critical operations.

In light of the foregoing, there exists a need for a technical and reliable solution that overcomes the abovementioned problems.

Limitations and disadvantages of conventional and traditional approaches will become apparent to one of skill in the art, through the comparison of described systems with some aspects of the present disclosure, as set forth in the remainder of the present application and with reference to the drawings.

SUMMARY

Methods and systems for facilitating in-situ messaging history using executable graph-based models are provided substantially as shown in, and described in connection with, at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

FIGS. 9A and 9B, collectively, represents a flowchart that illustrates a method for facilitating in-situ messaging history using the executable graph-based model of FIG. 1, in accordance with an embodiment of the present disclosure.

DETAILED DESCRIPTION

Figure 1:
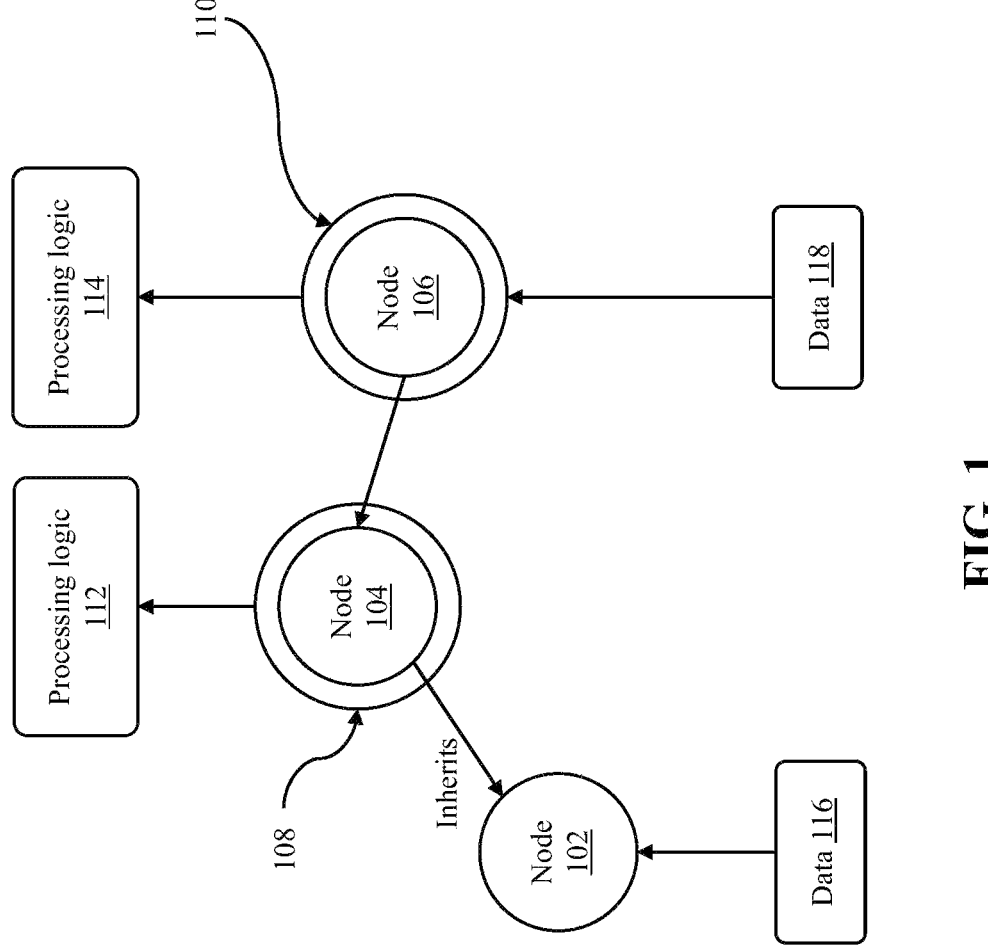
FIG. 1 is a graph that illustrates a composition of an executable graph-based model, in accordance with an embodiment of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview

Storing of system data and manipulation of the stored data is crucial for various operations associated with applications such as healthcare, finance, warehouse, or the like. Conventionally, to ensure the availability of previous versions of the data (e.g., historical data), the historical data is stored in a storage element that is external to the system. The system retrieves the historical data from the external storage element for various operations such as trend analysis, predictive analysis, auditing, automating a task, detecting long-term anomalies, or the like. However, storing the historical data externally leads to increased latency while retrieving the historical data for real-time processing. The increased latency may lead to undesirable outcomes during real-time operations.

The present disclosure is directed to the facilitation of in-situ messaging history in executable graph-based models. The executable graph-based models are stored in a storage element of an overlay system. The executable graph-based models are customized hypergraphs having hyper-edges and vertices that are realized by way of active nodes. Each active node is associated with a particular node type. For example, an edge node corresponds to a data node with an edge node type. Nodes (for example, active nodes) are connected with other nodes by way of edge nodes (e.g., roles included in the edge nodes). In some embodiments, roles are represented by way of nodes of a role node type. A role node between two nodes may be indicative of details regarding an association therebetween. The executable graph-based model also includes a plurality of overlay nodes. Each overlay node is associated with one or more nodes (for example, a vertex node, an edge node, or the like) of the executable graph-based model and includes a corresponding processing logic that when executed implements a functionality associated therewith on the associated nodes.

In order to facilitate in-situ messaging history, an active node whose history is to be logged in the executable graph-based model may be associated with various history message nodes and various history overlay nodes. Each history message node represents a historical message that contains information associated with the creation of a history node (e.g., a historical version) of the associated active node. Further, each history overlay node includes processing logic for facilitating the creation and maintenance of history message nodes associated with the active node. As the history nodes can be created in the executable graph-based models based on the history message nodes present therein, in-situ messaging history is facilitated in the executable graph-based models. As a result, an operation, associated with the overlay system, that requires the historical versions of various active nodes is executed in significantly less time. Additionally, the storage of history message nodes in the executable graph-based model instead of directly storing the history nodes, results in efficient resource utilization as the history message nodes take up less memory space in comparison to history nodes.

In an example, the executable graph-based model may include an active node, various history message nodes associated with the active node, and a history overlay node that is an overlay of the active node. Each history message node associated with the active node includes a historical message that indicates data and transactional information that is required for the creation of one or more history nodes associated with the active node. Thus, various history nodes that correspond to various historical versions of the active node can be created using the various history message nodes associated with the active node. In operation, processing circuitry of the overlay system may receive a stimulus that indicates an operation based on the active node and one or more history nodes associated therewith. In such a scenario, the processing circuitry identifies the active node and one or more history message nodes, in the executable graph-based model, based on a context of the stimulus. Further, the processing circuitry creates the one or more history nodes in the executable graph-based model based on the identified one or more history message nodes. The processing circuitry then executes an operation associated with the stimulus based on the active node and the one or more history nodes.

Traditional approach of maintaining historical versions of active nodes involves storing the historical versions in an external storage element and fetching the historical versions from the external storage element to execute an operation. Fetching of the historical versions from the external storage element results in increased latency during the execution of the operation. In contrast, the present disclosure provides in-situ messaging history in the overlay system that avoids the fetching of the historical versions from the external storage element, thus significantly reducing the latency during the execution of the operation.

Systems and methods for facilitating in-situ messaging history in the executable graph-based models are provided. The systems and methods disclosed herein facilitate the creation and maintenance of historical data at the node level that allows the required historical data to be retrieved from within the executable graph-based models. Hence, the disclosed systems and methods provide an approach for the retrieval of historical data using the executable graph-based models that exhibit significantly reduced latency during such retrieval. As a result, the time complexity associated with the historical data retrieval is also reduced. The reduction in time complexity associated with the historical data retrieval is beneficial in applications such as healthcare, robotics, and finance that involve time-critical operations based on the historical data retrieval. Further, the disclosed systems and methods do not require the data and processing logic to be available at all times, and hence, the data and processing logic when not in use may be stored separately and re-loaded in the corresponding executable node when needed. Additionally, instead of storing the history nodes, history message nodes that can be utilized to create history nodes are stored in the executable graph-based models. As a result, resource available in the overlay system is efficiently utilized. Thus, the systems and methods disclosed herein provide an efficient approach for in-situ messaging history in the executable graph-based models in a secured and seamless manner.

FIGURE DESCRIPTION

FIG. 1 is a graph that illustrates a composition of an executable graph-based model 100, in accordance with an embodiment of the present disclosure. Referring to FIG. 1, the executable graph-based model 100 is generally formed of a data structure (e.g., a graph-based model or a graphical model) comprising a plurality of nodes 102-106 which can be functionally extended with processing logic via the use of overlays. For example, as shown in FIG. 1, the nodes 104 and 106 are functionally extended with processing logic via the use of overlays 108 and 110, respectively. Although not shown, it will be apparent to a person skilled in the art that the node 102 can be similarly extended with processing logic via the use of one or more overlays. Each overlay includes processing logic, such as processing logic 112 and 114 which are associated with the overlays 108 and 110, respectively. At run-time, data, such as data 116 and 118, is associated with the nodes 102 and 106, respectively, of the executable graph-based model 100. Further, the overlays 108 and 110 of the nodes 104 and 106, respectively, provide the functionality to respond to stimuli and interact with, manipulate, or otherwise process the data for creation of message history, maintenance of the message history, and utilization of the message history based on the stimuli. Further, the node 104 inherits the node 102, and hence, also inherits the data 116 which is associated with the node 102. In some embodiments, the node 102 may be extended to have one or more overlays. In such embodiments, the node 104 may further inherit the overlays of the node 102.

Each element within the executable graph-based model 100 (both the data and the processing functionality) is a node. A node forms the fundamental building block of all executable graph-based models. A node may be an executable node. A node extended by way of an overlay node forms an executable node. One or more nodes are extended to include overlays in order to form the executable graph-based models. As such, the executable graph-based model 100 includes one or more nodes that can be dynamically generated, extended, or processed by one or more other modules within an overlay system (shown in FIG. 2).

As such, the structure and functionality of the data processing are separate from the data itself when offline (or at rest) and are combined dynamically at run-time. The executable graph-based model 100 thus maintains the separability of the data and the processing logic when offline. Moreover, by integrating the data and the processing logic within a single model, processing delays or latencies are reduced because the data and the processing logic exist within the same logical system. Therefore, the executable graph-based model 100 is applicable to a range of time-critical systems where efficient processing of the stimuli is required. In an instance, the executable graph-based model 100 may be used for in-situ processing of stimuli such as a command, a query, or the like.

Figure 2:
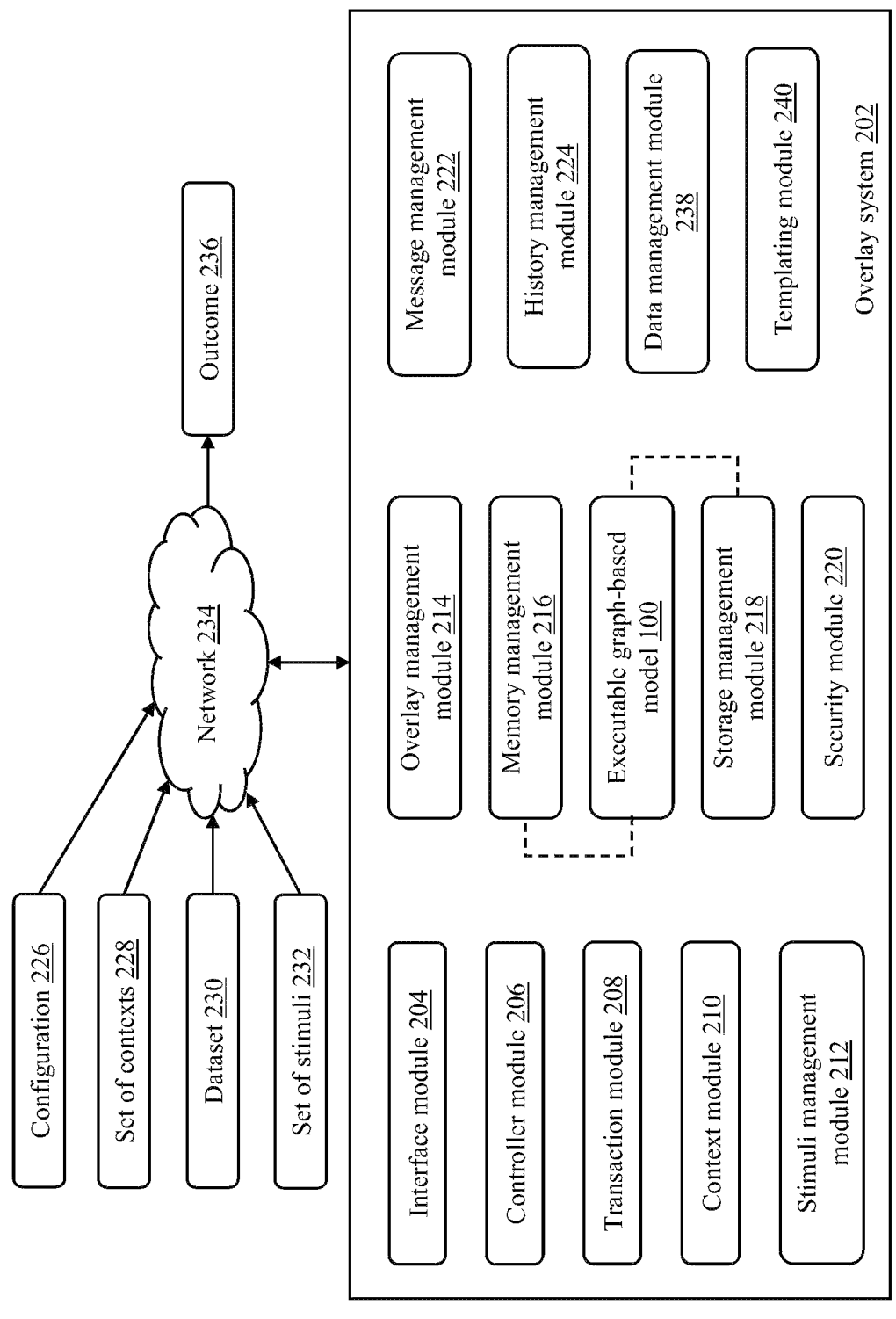
FIG. 2 is a block diagram that illustrates a system environment of an overlay system for execution, management, and configuration of the executable graph-based model of FIG. 1, in accordance with an embodiment of the present disclosure.

FIG. 2 is a block diagram that illustrates a system environment 200 of an overlay system 202 for execution, management, and configuration of the executable graph-based model 100, in accordance with an embodiment of the present disclosure. Referring to FIG. 2, the overlay system 202 includes the executable graph-based model 100. The overlay system 202 further includes an interface module 204, a controller module 206, a transaction module 208, a context module 210, a stimuli management module 212, an overlay management module 214, a memory management module 216, a storage management module 218, a security module 220, a message management module 222, and a history management module 224. FIG. 2 further shows a configuration 226, a set of contexts 228, a dataset 230, a set of stimuli 232, a network 234, and an outcome 236.

The overlay system 202 may include suitable logic, circuitry, interfaces, and/or code, executable by the circuitry, that may be configured to facilitate in-situ messaging history in executable graph-based models (such as the executable graph-based model 100). The executable graph-based model 100 corresponds to an application-specific combination of data and processing functionality which is manipulated, processed, and/or otherwise handled by other modules within the overlay system 202 for the creation, maintenance, and utilization (e.g., processing) of messaging history therein based on the set of stimuli 232 received by the overlay system 202. Each stimulus in the set of stimuli 232 corresponds to a command or a query.

The interface module 204 may include suitable logic, circuitry, interfaces, and/or code, executable by the circuitry, configured to provide a common interface between internal modules of the overlay system 202 and/or external sources. The interface module 204 provides an application programmable interface (API), scripting interface, or any other suitable mechanism for interfacing externally or internally with any module of the overlay system 202. As shown in FIG. 1, the configuration 226, the set of contexts 228, the dataset 230, and the set of stimuli 232 are received by the interface module 204 via the network 234. Similarly, outputs produced by the overlay system 202, such as the outcome 236, are passed by the interface module 204 to the network 234 for consumption or processing by external systems. In one embodiment, the interface module 204 supports one or more messaging patterns or protocols such as the simple object access protocol (SOAP), the representational state transfer (REST) protocol, or the like. The interface module 204 thus allows the overlay system 202 to be deployed in any number of application areas, operational environments, or architecture deployments. Although not illustrated in FIG. 1, the interface module 204 is communicatively coupled (e.g., connected either directly or indirectly) to one or more other modules or elements within the overlay system 202 (such as the controller module 206, the context module 210, the executable graph-based model 100, or the like). In one embodiment, the interface module 204 is communicatively coupled (e.g., connected either directly or indirectly) to one or more overlays within the executable graph-based model 100.

The controller module 206 may include suitable logic, circuitry, interfaces, and/or code, executable by the circuitry, configured to handle and process interactions and executions within the overlay system 202. As will be described in more detail below, stimuli (such as the set of stimuli 232) and their associated contexts (such as the set of contexts 228) provide the basis for all interactions within the executable graph-based model 100. Processing of such stimuli may lead to the execution of processing logic associated with one or more overlays within the executable graph-based model 100. The processing of the stimuli within the overlay system 202 may be referred to as a system transaction. The processing and execution of stimuli (and associated overlay execution) within the overlay system 202 is handled by the controller module 206. The controller module 206 manages all received input stimuli and processes them based on a corresponding context. Each context determines the priority that is assigned to process the corresponding stimulus by the controller module 206 or the context module 210. This allows each stimulus to be configured with a level of importance and prioritization within the overlay system 202.

The controller module 206 may maintain the integrity of the modules within the overlay system 202 before, during, and after a system transaction. The transaction module 208, which is associated with the controller module 206, is responsible for maintaining the integrity of the overlay system 202 through the lifecycle of a transaction. Maintaining system integrity via the controller module 206 and the transaction module 208 allows a transaction to be rolled back in the event of an expected or unexpected software or hardware fault or failure. The controller module 206 is configured to handle the processing of the set of stimuli 232 and transactions through architectures such as parallel processing, grid computing, priority queue techniques, or the like. In one embodiment, the controller module 206 and the transaction module 208 are communicatively coupled (e.g., connected either directly or indirectly) to one or more overlays within the executable graph-based model 100.

As stated briefly above, the overlay system 202 utilizes a context-driven architecture whereby the set of stimuli 232 within the overlay system 202 is associated with the set of contexts 228 which is used to adapt the handling or processing of the set of stimuli 232 by the overlay system 202. The handling or processing of the set of stimuli 232 is done based on the set of contexts 228 associated therewith. Hence, each stimulus of the set of stimuli 232 is considered to be a contextualized stimulus. The set of contexts 228 may include details such as username, password, access token, device information, time stamp, one or more relevant identifiers (IDs), or the like, that are required for processing of the set of stimuli 232 within the executable graph-based model 100. Each context within the overlay system 202 may be extended to include additional information that is required for the processing of the corresponding stimulus (e.g., a query or a command).

The context module 210 may include suitable logic, circuitry, interfaces, and/or code, executable by the circuitry, configured to manage the handling of contexts within the overlay system 202, and is responsible for processing any received contexts (e.g., the set of contexts 228) and translating the received context to an operation execution context. In some examples, the operation execution context is larger than the received context because the context module 210 supplements the received context with further information necessary for the processing of the received context. The context module 210 passes the operational execution context to one or more other modules within the overlay system 202 to facilitate the creation, maintenance, and utilization of in-situ messaging history in the executable graph-based model 100. Contexts within the overlay system 202 can be external or internal. While some contexts apply to all application areas and problem spaces, some applications may require specific contexts to be generated and used to process the received set of stimuli 232. As will be described in more detail below, the executable graph-based model 100 is configurable (e.g., via the configuration 226) so as only to execute within a given execution context for a given stimulus.

The stimuli management module 212 may include suitable logic, circuitry, interfaces, and/or code, executable by the circuitry, configured to process externally received stimuli (e.g., the set of stimuli 232) and any stimuli generated internally from any module within the overlay system 202. The stimuli management module 212 is communicatively coupled (e.g., connected either directly or indirectly) to one or more overlays within the executable graph-based model 100 to facilitate the processing of stimuli within the executable graph-based model 100. The overlay system 202 utilizes different types of stimuli such as a command (e.g., a transactional request), a query, or an event received from an external system such as an Internet-of-Things (IoT) device. As previously stated, each stimulus of the set of stimuli 232 can be either externally or internally generated. In an example, each stimulus of the set of stimuli 232 may be a message that is internally triggered (e.g., generated) from any of the modules within the overlay system 202. Such internal creation of the set of stimuli 232 indicates that something has happened within the overlay system 202 such that subsequent handling by one or more other modules within the overlay system 202 may be required. An internal set of stimuli 232 can also be triggered (generated) from the execution of processing logic associated with overlays within the executable graph-based model 100. In another example, the set of stimuli 232 may be externally triggered and may be generated based on an input received via a user interface associated with the controller module 206. The externally triggered set of stimuli 232 may be received in the form of a textual, audio, or visual input. The externally triggered set of stimuli 232 may be associated with the intent of a user to execute a set of operations indicated by the set of stimuli 232. The operation is executed in accordance with the information included in the set of contexts 228 associated with the set of stimuli 232.

The stimuli management module 212 may receive the stimuli in real-time or near-real-time and communicate the received set of stimuli 232 to one or more other modules or nodes of the executable graph-based model 100. In some examples, the stimuli are scheduled in a batch process. The stimuli management module 212 utilizes any suitable synchronous or asynchronous communication architectures or approaches in communicating the stimuli (along with associated information). The stimuli within the overlay system 202 are received and processed (along with a corresponding context) by the stimuli management module 212, which then determines the processing steps to be performed for the execution of operations associated with each stimulus of the set of stimuli 232. In one embodiment, the stimuli management module 212 processes the received stimuli in accordance with a predetermined configuration (e.g., the configuration 226) or dynamically determines what processing needs to be performed based on the contexts associated with the stimuli and/or based on a state of the executable graph-based model 100. The state of the executable graph-based model 100 refers to the current state of each node of the executable graph-based model 100 at a given point in time. The state of the executable graph-based model 100 is dynamic, and hence, may change in response to the execution of an operation based on any of its nodes. In some examples, the processing of each stimulus of the set of stimuli 232 results in the creation, maintenance, or utilization of history that further results in one or more outcomes being generated (e.g., the outcome 236). Such outcomes are either handled internally by one or more modules in the overlay system 202 or communicated via the interface module 204 as an external outcome. In one embodiment, all stimuli and corresponding outcomes are recorded for auditing and post-processing purposes by, for example, an operations module (not shown) and/or an analytics module (not shown) of the overlay system 202.

The overlay management module 214 may include suitable logic, circuitry, interfaces, and/or code, executable by the circuitry, configured to manage all overlays within the overlay system 202. Operations performed by the overlay management module 214 include overlay storage management, overlay structure modeling, overlay logic creation and execution, and overlay loading and unloading (within the executable graph-based model 100). The overlay management module 214 is communicatively coupled (e.g., connected either directly or indirectly) to one or more other modules within the overlay system 202 to complete some or all of these operations. For example, overlays can be persisted in some form of physical storage using the storage management module 218 (as described in more detail below). As a further example, overlays can be compiled and preloaded into memory via the memory management module 216 for faster run-time execution.

The memory management module 216 may include suitable logic, circuitry, interfaces, and/or code, executable by the circuitry, configured to manage and optimize the memory usage of the overlay system 202. The memory management module 216 thus helps to improve the responsiveness and efficiency of the processing performed by one or more modules within the overlay system 202 by optimizing the memory handling performed by these modules. The memory management module 216 uses direct memory or some form of distributed memory management architecture (e.g., a local or remote caching solution). Additionally, or alternatively, the memory management module 216 deploys multiple different types of memory management architectures and solutions (e.g., reactive caching approaches such as lazy loading or a proactive approach such as write-through cache may be employed). These architectures and solutions are deployed in the form of a flat (single-tiered)

cache or a multi-tiered caching architecture where each layer of the caching architecture can be implemented using a different caching technology or architecture solution approach. In such implementations, each cache or caching tier can be configured (e.g., by the configuration 226) independently of the requirements for one or more modules of the overlay system 202. For example, data priority and an eviction strategy, such as least-frequently-used (LFU) or least-recently-used (LRU), can be configured for all or parts of the executable graph-based model 100. In one embodiment, the memory management module 216 is communicatively coupled (e.g., connected either directly or indirectly) to one or more overlays within the executable graph-based model 100.

The storage management module 218 may include suitable logic, circuitry, interfaces, and/or code, executable by the circuitry, configured to manage the temporary or permanent storage of data associated with messages being communicated within the overlay system 202. The storage management module 218 is any suitable low-level storage device solution (such as a file system) or any suitable high-level storage technology such as another database technology (e.g., a relational database management system (RDBMS) or a NoSQL database). The storage management module 218 is directly connected to the storage device upon which the relevant data is persistently stored. For example, the storage management module 218 can directly address the computer-readable medium (e.g., hard disk drive, external disk drive, or the like) upon which the data is being read or written. Alternatively, the storage management module 218 is connected to the storage device via a network, such as the network 234. As will be described in more detail later in the present disclosure, the storage management module 218 uses 'manifests' to manage the interactions between storage device and the modules within the overlay system 202. In one embodiment, the storage management module 218 is communicatively coupled (e.g., connected either directly or indirectly) to one or more overlays within the executable graph-based model 100.

As described, storage, loading, and unloading of the executable graph-based model 100 or one or more components thereof may be facilitated by the memory management module 216 and the storage management module 218. The memory management module 216 and the storage management module 218 may facilitate such operations by interacting with the storage device. In the present disclosure, the executable graph-based model 100 may be stored in a storage element. The storage element corresponds to a combination of the memory management module 216 and the storage management module 218 that may be configured to store the executable graph-based model 100. In some embodiments, the storage element may be a storage module that is managed by the memory management module 216 and the storage management module 218, collectively.

The security module 220 may include suitable logic, circuitry, interfaces, and/or code, executable by the circuitry, configured to manage the security of the overlay system 202. This includes security at a system level and a module level. Security is hardware-related, network-related, or software-related, depending on the operational environment, the architecture of the deployment, or the data and information contained within the overlay system 202. For example, if the system is deployed with a web-accessible API (as described above in relation to the interface module 204), the security module 220 can enforce a hypertext transfer protocol secure (HTTPS) protocol with the necessary certification. As a further example, if the data or information associated with the message received or processed by the overlay system 202 contains Personally Identifiable Information (PII) or Protected Health Information (PHI), the security module 220 can implement one or more layers of data protection to ensure that the PII or PHI is correctly processed and stored. In an additional example, in implementations where the overlay system 202 operates on United States of America citizen medical data, the security module 220 may enforce additional protections or policies as defined by the United States Health Insurance Portability and Accountability Act (HIPAA). Similarly, if the overlay system 202 is deployed in the European Union (EU), the security module 220 may enforce additional protections or policies to ensure that the data processed and maintained by the overlay system 202 complies with the General Data Protection Regulation (GDPR). In one embodiment, the security module 220 is communicatively coupled (e.g., connected either directly or indirectly) to one or more overlays within the executable graph-based model 100 thereby directly connecting security execution to the data/information in the executable graph-based model 100.

The message management module 222 may include suitable logic, circuitry, interfaces, and/or code, executable by the circuitry, configured to manage all data or information associated with messages communicated within the overlay system 202 (e.g., the dataset 230) for a given communication network implemented by way of the executable graph-based model 100. Operations performed by the message management module 222 include data loading, data unloading, data modeling, and data processing operations associated with the creation and communication of messages within the overlay system 202. The message management module 222 is communicatively coupled (e.g., connected either directly or indirectly) to one or more other modules within the overlay system 202 to complete some or all of these operations. For example, the storage of data or information associated with messages is handled in conjunction with the storage management module 218.

The history management module 224 may include suitable logic, circuitry, interfaces, and/or code, executable by the circuitry, configured to manage all data and information associated with the creation, maintenance, and utilization of the in-situ messaging history within the overlay system 202. Operations performed by the history management module 224 may include the creation, maintenance, and utilization of the history in the form of history message nodes. In an example, the history refers to one or more historical versions of the plurality of nodes 102-106. One or more history message nodes are created such that each history message node includes data and transactional information required for the creation of a corresponding historical version of the one or more historical versions based on one or more stimuli (such as the set of stimuli 232). The history management module 224 is communicatively coupled (e.g., connected either directly or indirectly) to one or more other modules within the overlay system 202 to complete some or all of these operations. The history management module 224 is further communicatively coupled (i.e., connected either directly or indirectly) to one or more nodes and/or one or more overlays within the executable graph-based model 100.

In addition to the abovementioned components, the overlay system 202 further includes a data management module 238. The data management module 238 may include suitable logic, circuitry, interfaces, and/or code, executable by the circuitry, configured to manage all data or information (e.g., the dataset 230) within the overlay system 202 for a given application. Operations performed by the data management module 238 include data loading, data unloading, data modeling, and data processing. The data management module 238 is communicatively coupled (e.g., connected either directly or indirectly) to one or more other modules within the overlay system 202 to complete some or all of these operations. For example, data storage is handled by the data management module 238 in conjunction with the storage management module 218.

In one embodiment of the present disclosure, the overlay system 202 may further include a templating module 240. The templating module 240 may include suitable logic, circuitry, interfaces, and/or code, executable by the circuitry, configured to implement a templated version of the executable graph-based model 100. The templating module 240 may be further configured to generate specific instances of nodes from predefined templates for the implementation of the templated version of the executable graph-based model 100. In other words, the templating module 240 ensures ontology integrity by enforcing the structure and rules of a template when generating instances of the template at run-time. The templating module 240 is communicatively coupled (i.e., connected either directly or indirectly) to one or more nodes and/or one or more overlays within the templated version of the executable graph-based model 100. For the sake of brevity, the present invention is described with reference to the templated version of the executable graph-based model 100.

In some embodiments, all the modules of the overlay system 202 except for the executable graph-based model 100 may collectively form processing circuitry that executes operations associated with the creation, maintenance, and utilization of in-situ messaging history within the overlay system 202.

The functionality of two or more of the modules included in the overlay system 202 may be combined within a single module. Conversely, the functionality of a single module can be split into two or more further modules which can be executed on two or more devices. The modules described above in relation to the overlay system 202 can operate in a parallel, distributed, or networked fashion. The overlay system 202 may be implemented in software, hardware, or a combination of both software and hardware. Examples of suitable hardware modules include a general-purpose processor, a field programmable gate array (FPGA), and/or an application-specific integrated circuit (ASIC). Software modules can be expressed in a variety of software languages such as C, C++, Java, Ruby, Visual Basic, Python, and/or other object-oriented, procedural, or programming languages.

It will be apparent to a person skilled in the art that whilst only one executable graph-based model 100 is shown in FIG. 2, in other embodiments the overlay system 202 stores and maintains more than one executable graph-based model, without deviating from the scope of the present disclosure. In such embodiments, the creation, maintenance, and utilization of in-situ messaging history in each executable graph-based model is in a manner that is similar to that in the executable graph-based model 100.

Having described the overlay system 202 for executing and managing executable graph-based models, the description will now turn to the elements of an executable graph-based model; specifically, the concept of a node. Unlike conventional graph-based systems, all elements (e.g., data, overlays, etc.) within the executable graph-based model (e.g., the executable graph-based model 100) are implemented as nodes. As will become clear, this allows executable graph-based models to be flexible, extensible, and highly configurable.

Figure 3A:
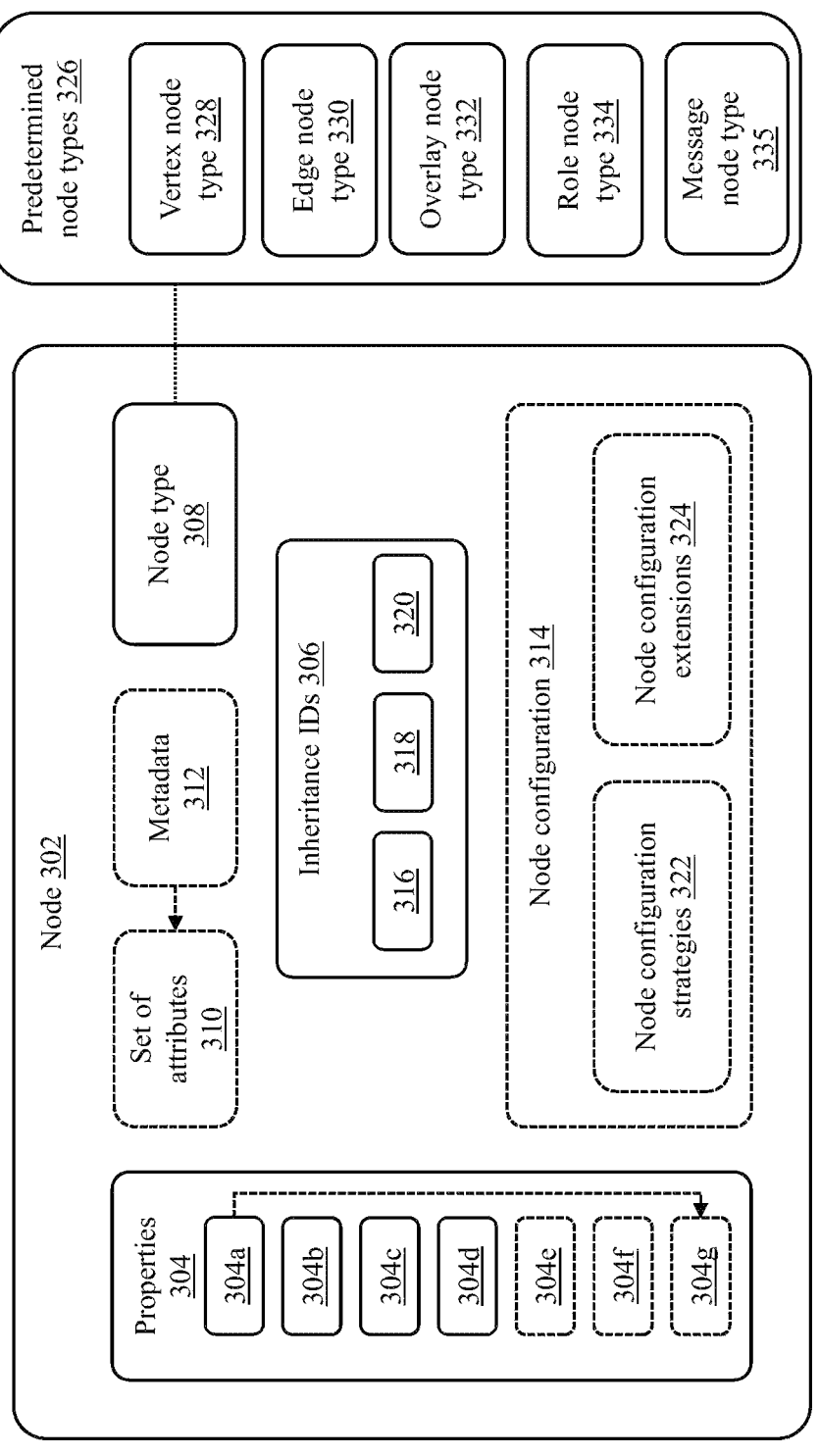
FIG. 3A is a block diagram that illustrates a generic structure of a node within the executable graph-based model of FIG. 1, in accordance with an embodiment of the present disclosure.

FIG. 3A is a block diagram 300A that illustrates a generic structure of a node 302 within the executable graph-based model 100, in accordance with an embodiment of the present disclosure. Referring to FIG. 3A, the node 302 corresponds to the core structure of the executable graph-based model 100 and forms the foundational building block for all data and processing logic within the executable graph-based model 100. The node 302 includes properties 304, inheritance IDs 306, and a node type 308. The node 302 optionally includes a set of attributes 310, metadata 312 associated with the attributes 310, and a node configuration 314.

The properties 304 of the node 302 include a unique identifier (ID) 304a, a version ID 304b, a namespace 304c, and a name 304d. The properties 304 optionally include a set of icons 304e, a set of labels 304f, and one or more alternative IDs 304g. The inheritance IDs 306 of the node 302 include an abstract flag 316, a leaf flag 318, and a root flag 320. The node configuration 314 optionally includes one or more node configuration strategies 322 and one or more node configuration extensions 324.

The unique ID 304a is unique for each node within the executable graph-based model 100. The unique ID 304a is used to register, manage, and reference the node 302 within the system (e.g., the overlay system 202). In some embodiments, the one or more alternative IDs 304g are associated with the unique ID 304a to help manage communications and connections with external systems (e.g., during configuration, sending stimuli, or receiving outcomes). The version ID 304b of the node 302 is incremented when the node 302 undergoes transactional change. This allows the historical changes between versions of the node 302 to be tracked by modules or overlays within the overlay system 202. The namespace 304c of the node 302, along with the name 304d of the node 302, is used to help organize nodes within the executable graph-based model 100. That is, the node 302 is assigned a unique name 304d within the namespace 304c such that the name 304d of the node 302 need not be unique within the entire executable graph-based model 100, only within the context of the namespace 304c to which the node 302 is assigned. The node 302 optionally includes one or more icons 304e which are used to provide a visual representation of the node 302 when visualized via a user interface. The one or more icons 304e can include icons at different resolutions and display contexts such that the visualization of the node 302 is adapted to different display settings and contexts. The node 302 also optionally includes one or more labels 304f which are used to override the name 304d when the node 302 is rendered or visualized.

The node 302 supports the concept of inheritance of data and processing logic associated with any other node of the executable graph-based model 100 that is inherited by the node 302. This allows the behavior and functionality of the node 302 to be extended or derived from the inherited node of the executable graph-based model 100. The inheritance IDs 306 of the node 302 indicate the inheritance-based information, which may be applicable to the node 302. The inheritance IDs 306 comprise a set of Boolean flags which identify the inheritance structure of the node 302. The abstract flag 316 allows the node 302 to support the construct of abstraction. When the abstract flag 316 takes a value 'true', the node 302 is flagged as abstract that is to say that it cannot be instantiated or created within an executable graph-based model (e.g., the executable graph-based model 100). Thus, in an instance when the node 302 has the abstract flag 316 set to 'true', the node 302 may only form the foundation of other nodes that inherit therefrom. By default, the abstract flag 316 of the node 302 is set to 'false'. The leaf flag 318 is used to indicate whether any other node may inherit from the node 302. If the leaf flag 318 is set to 'true', then no other node may inherit from the node 302 (but unlike an abstract node, a node with the leaf flag 318 set may be instantiated and created within the executable graph-based model 100). The root flag 320 is used to indicate whether the node 302 inherits from any other node. If the root flag 320 is set to 'true', the node 302 does not inherit from any other node. The node 302 is flagged as leaf (e.g., the leaf flag 318 is set to 'true') and/or root (e.g., the root flag 320 is set to 'true'), or neither (e.g., both the leaf flag 318 and the root flag 320 are set to 'false'). It will be apparent to a person skilled in the art that a node cannot be flagged as both abstract and leaf (e.g., the abstract flag 316 cannot be set to 'true' whilst the leaf flag 318 is set to 'true').

As stated above, all elements of the executable graph-based model 100 are defined as nodes. This functionality is in part realized due to the use of a node type. The node type 308 of the node 302 is used to extend the functionality of the node 302. All nodes within the executable graph-based model 100 comprise a node type that defines additional data structures and implements additional executable functionality. A node type thus includes data structures and functionality that are common across all nodes that share that node type. The composition of a node with a node type therefore improves extensibility by allowing the creation of specialized node functionalities for specific application areas. Such extensibility is not present in prior art graph-based models. As illustrated in FIG. 3A, the node 302 and the node type 308 are one logical unit that is not separated in the context of an executing system at run-time (e.g., in the context of execution of an executable graph-based model).

FIG. 3A further shows the plurality of predetermined node types 326 which provides a non-exhaustive list of node types for the node type 308 associated with the node 302. The plurality of predetermined node types 326 include a vertex node type 328 and an edge node type 330. The vertex node type 328 (also referred to as a data node type or a value node type) includes common data structures and functionality related to the 'things' modeled in the graph (e.g., the data). The edge node type 330 includes common data structures and functionality related to joining two or more nodes. A node having the edge node type 330 may connect two or more nodes and thus the edge node type 330 constructs associations and connections between nodes (for example, objects or 'things') within the executable graph-based model 100. The edge node type 330 is not restricted to the number of nodes that can be associated or connected by a node having the edge node type 330. The data structures and functionality of the edge node type 330 thus define a hyper-edge which allows two or more nodes to be connected through a defined set of roles. A role defines a connective relationship between two or more nodes, and hence, allows an edge node to connect two or more nodes such that the two or more nodes may have more than one relationship therebetween.

The plurality of predetermined node types 326 further includes an overlay node type 332. As will be described in more detail below, a node with the overlay node type 332 is used to extend the functionality of a node, such as the node 302, to incorporate processing logic. Unlike non-overlay nodes, an overlay node includes processing logic which determines the functionality of the overlay node. The processing logic of an overlay node includes a block of executable code, or instructions, which carries out one or more operations associated with the in-situ data processing in the overlay system 202. The block of executable code is pre-compiled code, code that requires interpretation at run-time, or a combination of both. Different overlay nodes provide different processing logic to realize different functionality.

The plurality of predetermined node types 326 further includes a role node type 334. The role node type 334 defines a connective relationship between two nodes, for example, an edge node and a first vertex node. A node with the role node type 334 defines a relationship without expressly defining the first vertex node to which the edge node connects. A number of roles (and thus a number of connections) that an edge node type can have is not limited.

The overlay system 202 may have a plurality of messages associated therewith. A node with a message node type 335 represents a message of the plurality of messages associated with the overlay system 202. The processing circuitry (e.g., the controller module 206, in conjunction with the message management module 222) may be configured to generate the executable graph-based model 100 based on the plurality of messages. Specifically, the processing circuitry (e.g., the controller module 206, in conjunction with the message management module 222) may instantiate a message node for each message associated with the overlay system 202 to create the executable graph-based model 100. Each node with the message node type 335 is associated with one or more nodes with the vertex node type 328 that store a composition thereof. The composition of a message node refers to data and transactional information (for example, a message identifier, a source identifier, a message type, or the like) associated with the message that is represented by the corresponding message node. A message node may be one of a command node, a query node, and an event node. The command node, the query node, and the event node may represent a command message, a query message, and an event message, respectively.

The set of attributes 310 corresponds to the data associated with the node 302 (e.g., the data represented by the node 302 within the executable graph-based model 100 as handled by the data management module 238). Notably, a node in the executable graph-based model 100 that is not associated with data may not have any attributes. The set of attributes 310 represents a complex data type. As shown, the node 302 further includes the metadata 312 (e.g., data stored as a name, a count of processed messages, time when the last message was processed, an average processing time required for processing a message, or the like) which is associated with either the node 302 or an attribute (for example, the set of attributes 310) of the node 302.

The node configuration 314 provides a high degree of configurations for the different elements of the node 302. The node configuration 314 optionally includes the one or more node configuration strategies 322 and/or the one or more node configuration extensions 324 which are complex data types. An example of a concrete node configuration strategy is an ID strategy, associated with the configuration of the unique ID 304a of the node 302, which creates message source IDs. A further example of a concrete node configuration strategy is a versioning strategy, associated with the configuration of the version ID 304b of the node 302, which supports major and minor versioning (depending on the type of transactional change incurred by the node 302). The versioning strategy may be adapted to a native filing system of a user device hosting the overlay system 202 or a third-party data storage (for example, Snowflake®, or the like) associated with the overlay system 202.

Figure 3B:
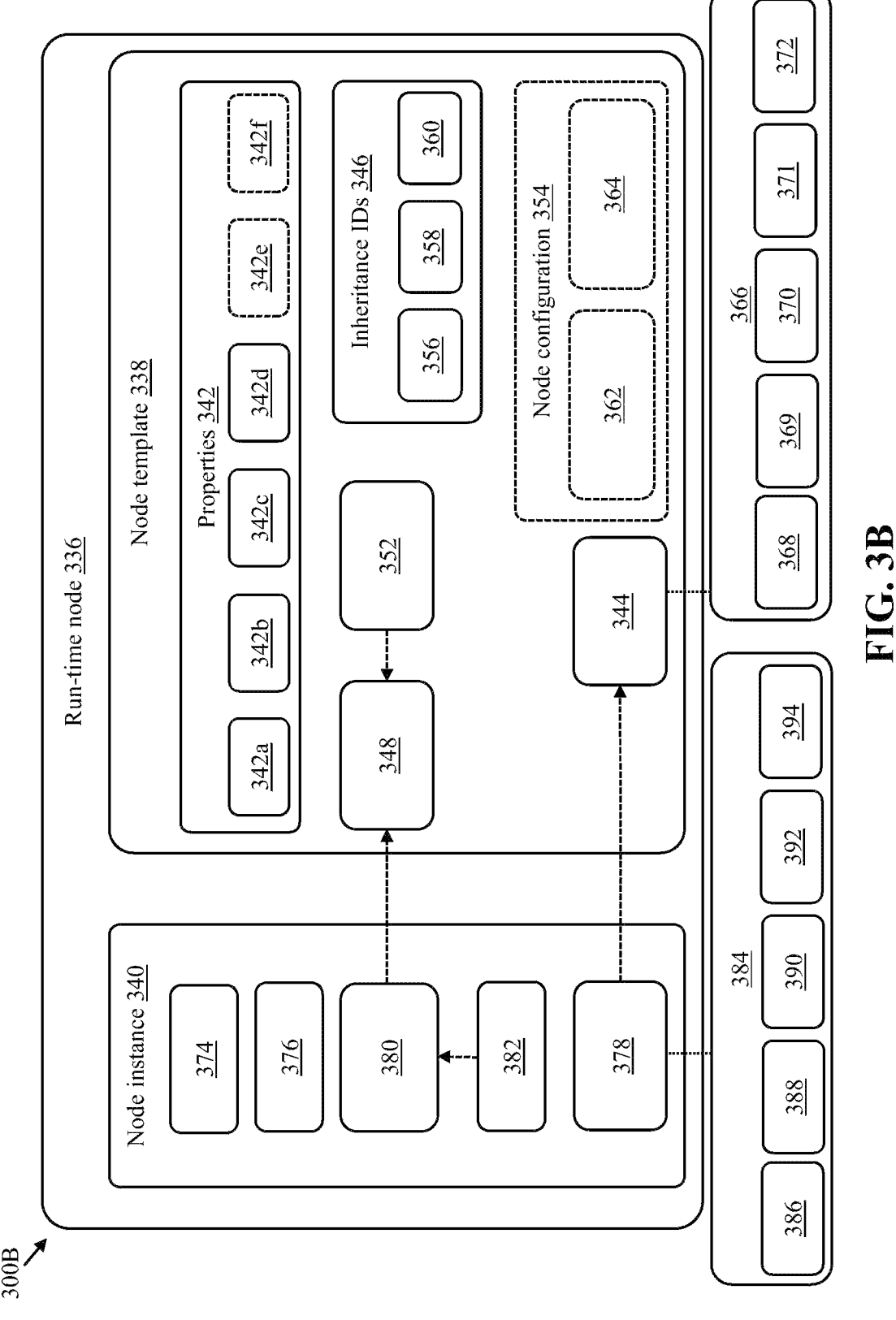
FIG. 3B is a block diagram that illustrates a generic structure of a run-time node within the executable graph-based model of FIG. 1, in accordance with an embodiment of the present disclosure.

FIG. 3B is a block diagram 300B that illustrates a generic structure of a run-time node 336 within the executable graph-based model 100, in accordance with an embodiment of the present disclosure. Referring to FIG. 3B, the run-time node 336 corresponds to the core structure of the executable graph-based model 100 and forms the foundational building block for all data and processing logic within the executable graph-based model 100. The run-time node 336 is shown to include a node template 338 and a node instance 340. The node instance 340 is generated according to the node template 338. The node template 338 forms a data structure for the node instance 340. The run-time node 336 shown in FIG. 3B is a compositional structure that is generated and executed, at run-time as part of the executable graph-based model 100. In other words, the node template 338 is defined 'offline' and the node instance 340 and the run-time node 336 are run-time structures that are dynamically generated during execution of the executable graph-based model 100.

The node template 338 comprises a predetermined node structure. Further, the node template 338 defines one or more rules that govern the creation of the node instance 340. The node instance 340 is an implementation of the node template 338. In other words, the node instance 340 is generated based on the predetermined node structure and the one or more rules of the node template 338. The node template 338 cannot be modified during the execution but may be modified during offline mode or at rest. During execution, only the node instance 340 of the run-time node 336 may be modified.

The node template 338 includes properties 342, a node type template 344, inheritance IDs 346, and a set of attribute templates 348. The node template 338 may optionally include metadata 352 and node configuration 354. The properties 342 of the node template 338 include a unique ID 342*a*, a version ID 342*b*, a namespace 342*c*, a name 342*d*, and optionally include one or more icons 342*e* and a set of labels 342*f*. The inheritance IDs 346 comprise an abstract flag 356, a leaf flag 358, and a root flag 360. The node configuration 354 optionally comprises one or more node configuration strategies 362 and/or one or more node configuration extensions 364. FIG. 3B further shows a plurality of predetermined node type templates 366. The plurality of predetermined node type templates 366 include a vertex node type template 368, an edge node type template 369, a role node type template 370, an overlay node template 371, and a message node type template 372. Further, the node instance 340 includes a unique ID 374, a version ID 376, a node type instance 378, and a set of attribute instances 380. The node instance 340 may optionally include metadata 382. FIG. 3B further shows a plurality of predetermined node type instances 384. The plurality of predetermined node type instances 384 include a vertex node type instance 386, an edge node type instance 388, a role node type instance 390, an overlay node type instance 392, and a message node type instance 394.

The unique ID 342*a* is unique for each node template within the executable graph-based model 100. Similarly, the unique ID 374 is unique for each node instance within the executable graph-based model 100. The unique ID 342*a* and the unique ID 374 are used to register, manage, and reference the node template 338 and the node instance 340, respectively, within the overlay system 202. The version ID 342*b* of the node template 338 is incremented when the node template 338 undergoes transactional change. Similarly, the version ID 376 of the node instance 340 is incremented when the node instance 340 undergoes transactional change. The namespace 342*c* of the node template 338, along with the name 308*d* of the node template 338, is used to help organize node templates within the executable graph-based model 100. That is, the node template 338 is assigned a unique name 342*d* within the namespace 342*c* such that the name 342*d* of the node template 338 need not be unique within the entire executable graph-based model 100, only within the context of the namespace 342*c* to which the node template 338 is assigned. The node template 338 optionally comprises one or more icons 342*e* which are used to provide a visual representation of the node template 338. The one or more icons 342*e* can include icons at different resolutions and display contexts such that the visualization of the node is adapted to different display settings and contexts. The node template 338 also optionally comprises the set of labels 342*f* which are used to override the name 342*d* when the node template 338 is rendered or visualized.

The node template 338 supports the software development feature of multiple inheritance by maintaining references (not shown) to zero or more other node templates, which then act as the base of the node template 338. This allows the behavior and functionality of a node template to be extended or derived from one or more other node templates within an executable graph-based model. The node instance 340 likewise supports multiple inheritance because it is an instance representation of the node template 338. The multiple inheritance structure of the node instance 340 is, however, limited to the corresponding instance realization of the multiple inheritance structure defined by the node template 338, i.e., one node instance 340 is created and managed for each node template 338 defined in the inheritance hierarchy for a node instance of a node template.

The inheritance IDs 346 of the node template 338 provide an indication of the inheritance-based information, which is applicable, or can be applicable, to the node template 338. The inheritance IDs 346 has a description that is similar to the inheritance IDs 306. The abstract flag 356 has a description that is similar to the abstract flag 316, the leaf flag 358 has a description that is similar to the leaf flag 318 and the root flag 360 has a description that is similar to the root flag 320.

All elements within the executable graph-based model 100 are defined as node templates or node instances. The functionality of the node template 338 and the node instance 340 are realized due to the use of the node type template 344 and the node type instance 378, respectively. The node type template 344 of the node template 338 is used to extend the functionality of the node template 338 by defining the standard set of capabilities, including data and associated behavior. The vertex node type template 368 (also referred to as a data node type) includes a template of common data structures and functionality related to the 'things' modeled in the graph (e.g., the data). The vertex node type instance 386 includes the common data structures and functionality related to the 'things' modeled in the graph based on the vertex node type template 368. The edge node type template 369 includes a template of common data structures and functionality related to joining two or more nodes. A node instance having the edge node type instance 388 may connect two or more nodes and thus the edge node type instance 388 constructs associations and connections between nodes (for example objects or 'things') within the executable graph-based model 100. The edge node type instance 388 is not restricted to the number of nodes that can be associated or connected by a node having the edge node type instance 388. The data structures and functionality of the edge node type instance 388 thus define a hyper-edge which allows two or more nodes to be connected through a defined set of roles. The role node type template 370 includes a template of common data structures and functionality related to defining a connective relationship between the two or more nodes, and hence, allows an edge node to connect two or more nodes such that the two or more nodes may have more than one relationship therebetween. A node instance having the role node type instance 390 defines the connective relationship between two or more nodes.

The plurality of predetermined node type templates 366 further includes the overlay node type template 371. The overlay node type template 371 is used to extend the functionality of a node template (e.g., the node template 338) to incorporate processing logic. Similarly, the overlay node type instance 392 is used to extend the functionality of a node instance (e.g., the node instance 340) to incorporate processing logic.

The overlay system 202 may have a plurality of messages associated therewith. A node template with the message node type template 372 represents a template of a message of the plurality of messages associated with the overlay system 202. The message node type instance 394 represents a message of the plurality of messages. The processing circuitry (e.g., the controller module 206, in conjunction with the message management module 222) may be configured to generate the executable graph-based model 100 based on the plurality of messages. Specifically, the processing circuitry (e.g., the controller module 206, in conjunction with the message management module 222) may instantiate a message node for each message associated with the overlay system 202 to create the executable graph-based model 100. Each node template with the message node type template 372 is associated with one or more node templates with the vertex node type template 368 that store a composition thereof. Similarly, each node instance with the message node type instance 394 is associated with one more node instances with the vertex node type instance 386 that store a composition thereof. The composition of a message node refers to data and transactional information (for example, a message identifier, a source identifier, a message type, or the like) associated with the message that is represented by the corresponding message node. A message node (such as a combination of a message node template and a message node instance) may be one of a command node, a query node, and an event node. The command node, the query node, and the event node may represent a command message, a query message, and an event message, respectively.

The set of attribute templates 348 corresponds to the data defined by the node template 338. For example, the set of attribute templates 348 may define the names and value types (e.g., integer, string, float, etc.) of one or more attributes but not the values of these attributes. The values of the set of attribute templates 348 may be defined by the set of attribute instances 380 of the node instance 340 through one or more values or instance values. For example, the node template 338 may define a string attribute 'surname' and the corresponding node instance 340 may assign the instance value 'Bell-Richards' to this string attribute. Each attribute instance of the set of attribute instances 380 is associated with an attribute template of the set of attribute templates 348. The node template 338 may define one or more default values for the set of attribute templates 348. The default values correspond to the values that the attributes take if no value is assigned. The metadata 352 (e.g., data stored as a name, value type, and value triplet) is associated with either the node template 338 or one or more of the set of attribute templates 348 of the node template 338. Similarly, the node instance 340 also optionally comprises the metadata 352 (e.g., data stored as a name, value type, and value triplet) which is associated with either the node instance 340 or one or more of the set of attribute instances 380.

The node configuration 354 provides a high degree of configurability for the different elements of a node template and/or node instance. An example of a concrete node configuration strategy is an ID strategy, associated with the configuration of the unique ID 342*a* of the node template 338. A further example of a concrete node configuration strategy is a versioning strategy, associated with the configuration of the version ID 342*b* of the node template 338 which supports major and minor versioning (depending on the type of transactional change incurred). The versioning strategy may be adapted to a native filing system of a user device hosting the overlay system 202 or a third-party data storage (for example, Snowflake®, or the like) associated with the overlay system 202.

Although it is provided that the node template 338 is associated with the node instance 340, the scope of the present disclosure is not limited to it. In other embodiments, the node template 338 may be further associated with two or more node instances where the two or more node instances correspond to two or more implementations of the node template 338, respectively.

Figure 4:
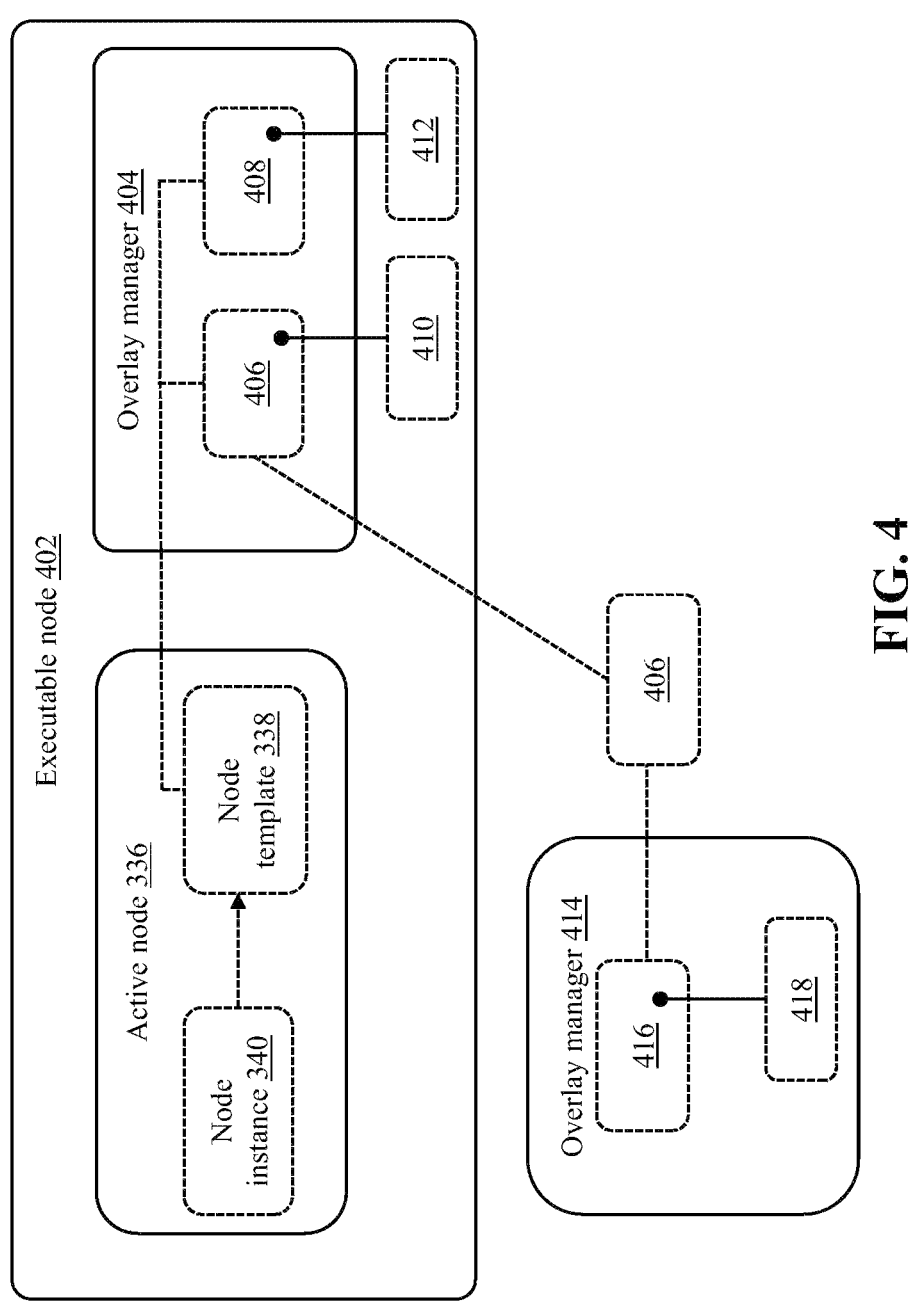
FIG. 4 is a block diagram that illustrates an executable node within the executable graph-based model of FIG. 1, in accordance with an embodiment of the present disclosure.
Figure 4:

FIG. 4 is a block diagram 400 that illustrates an executable node 402 within the executable graph-based model 100, in accordance with an embodiment of the present disclosure. Referring to FIG. 4, the executable node 402 is shown to include an active node (e.g., the node 302 or the run-time node 336) and an overlay manager 404. For the sake of ongoing discussion, the active node corresponds to the run-time node 336, and is hereinafter referred to as the "active node 336". However, the functionality of the executable node 402 for the active node corresponding to the run-time node 336 may be similar to that for the active node corresponding to the node 302.

The overlay manager 404 includes an overlay node 406 and an overlay node 408. The overlay node 406 has an overlay node type 410 and the overlay node 408 has an overlay node type 412. In an embodiment, the overlay node type 410 corresponds to a message handler overlay node type, and the overlay node type 412 corresponds to a history overlay node type. Thus, the overlay node 406 may be interchangeably referred to as "the message handler overlay node 406", and the overlay node 408 may be interchangeably referred to as "the history overlay node 408". Further, the overlay node 406 is associated with an overlay manager 414. The overlay manager 414 includes an overlay node 416. The overlay node 416 has an overlay node type 418. In an embodiment, the overlay node type 418 corresponds to a message publisher overlay node type. Thus, the overlay node 416 may be interchangeably referred to as "the message publisher overlay node 416". The message publisher overlay node 416 is an overlay of the message handler overlay node 406. The overlay manager 404 maintains overlay nodes (such as the overlay nodes 406 and 408) associated with the active node 336 whereas the overlay manager 414 maintains overlay nodes (such as the overlay node 416). The executable node 402 provides processing functionality (e.g., processing logic) to the active node 336 via one or more associated overlay nodes (for example, the overlay nodes 406, 408, and 416). Beneficially, the data and processing capability of the active node 336 may be dynamically and significantly extended using the concept of an executable node (for example, the executable node 402).

A handler overlay node is a node that includes processing logic for subscribing to one or more messages mapped to the corresponding executable node and processing the subscribed messages in conjunction with the corresponding active node. The handler overlay node, being a run-time node, adheres to the generic structure of a run-time node described in conjunction with FIG. 3B. The term 'subscribe' refers to an operation that is executed by a handler overlay node for receiving a message from another executable node or the message management module 222 of the overlay system 202.

A message publisher overlay node is a node that includes processing logic for the creation and publication of one or more messages to be communicated by the corresponding executable node. The message publisher overlay node may be an extension of an active node or an overlay node (e.g., a handler overlay node). The message publisher overlay node, being a run-time node, adheres to the generic structure of a run-time node described in conjunction with FIG. 3B. In an instance, when the message publisher overlay node is an extension of an active node, the message publisher overlay node may generate and publish messages that are to be communicated by the corresponding active node. In another instance, when the message publisher overlay node is an extension of another overlay node (e.g., a handler overlay node), it may generate and publish messages based on the processing of subscribed messages.

A history overlay node is a node that includes processing logic for facilitating the creation, maintenance, and utilization of a set of history message nodes and the creation of a set of history nodes, associated with the corresponding active node. Each history message node of the set of history message nodes comprises data and transactional information required for the recreation of the corresponding history node. A history node refers to a historical version of the corresponding active node. The history overlay node, being a run-time node, adheres to the generic structure of a run-time node described in conjunction with FIG. 3B.

The executable node 402 extends the active node 336 (or is a subtype of the active node 336) such that all the functionality and properties of the active node 336 are accessible to the executable node 402. The executable node 402 also dynamically extends the functionality of the active node 336 by associating the overlay nodes maintained by the overlay manager 404 with the active node 336. The executable node 402 may thus be considered a composition of the active node 336 and the overlay nodes (such as the overlay nodes 406 and 408). The executable node 402 may be alternatively referred to as a node with overlay. Therefore, the executable node 402 acts as a decorator of the active node 336 adding the functionality of the overlay manager 404 to the active node.

Although, the executable node 402 is shown to include the overlay nodes 406 and 408, in other embodiments, the executable node 402 may include any number of overlay nodes, without deviating from the scope of the present disclosure.

It will be apparent to a person skilled in the art that the active node 336 refers to any suitable node within the executable graph-based model 100. As such, the active node 336 may be a node having a type such as a vertex node type, an edge node type, a message node type, or the like. Alternatively, the active node 336 may itself be an executable node such that the functionality of the (executable) active node 336 is dynamically extended. In this way, complex and powerful processing functionality can be dynamically generated by associating and extending overlay nodes.

The overlay manager 404 registers and maintains one or more overlay nodes (such as the overlay nodes 406 and 408) associated with the active node 336. The assignment of the overlay nodes to the active node 336 (via the overlay manager 404) endows the active node 336 with processing logic and executable functionality defined within the overlay nodes. Similarly, the overlay manager 414 registers and maintains one or more overlay nodes (such as the overlay node 416) associated with the overlay node 406. The overlay node 416 (via the overlay manager 414) extends the functionality of the overlay node 406.

Extending the functionality of an active node through one or more overlay nodes is at the heart of the overlay system 202. As illustrated in FIG. 2, the data (e.g., a vertex node as represented by the active node 336 in FIG. 3B) and the functionality that acts upon that data (e.g., an overlay node) can be separated and independently maintained offline, but at run-time, an association between the data node and the overlay node is determined and an executable node is generated (e.g., the executable node 402 shown in FIG. 4).

It will be apparent to a person skilled in the art that the list of overlay types is not exhaustive and the number of different overlay types that can be realized is not limited. Because an overlay node is itself a node, all functionality of a node described in relation to the data node is thus applicable to an overlay node. For example, an overlay node includes a unique ID, a name, etc., can have attributes (e.g., an overlay node can have its data defined), supports multiple inheritance, and can be configured via node configurations. Furthermore, because an overlay node is a node, the overlay node can have one or more overlay nodes associated therewith (e.g., the overlay node 416 is an overlay of the overlay node 406). Moreover, the processing functionality of an overlay node extends to the node type of the node to which the overlay node is applied.

An overlay node, such as the overlay node 406, the overlay node 408, and the overlay node 416, is not bound to a single executable node or a single executable graph-based model (unlike nodes that have non-overlay node types). This allows overlay nodes to be centrally managed and reused across multiple instances of executable graph-based models. Notably, a node (for example, a data node, an executable node, and an overlay node) may be extended by way of overlays. Further, each overlay node may be extended to have one or more overlays. Such overlays may be termed chaining overlays.

The overlay manager 404 of the executable node 402 is responsible for executing all overlays registered therewith. The overlay manager 404 also coordinates the execution of all associated overlay nodes. Similarly, the overlay manager 414 associated with the overlay node 416 is responsible for executing all overlays registered therewith. Thus, the overlay managers 404 and 414 employ a strategy to manage the potentially cascading execution flow. Example strategies to manage the cascading execution of overlays include the visitor pattern and the pipe and filter pattern. Further examples include strategies that apply either depth-first or breadth-first processing patterns, a prioritization strategy, or a combination thereof. All execution strategies are defined and registered with the overlay managers 404 and 414, and are associated with an overlay via a node configuration extension for the overlay.

The data and the processing logic associated with one or more overlays of an executable node (for example, the executable node 402) are persistent. The persistent nature of the data and the processing logic are described in detail in conjunction with FIG. 5.

Figure 5:
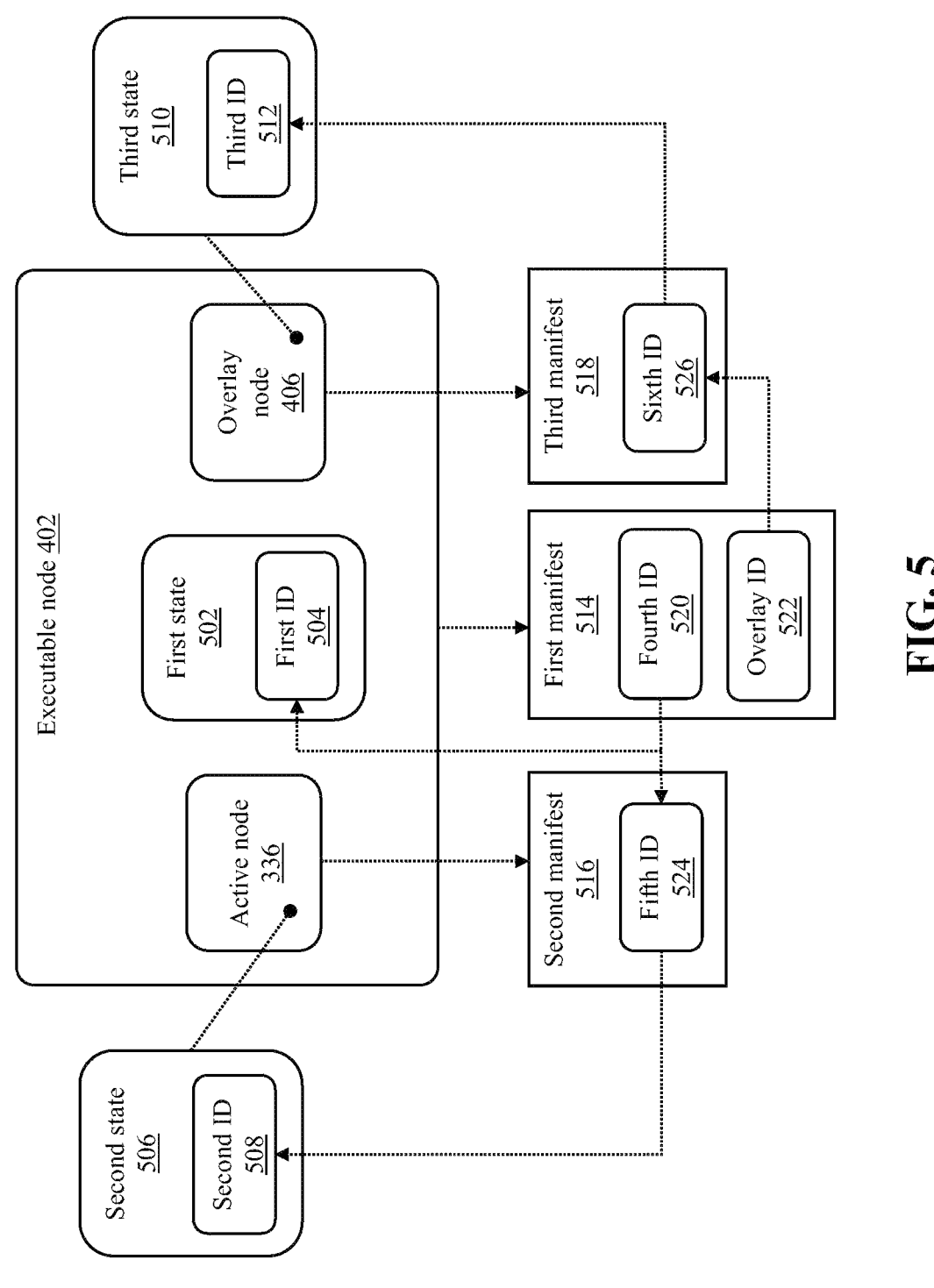
FIG. 5 is a block diagram that illustrates a composition of the executable node that enables persistent storage of data and processing logic associated therewith, in accordance with an embodiment of the present disclosure.

FIG. 5 is a block diagram 500 that illustrates a composition of the executable node 402 that enables persistent storage of data and the processing logic associated therewith, in accordance with an embodiment of the present disclosure.

As described in conjunction with FIG. 4, the executable node 402 includes the active node 336 and one or more overlay nodes (e.g., the overlay nodes 406 and 408). For the brevity of the ongoing description, the persistent storage is explained for the executable node 402 including only the overlay node 406. One or more operations performed for ensuring the persistence of the overlay node 406 may be performed for the overlay node 408 as well.

The executable node 402 has a first state 502 having a first ID 504. The active node 336 has a second state 506 having a second ID 508, and the overlay node 406 has a third state 510 having a third ID 512. A manifest (for example, first through third manifests 514-518) is generated for each of the active node 336, the executable node 402, and the overlay node 406. In an embodiment, the manifests may be generated by the storage management module 218. The first manifest 514 is associated with the executable node 402 and has a fourth ID 520 and an overlay ID 522. The second manifest 516 is associated with the active node 336 and has a fifth ID 524. The third manifest 518 associated with the overlay node 406 and has a sixth ID 526. Further, the manifests are stored at respective storage locations that may be centralized or distributed storage locations associated with the overlay system 202. The manifests may be stored by the storage management module 218.

The first state 502 of the executable node 402 includes data required to reconstruct the executable node 402 (e.g., attributes, properties, etc.). The first state 502 of the executable node 402 is persistently stored along with the first ID 504. The first manifest 514 is generated for the executable node 402 and has (i) the fourth ID 520 (which is the same as the first ID 504), (ii) the storage location of the first state 502 of the executable node 402, and (iii) the overlay ID 522. Notably, the fourth ID 520 is the same as the first ID 504 and the fifth ID 524, hence, the first manifest 514 includes the ID of the state of the active node 336 and the executable node 402. Further, the overlay ID 522 is the same as the sixth ID 526 of the state of the overlay node 406. Therefore, the first manifest 514 may be used to identify and retrieve the states of the active node 336, the executable node 402, and the overlay node 406. Subsequently, the retrieved states may be used to reconstruct the executable node 402 and the overlay node 406. In an instance, the executable node 402 may be further extended to include additional overlay nodes. In such an instance, the first manifest 514 may include state IDs of the additional overlay nodes as well. A first manifest state (not shown) is then generated for the first manifest 514 and persistently stored along with the fourth ID 520.

The second state 506 of the active node 336 includes data required to reconstruct the active node 336 (e.g., attributes, properties, etc.) and is persistently stored along with the second ID 508. The second manifest 516 is generated for the active node 336 and has (i) the fifth ID 524 and (ii) the storage location of the second state 506 of the active node 336. The second ID 508 of the second state 506 and the fifth ID 524 of the second manifest 516 are the same as the first ID 504 of the first state 502 of the executable node 402 (which is also the same as the fourth ID 520 of the first manifest 514 of the executable node 402). As mentioned above, along with the first state 502, the first manifest 514 may also be used to identify and retrieve the second manifest 516 which in turn may be used to identify the second state 506 of the active node 336. A second manifest state (not shown) is then generated for the second manifest 516 and persistently stored along with the fifth ID 524. Thus, the states, manifests, and manifest states for the executable node 402 and the active node 336 include the same, shared, ID. A shared ID can be used in this instance because the states, manifests, and manifest states are stored separately. The separate storage of the states, manifests, and manifest states exhibit a distributed architecture of the overlay system 202.

The third state 510 of the overlay node 406 includes data required to reconstruct the overlay node 406 (e.g., attributes, properties, processing logic, etc.) and is persistently stored along with the third ID 512. The third manifest 518 is generated for the overlay node 406 and includes the sixth ID 526, which is the same as the third ID 512. Therefore, the first manifest 514 may be further used to identify and retrieve the third manifest 518 which in turn may be used to identify and retrieve the third state 510 of the overlay node 406. A third manifest state (not shown) is then generated for the third manifest 518 and is persistently stored along with the sixth ID 526.

In operation, when the executable node 402 is to be loaded, the transaction module 208, in conjunction with the storage management module 218, may execute one or more operations to retrieve the first manifest state stored at a known storage location. Based on the first manifest state, the storage management module 218 may re-construct the first manifest 514 which includes the fourth ID 520 which is the same as the fifth ID 524 of the second manifest 516. Based on the fifth ID 524, the storage management module 218 may identify the second manifest state and may generate the second manifest 516 based on which the second state 506 is identified. Subsequently, the active node 336 is loaded and the storage management module 218 may determine that the active node 336 is a node with overlay. Based on the fourth ID 520 (that is the same as the first ID 504 of the first state 502 of the executable node 402) of the first manifest 514, the first state 502 is identified and retrieved. Subsequently, the executable node 402 is loaded. Moreover, based on the overlay ID 522 (that is the same as the sixth ID 526 of the third manifest 518) of the first manifest 514, the third manifest state is identified and the third manifest 518 is generated. Subsequently, based on the sixth ID 526 (that is the same as the third ID of the third state) of the third manifest 518, the third state 510 is identified and retrieved. Based on the third state 510, the overlay node 406 is reconstructed and loaded in the executable graph-based model 100.

In some embodiments, the overlay node 406 may not be loaded in case it is not required for executing the operation associated with the set of stimuli 232. The loaded executable node 402 and the overlay node 406 may be unloaded in case they remain unused for a first predefined time period, whereas one or more executable nodes that are used at least once during the predefined time period may be permanently loaded in the executable graph-based model 100. In some embodiments, the data and processing logic associated with a loaded executable node and/or overlay node may be transferred to a local memory of the overlay system 202 if the data and the processing logic remain unused for a second predefined time period. Further, the data and the processing logic associated with the executable node/overlay node are transferred to an external storage from the local memory in case the executable node/overlay node remains unused for a third predefined time period. The third predefined time period is greater than the second predefined time period. The term unloading refers to storing a state of a node with a current version of data and processing logic associated therewith at a storage location that is pointed by the corresponding manifest.

An executable graph-based model (for example, the executable graph-based model 100) may be stored (and loaded) using the above-described composition. Beneficially, each component is stored separately thereby allowing a user to maintain and store their data independently of the storage of the structure and functionality of the executable graph-based model 100.

Notably, all manifest states are stored together at a storage location that is known to the storage management module 218. Such centralized storage of the manifest states ensures that node states associated therewith are easily accessible.

It will be apparent to a person skilled in the art that although FIG. 5 illustrates only a single overlay node, in other embodiments, the executable node may include additional or different overlay nodes (for example, the overlay nodes 408 and/or 416). It will also be apparent to a person skilled in the art that only those overlay nodes that are required for responding to the stimulus may be loaded.

The overlay system 202 described above may be used to implement systems and methods for in-situ messaging history using the executable graph-based models (for example, the executable graph-based model 100).

FIGS. 6A-6I are schematic diagrams 600A-600I that, collectively, illustrate the creation, maintenance, and utilization of in-situ messaging history in the executable graph-based model 100, in accordance with an embodiment of the present disclosure.

Figure 6A:
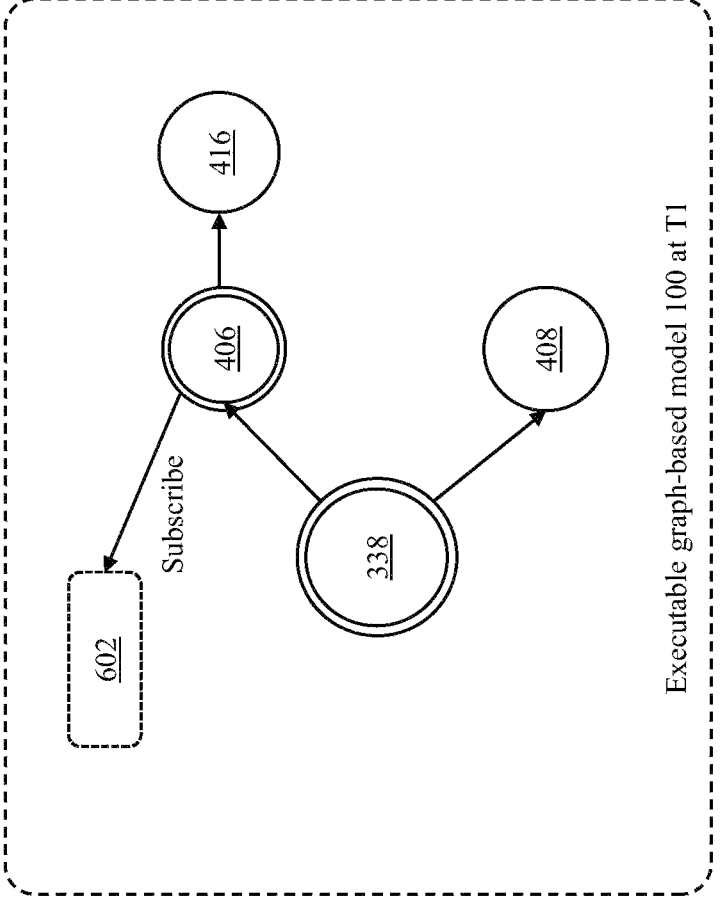
FIGS. 6A-6I are schematic diagrams that, collectively, illustrate the creation, maintenance, and utilization of in-situ messaging history in the executable graph-based model of FIG. 1, in accordance with an embodiment of the present disclosure.

Referring to FIG. 6A, the executable graph-based model 100 at a first-time instance is shown. The first-time instance is hereinafter referred to as 'T1'. At T1, the executable graph-based model 100 includes the node template 338. The executable graph-based model 100 further includes the message handler overlay node 406 and the history overlay node 408 that are associated with the node template 338. That is to say, the message handler overlay node 406 and the history overlay node 408 are overlays of the node template 338. As mentioned previously, the node template 338 corresponds to a template portion of the active node 336. The executable graph-based model 100 further includes the message publisher overlay node 416 associated with the message handler overlay node 406 (e.g., the message publisher overlay node 416 is an overlay of the message handler overlay node 406). The node template 338 may be created by the templating module 240 prior to T1. The node template 338 may be created by the templating module 240 based on an input from an administrator of the overlay system 202. Further, each of the message handler overlay node 406, the history overlay node 408, and the message publisher overlay node 416 may be instantiated in the executable graph-based model 100 after the creation of the node template 338 and prior to T1.

The node template 338 is represented in the executable graph-based model 100 by way of two concentric circles, with the inner circle representing the node template 338 and the outer circle indicating the presence of overlay nodes such as the message handler overlay node 406 and the history overlay node 408, for extending the functionalities of the node template 338. In such a scenario, the association of the message handler overlay node 406 and the history overlay node 408 with the node template 338 is represented by an arrow linking the outer circle of the node template 338 to the message handler overlay node 406 and the history overlay node 408, respectively. Similarly, the message handler overlay node 406 is also represented in the executable graph-based model 100 by way of two concentric circles, with the inner circle representing the message handler overlay node 406 and the outer circle indicating the presence of an overlay node such as the message publisher overlay node 416. The history overlay node 408 and the message publisher overlay node 416 are represented in the executable graph-based model 100 by way of a single circle as they are not extended further using overlays.

The stimuli management module 212 may be configured to receive a first stimulus 602 of the set of stimuli 232 via the network 234. The first stimulus 602 corresponds to a command-type message. Further, a first context of the first stimulus 602 is indicative of a creation of the node instance 340. The context module 210, in conjunction with the stimuli management module 212, may be configured to determine that the first stimulus 602 is directed to the node template 338. Further, the controller module 206, in conjunction with, the history management module 224 and the message management module 222, may be configured to execute an operation associated with the first stimulus 602. In other words, the message handler overlay node 406 may be configured to subscribe to the first stimulus 602 and process the first stimulus 602 to execute the operation associated with the first stimulus 602.

Figure 6B:
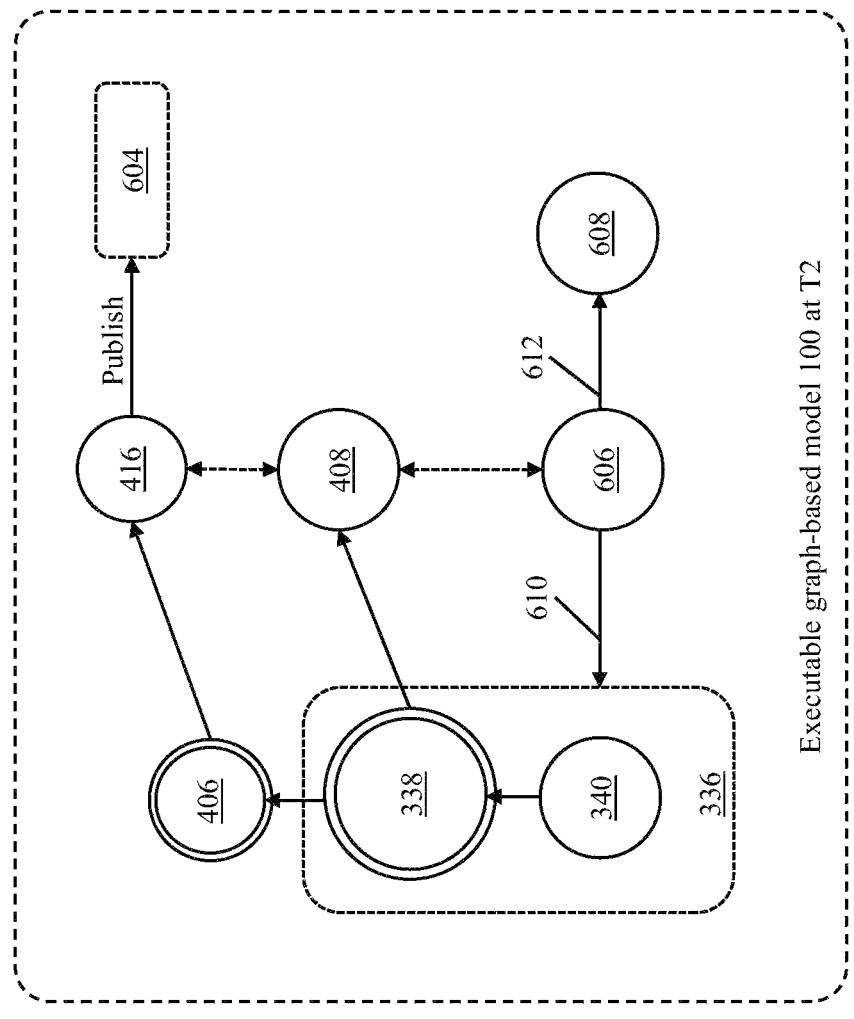

Referring to FIG. 6B, the executable graph-based model 100 at a second-time instance (e.g., post the execution of the operation associated with the first stimulus 602) is illustrated. The second-time instance is hereinafter referred to as 'T2'. As described previously, the first context of the first stimulus 602 is indicative of the creation of the node instance 340. Upon the identification that the first stimulus 602 is directed to the node template 338, the context module 210, in conjunction with the stimuli management module 212 and the controller module 206, may be further configured to determine that the node template 338 has the message handler overlay node 406 and the history overlay node 408 associated therewith. Further, the message handler overlay node 406 may be configured to subscribe to and process the first stimulus 602. The processing of the first stimulus 602 results in the creation of at least the node instance 340 linked with the node template 338. The node template 338 and the node instance 340 constitute a first active version of the active node 336. In other words, the first active version of the active node 336 corresponds to a templatized node. The first active version of the active node 336 corresponds to a run-time node.

The history overlay node 408 is associated with the message publisher overlay node 416. Upon the creation of the node instance 340 by the processing of the first stimulus 602, the message publisher overlay node 416 may be configured to generate an active message 604. That is to say, the message publisher overlay node 416 may be configured to generate the active message 604 based on the processing of the first stimulus 602. The message publisher overlay node 416 may store association data that is indicative of the association of the history overlay node 408 with the active node 336. That is to say, the message publisher overlay node 416 is aware of the association of the history overlay node 408 with the active node 336. Thus, the message publisher overlay node 416 may be further configured to communicate an indication to the history overlay node 408 for the creation of a history edge node 606 and an active message node 608 in the executable graph-based model 100, based on the creation of the active message 604. Thus, the message publisher overlay node 416 communicates the active message 604 to the history overlay node 408. Further, the history overlay node 408, based on the indication received from the message publisher overlay node 416, may be configured to create the history edge node 606 and the active message node 608, in the executable graph-based model 100. The active message node 608 represents the active message 604 and is associated with the history edge node 606. The active message 604 includes data and transactional information required for the creation of the node instance 340.

The history edge node 606 may be configured to communicate a success message (not shown) to the history overlay node 408, based on the creation of the history edge node 606 and the active message node 608. Further, the history overlay node 408 may be configured to communicate an indication to the message publisher overlay node 416, that is indicative of whether the history edge node 606 and the active message node 608 are successfully created in the executable graph-based model 100. Further, the message publisher overlay node 416 may be configured to publish the active message 604 in the executable graph-based model 100 based on the indication that the history edge node 606 and the active message node 608 are successfully created in the executable graph-based model 100. The active message 604 corresponds to an event-type message.

In an embodiment, the history edge node 606 may be configured to communicate a failure message to the history overlay node 408, in case the active message node 608 is not created in the executable graph-based model 100. In such a scenario, the history overlay node 408 may be configured to communicate, to the message publisher overlay node 416, an indication that the active message node 608 is not created in the executable graph-based model 100. In another embodiment, the history edge node 606 may not be created in the executable graph-based model 100 and thus the history overlay node 408 does not receive any success message or failure message. In such scenarios, the creation of the history edge node 606 and the node instance 340 is rolled back. Further, the active message 604 is published in the executable graph-based model 100, by the message publisher overlay node 416. In such a scenario, the active message 604 indicates that an operation of the creation of the node instance 340 in the executable graph-based model 100 has failed.

Referring back to the scenario when the history edge node 606 and the active message node 608 are successfully created in the executable graph-based model 100, the history edge node 606 may be configured to couple the active message node 608 to the active node 336. The first active version of the active node 336 is interchangeably referred to as "the active node 336". Further, a first role node 610 and a message role node 612 are associated with the history edge node 606. The first role node 610 defines a relationship between the history edge node 606 and the active node 336. Similarly, the message role node 612 defines a relationship between the history edge node 606 and the active message node 608. The role nodes are illustrated as arrows in FIG. 6B to keep the illustration concise and clear. The node instance 340 is retained in the executable graph-based model 100 for a predetermined time period after the execution of the operation associated with the first stimulus 602. Thus, the history management module 224, in conjunction with the controller module 206, may be further configured to delete the node instance 340 from the overlay system 202, based on a lapse of the predetermined time period after the execution of the operation associated with the first stimulus 602.

Figure 6C:
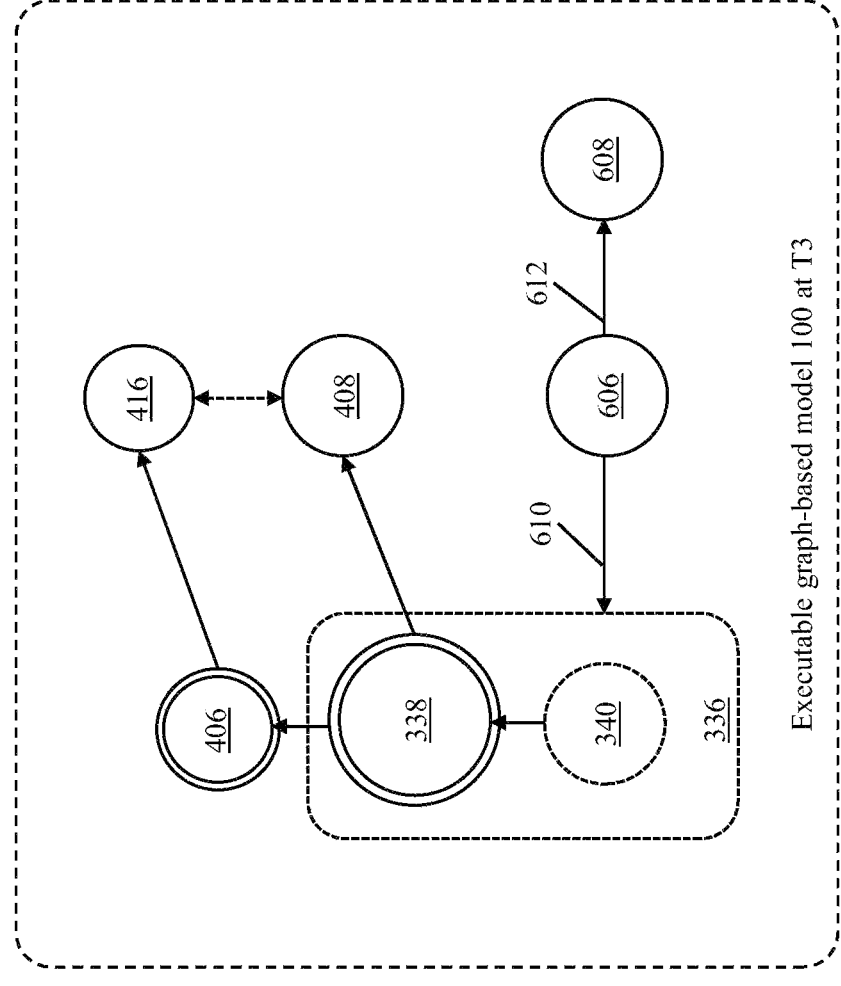
Figure 6C:

Referring to FIG. 6C, the executable graph-based model 100 at a third-time instance (e.g., post the execution of the operation associated with the first stimulus 602) is illustrated. The third-time instance is hereinafter referred to as 'T3'. As the node instance 340 is deleted based on the lapse of the predetermined time period, at T3, the node instance 340 is absent in the executable graph-based model 100. Thus, the node instance 340 is shown by a single dotted circle, indicating that the node instance 340 is deleted from the overlay system 202. As the node instance 340 is deleted from the overlay system 202, memory allocated to the node instance 340 is freed up and may be utilized for other operations associated with the overlay system 202. Thus, the resource of the overlay system 202 gets efficiently and optimally utilized.

Figure 6D:
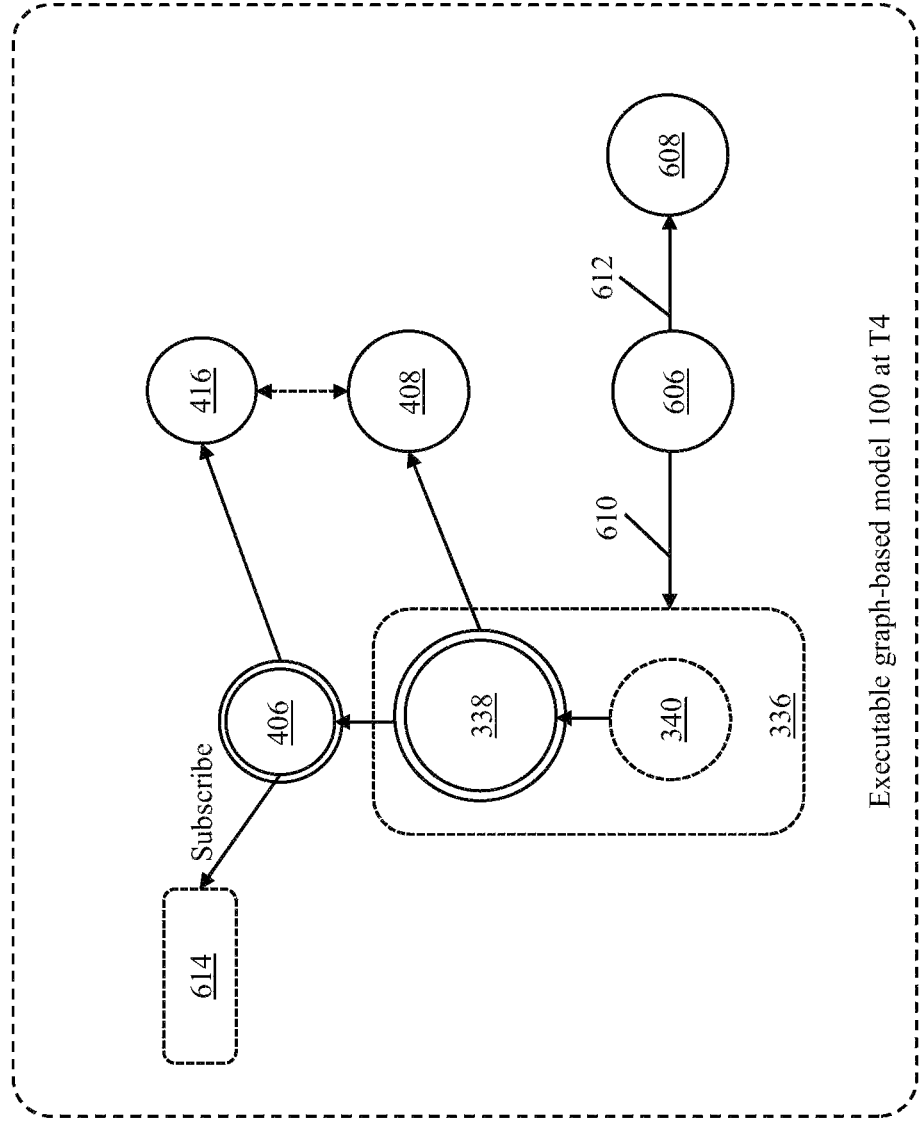

Referring to FIG. 6D, the executable graph-based model 100 at a fourth-time instance is illustrated. The fourth-time instance is hereinafter referred to as 'T4'. At T4, the stimuli management module 212 may be configured to receive a second stimulus 614 of the set of stimuli 232, via the network 234. The second stimulus 614 corresponds to a command-type message. A second context of the second stimulus 614 is indicative of a mutation to the node instance 340 of the active node 336. The mutation to the node instance 340 corresponds to a modification of the node instance 340.

Figure 6E:
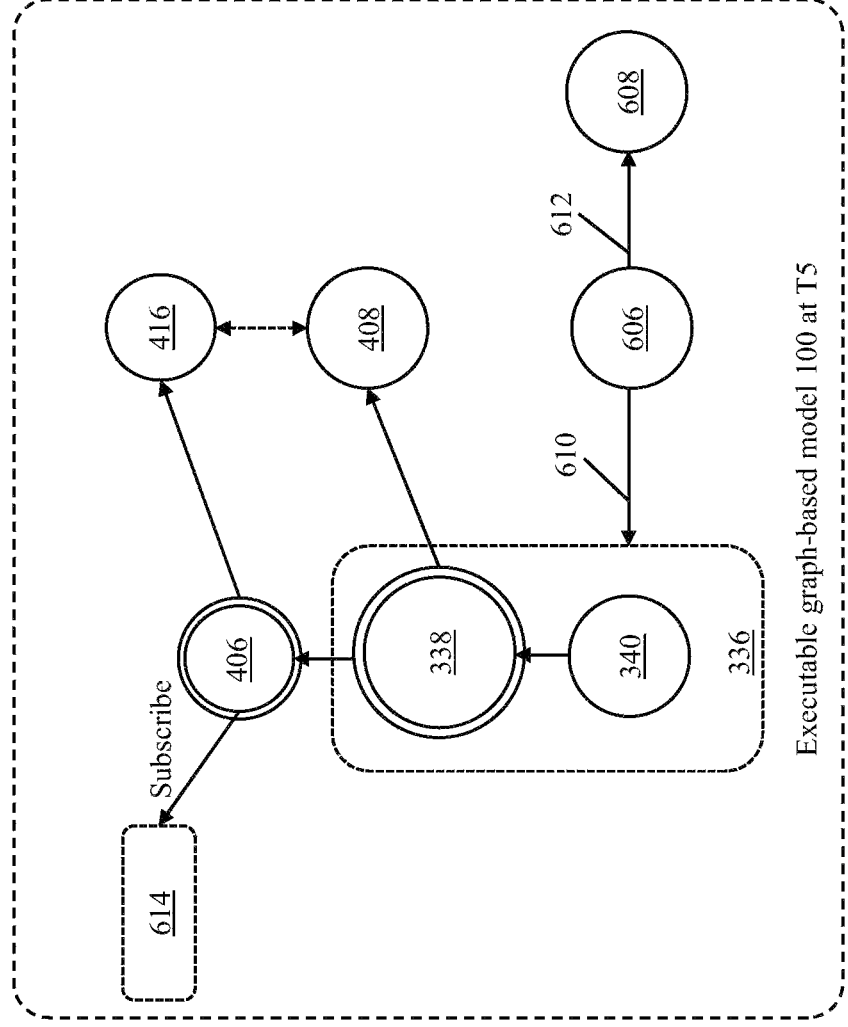

Referring to FIG. 6E, the executable graph-based model 100 at a fifth-time instance (e.g., post the receipt of the second stimulus 614) is illustrated. The fifth-time instance is hereinafter referred to as 'T5'. Upon the reception of the second stimulus 614, the context module 210, in conjunction with the stimuli management module 212, may be configured to determine that the second stimulus 614 is directed to the active node 336. Further, the controller module 206 may be configured to identify that the node instance 340 is absent in the executable graph-based model 100. Further, the controller module 206, in conjunction with the history management module 224 and the message management module 222, may be configured to identify the active message node 608 associated with the active node 336 by traversing through the first role node 610, the history edge node 606, and the message role node 612. In other words, the controller module 206, in conjunction with the history management module 224 and the message management module 222, may be configured to identify history edge nodes that are associated with the active node 336. The history edge node 606 is identified, as at T5, only one history edge node is associated with the active node 336. Further, the active message node 608 that is coupled to the history edge node 606 is identified, and the controller module 206, in conjunction with the history management module 224 and the message management module 222, may be configured to create the node instance 340 in the executable graph-based model 100 based on the active message node 608. That is to say, the node instance 340 is recreated in the executable graph-based model 100 by utilizing the data and transactional information indicated by the active message 604 which is represented by the active message node 608. Thus, at T5, the executable graph-based model 100 is shown to include the node instance 340. The re-created node instance 340 is shown by a single solid circle. Further, the controller module 206, in conjunction with the history management module 224 and the message management module 222, may be configured to execute an operation associated with the second stimulus 614 based on the active node 336 that includes the node template 338 and recreated node instance 340.

Figure 6F:
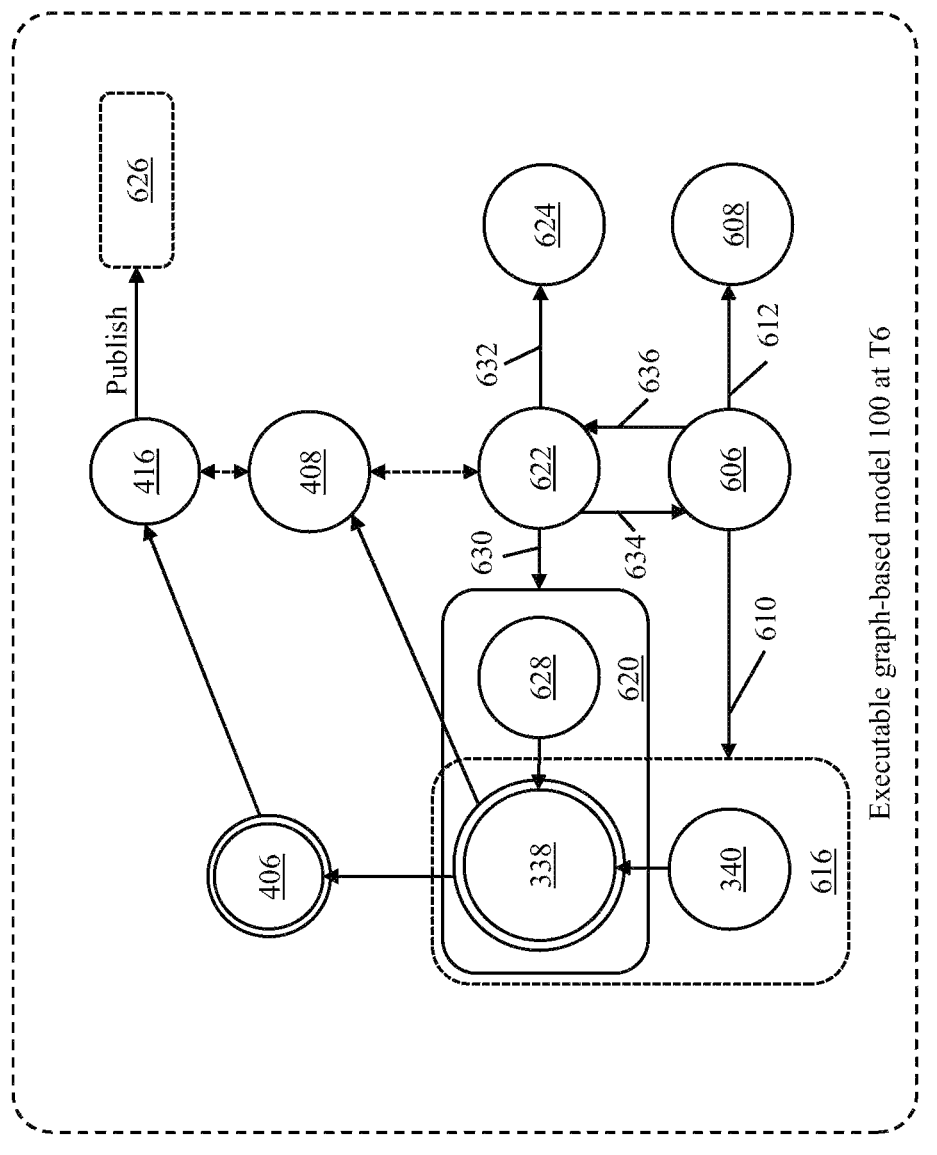

Referring to FIG. 6F, the executable graph-based model 100 at a sixth-time instance (e.g., post the execution of the operation associated with the second stimulus 614) is illustrated. The sixth-time instance is hereinafter referred to as 'T6'. During the execution of the operation associated with the second stimulus 614, the history management module 224 may be configured to identify that the active node 336 is associated with the history overlay node 408. As the history overlay node 408 is associated with the active node 336, the history management module 224, in conjunction with the controller module 206, may be configured to create a clone of the first active version of the active node 336 and transfer the history overlay node 408 to the clone of the first active version of the active node 336. Particularly, a clone of the node instance 340 is created. Further, the transfer of the history overlay node 408 to the clone of the first active version of the active node 336 corresponds to the de-association of the history overlay node 408 from the node instance 340 and the association of the history overlay node 408 with the clone of the node instance 340. The transfer of the history overlay node 408 to the clone of the first active version of the active node 336 results in conversion of the first active version of the active node 336 into a history node 616 and consequently, in the conversion of the active message node 608 into a history message node 608. Thus, the active message node 608 is hereinafter referred to as "the history message node 608". The history message node 608 represents a historical message that includes data and transactional information required for the creation of the history node 616. Thus, the message role node 612 defines a relationship between the history edge node 606 and the history message node 608. The history node 616 includes the node template 338 and the node instance 340. The node instance 340 may be also referred to as "the history node instance 340". The history management module 224, in conjunction with the controller module 206, may be further configured to execute the operation associated with the second stimulus 614 on the clone of the first active version of the active node 336, thereby resulting in a second active version of the active node 336. The second active version of the active node 336 is alternatively referred to as "the active node 620". The clone of the first active version of the active node 336 includes the node template 338 and a clone of the node instance 340. Additionally, the clone of the node instance 340 is similar to the node instance 340 except for the version ID of the clone of the node instance 340 being two whereas the version ID of the node instance 340 is one.

The execution of the operation associated with the second stimulus 614 corresponds to a mutation of the clone of the first active version of the active node 336. Further, based on the creation of the active node 620, a history edge node 622 and an active message node 624 get created in the executable graph-based model 100. The active message node 624 represents an active message 626 that includes data and transactional information that indicates the mutation that resulted in the creation of the active node 620. The history edge node 622 couples the active message node 624 to the active node 620, and the history edge node 622 is further coupled to the history edge node 606. The mutation of the clone of the first active version of the active node 336 corresponds to a modification of the clone of the node instance 340. Thus, the active node 620 includes a node instance 628 and the node template 338. The node instance 628 corresponds to a mutated version of the clone of the node instance 340.

The message handler overlay node 406 may be configured to subscribe to and process the second stimulus 614 for executing the operation associated with the second stimulus 614. That is to say, the processing of the second stimulus 614 results in the creation of the second active version of the active node 336 (i.e., the active node 620). The message publisher overlay node 416 may be further configured to generate the active message 626 based on the processing of the second stimulus 614 and communicate an indication to the history overlay node 408 for the creation of the history edge node 622 and the active message node 624 in the executable graph-based model 100, based on the creation of the active message 626. Further, the history overlay node 408, based on the indication received from the message publisher overlay node 416, may be configured to create the history edge node 622 and the active message node 624. The active message node 624 includes the active message 626 and is associated with the history edge node 622.

The history edge node 622 may be configured to communicate a success message (not shown) to the history overlay node 408, based on the creation of the history edge node 622 and the active message node 624. Further, the history overlay node 408 may be configured to communicate an indication to the message publisher overlay node 416, which is indicative of whether the history edge node 622 and the active message node 624 are successfully created in the executable graph-based model 100. Further, the active message 626 is published in the executable graph-based model 100 by the message publisher overlay node 416, based on the indication that the history edge node 622 and the active message node 624 are successfully created in the executable graph-based model 100. The active message 626 corresponds to an event-type message.

In an embodiment, the history edge node 622 may be configured to communicate a failure message (not shown) to the history overlay node 408, in case the active message node 624 is not created in the executable graph-based model 100. Further, the history overlay node 408 may be configured to communicate an indication to the message publisher overlay node 416, that the active message node 624 is not created in the executable graph-based model 100. In another embodiment, the history edge node 622 may not be created in the executable graph-based model 100 and thus the history overlay node 408 does not receive any success message or failure message. In such scenarios, the creation of the history edge node 622 and the node instance 628 is rolled back. Further, the active message 626 is published in the executable graph-based model 100, by the message publisher overlay node 416. In such a scenario, the active message 626 indicates that an operation corresponding to the mutation of the node instance 340 in the executable graph-based model 100 has failed.

Referring back to the scenario when the history edge node 622 and the active message node 624 are successfully created in the executable graph-based model 100, the history edge node 622 may be configured to couple the active message node 624 to the active node 620 via a second role node 630 and a message role node 632. The second role node 630 defines a relationship between the history edge node 622 and the active node 620. Similarly, the message role node 632 defines the relationship between the history edge node 622 and the active message node 624. The history edge node 622 is further associated with a third role node 634 and a fourth role node 636. The third role node 634 and the fourth role node 636 couple the history edge node 622 to the history edge node 606. The third role node 634 indicates that the history edge node 622 corresponds to a next history edge node and the fourth role node 636 indicates that the history edge node 606 corresponds to a previous history edge node.

The role nodes are illustrated as arrows in FIG. 6F to keep the illustration concise and clear.

The node instance 628 and the history node 616 are retained in the executable graph-based model 100 for a predetermined time period. Thus, the history management module 224 in conjunction with the controller module 206, may be further configured to delete the node instance 628 and the history node 616 from the overlay system 202, based on a lapse of the predetermined time period after the execution of the operation associated with the second stimulus 614. The deletion of the history node 616 corresponds to a deletion of the node instance 340 of the history node 616.

Figure 6G:
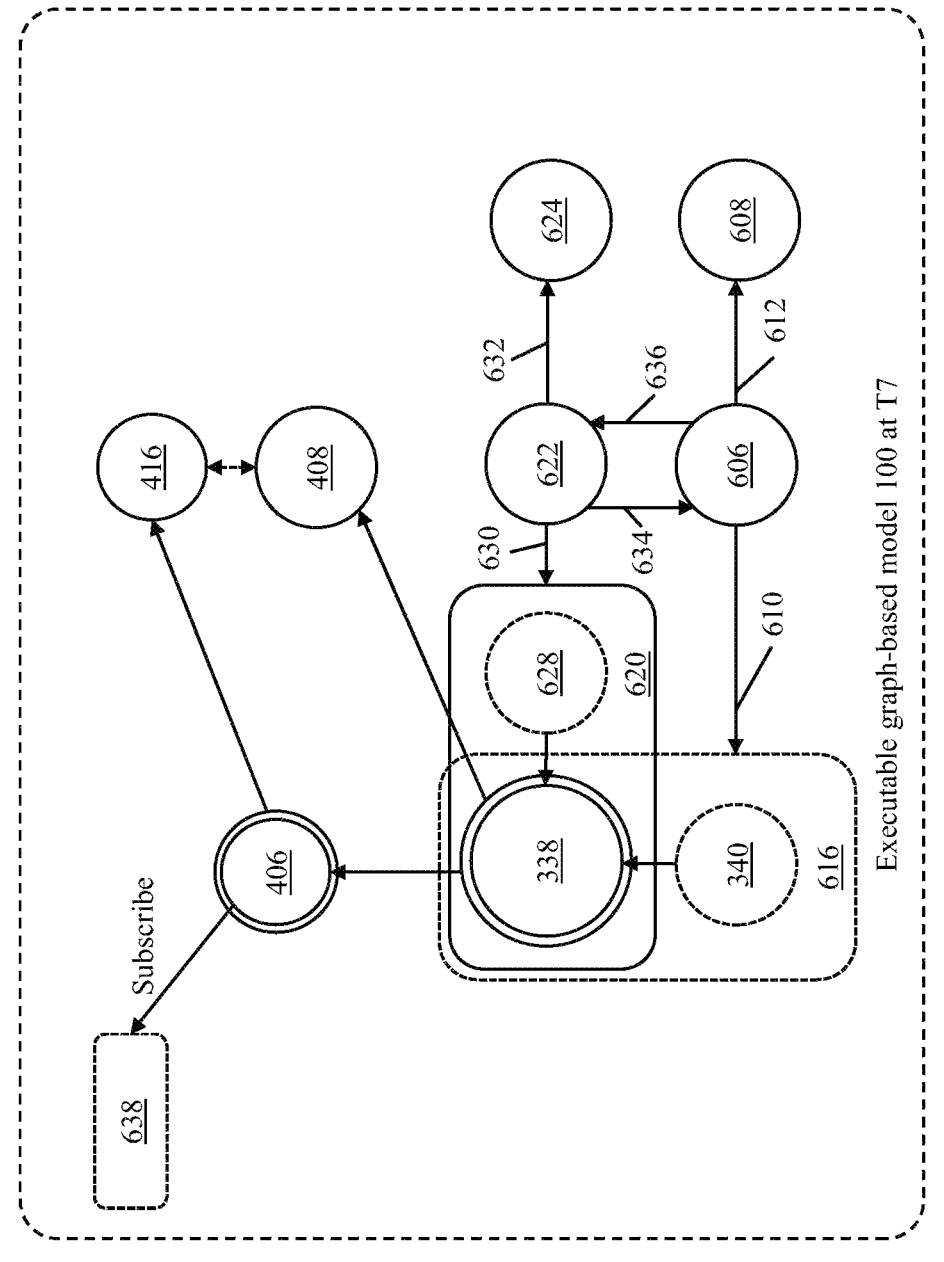

Referring to FIG. 6G, the executable graph-based model 100 at a seventh-time instance (e.g., post the deletion of the node instance 628 and the history node 616) is illustrated. The seventh-time instance is hereinafter referred to as 'T7'. As the node instance 628 and the history node 616 are deleted based on the lapse of the predetermined time period, at T7, the node instance 628 and the node instance 340 are absent in the executable graph-based model 100. Thus, each of the node instance 628 and the node instance 340 is shown by a single dotted circle, indicating that the node instances 628 and 340 are deleted from the overlay system 202. As the node instances 340 and 628 are deleted from the overlay system 202, the memory allocated to the node instances 340 and 628 is freed up. Thus, the resource of the overlay system 202 is efficiently utilized. At T7, the stimuli management module 212 receives a third stimulus 638 of the set of stimuli 232 via the network 234. The third stimulus 638 corresponds to a command-type message. The third stimulus 638 is indicative of a mutation to the node instance 628 of the active node 620 based on the history node 616.

Figure 6H:
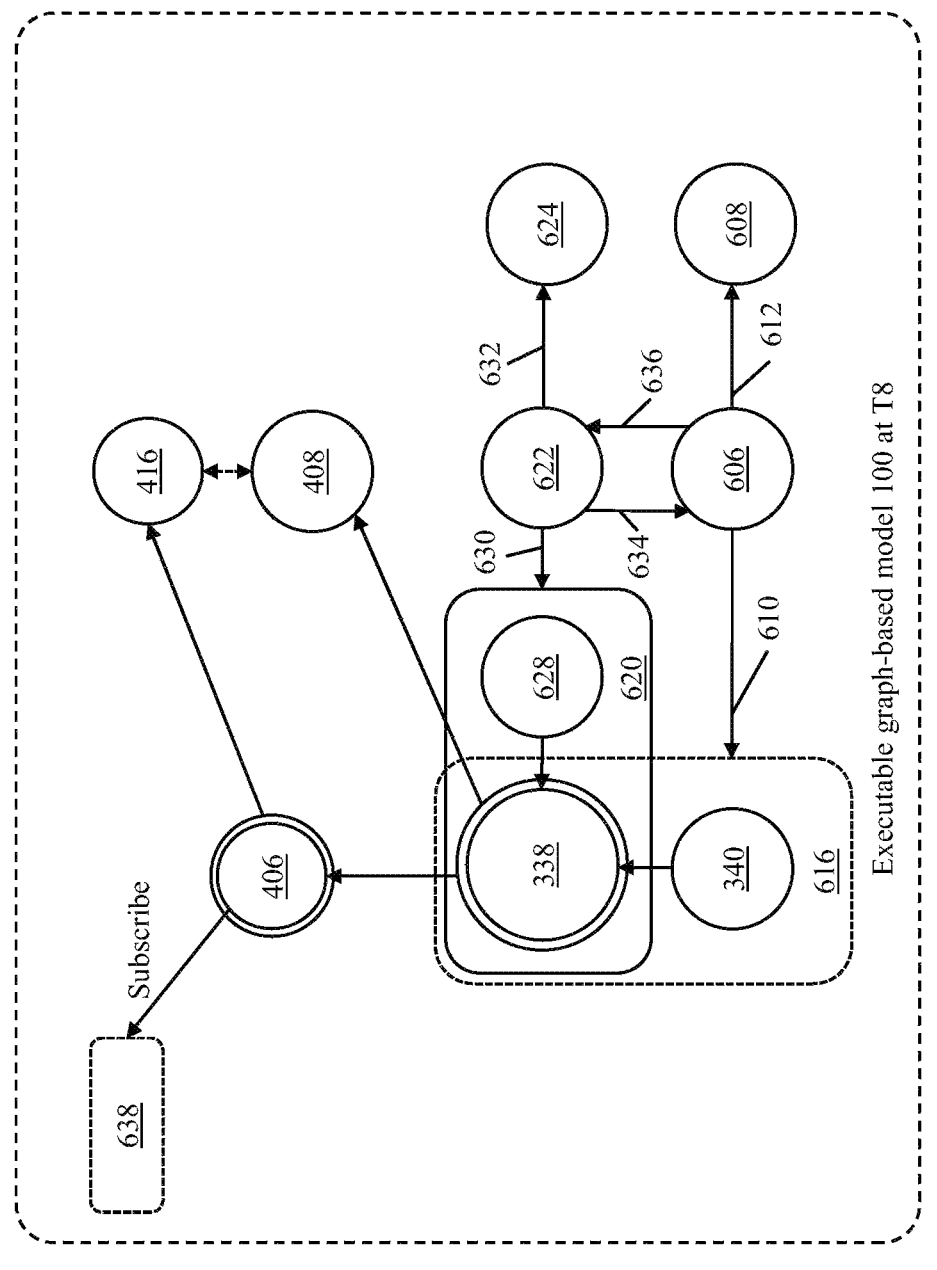

Referring to FIG. 6H, the executable graph-based model 100 at an eighth-time instance (e.g., post the receipt of the third stimulus 638) is illustrated. The eighth-time instance is hereinafter referred to as 'T8'. Upon the reception of the third stimulus 638, the context module 210, in conjunction with the stimuli management module 212, may be configured to determine that the third stimulus 638 is directed to the active node 620 and requires the history node 616. Further, the context module 210, in conjunction with the controller module 206, may be configured to identify the active node 620 in the executable graph-based model 100 based on the third context of the third stimulus 638. Further, the controller module 206 may be configured to identify that the node instance 628 of the active node 620 and the history node 616 are absent in the executable graph-based model 100. Thus, the controller module 206, in conjunction with the history management module 224 and the message management module 222, may be configured to identify the active message node 624 and the history message node 608, associated with the active node 620, in the executable graph-based model 100, based on the third context of the third stimulus 638. The active message node 624 is identified by traversing through the second role node 630, the history edge node 622, and the message role node 632. The history message node 608 is identified by traversing through the second role node 630, the history edge node 622, the third role node 634, the history edge node 606, and the message role node 612.

The controller module 206, in conjunction with the history management module 224 and the message management module 222, may be further configured to create the history node 616 in the executable graph-based model 100 based on the historical message present in the history message node 608. That is to say, the history node 616 is recreated in the executable graph-based model 100 by utilizing the data and transactional information indicated by the historical message represented by the history message node 608. Particularly, the node instance 340 is recreated to recreate the history node 616. The controller module 206, in conjunction with the history management module 224 and the message management module 222, may be further configured to create the node instance 628 in the executable graph-based model 100 based on the history message node 608 and the active message node 624. That is to say, the node instance 628 is recreated in the executable graph-based model 100 by utilizing the historical message and the active message 626 represented by the history message node 608 and the active message node 624, respectively. In an example, the node instance 628 is created by applying the mutation indicated by the active message 626 to the recreated history node 616. Thus, at T8, the executable graph-based model 100 is shown to include the history node 616 and the node instance 628. Each of the recreated node instance 628 and the recreated history node 616 is shown by a single solid circle. Further, the controller module 206, in conjunction with the history management module 224 and the message management module 222, may be configured to execute an operation associated with the third stimulus 638 based on the active node 620 and the history node 616.

Figure 6I:
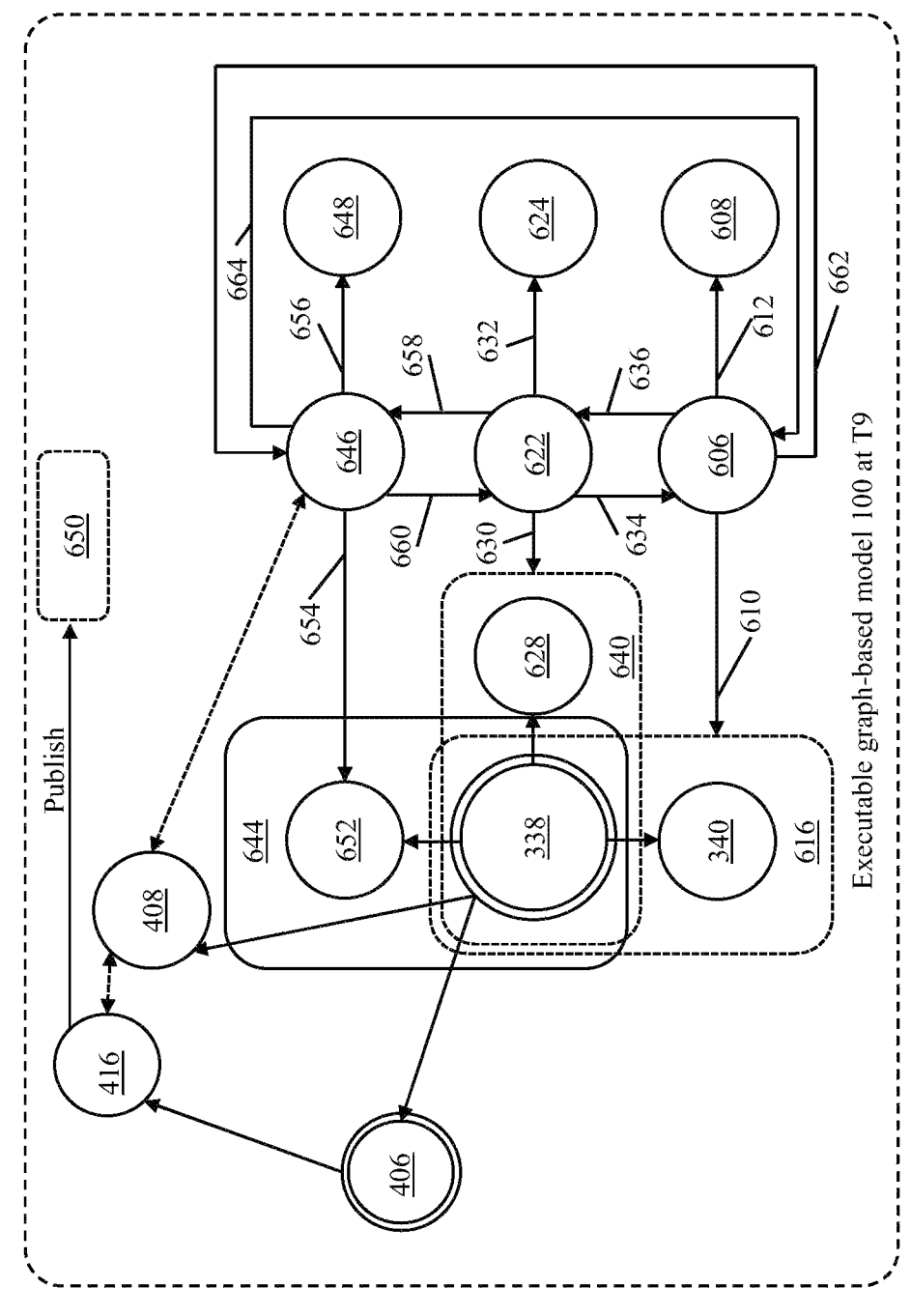

Referring to FIG. 6I, the executable graph-based model 100 at a ninth-time instance (e.g., post the execution of the third stimulus 638) is illustrated. The ninth-time instance is hereinafter referred to as 'T9'. During the execution of the operation associated with the third stimulus 638, the history management module 224 may be configured to identify that the active node 620 is associated with the history overlay node 408. As the history overlay node 408 is associated with the active node 620, the history management module 224, in conjunction with the controller module 206, may be configured to create a clone of the second active version of the active node 336 (i.e., the active node 620) and transfer the history overlay node 408 to the clone of the second active version of the active node 336. Particularly, a clone of the node instance 628 is created. That is to say, the clone of the second active version of the active node 336 includes the node template 338 and a clone of the node instance 628. Further, the transfer of the history overlay node 408 to the clone of the second active version of the active node 336 corresponds to the de-association of the history overlay node 408 from the node instance 628 and the association of the history overlay node 408 with the clone of the node instance 628. The transfer of the history overlay node 408 to the clone of the second active version of the active node 336 results in conversion of the second active version of the active node 336 into a history node 640 and consequently, in the conversion of the active message node 624 into a history message node 624. The active message node 624 is hereinafter referred to as "the history message node 624". The history message node 624 represents a historical message that includes data and transactional information that indicates the mutation to the first active version of the active node 336 that resulted in the creation of the history node 640. The history node 640 includes the node template 338 and the node instance 628. The history management module 224, in conjunction with the controller module 206, may be further configured to execute the operation associated with the third stimulus 638 on the clone of the second active version of the active node 336, thereby resulting in a third active version of the active node 336. The third active version of the active node 336 is interchangeably referred to as "the active node 644".

The execution of the operation associated with the third stimulus 638 corresponds to a mutation of the clone of the second active version of the active node 336 based on the history node 616. Further, a history edge node 646 and an active message node 648 are created in the executable graph-based model 100, based on the creation of the active node 644. The active message node 648 represents an active message 650 that includes data and transactional information that indicates the mutation that resulted in the creation of the active node 644. The history edge node 646 couples the active message node 648 to the active node 644, and the history edge node 646 is further coupled to the history edge node 622. The mutation of the active node 620 corresponds to a modification of the clone of the node instance 628. Thus, the active node 644 includes a node instance 652 and the node template 338. The node instance 652 corresponds to a mutated version of the clone of the node instance 628.

The message handler overlay node 406 is configured to subscribe to and process the third stimulus 638 for executing the operation associated with the third stimulus 638. That is to say, the processing of the third stimulus 638 results in the creation of the third active version of the active node 336 (i.e., the active node 644). The message publisher overlay node 416 is further configured to generate the active message 650 based on the processing of the third stimulus 638 and communicate an indication to the history overlay node 408 for the creation of the history edge node 646 and the active message node 648 in the executable graph-based model 100, based on the creation of the active message 650. Further, the history overlay node 408, based on the indication received from the message publisher overlay node 416, is configured to create the history edge node 646 and the active message node 648. The active message node 648 includes the active message 650 and is associated with the history edge node 646.

The history edge node 646 may be configured to communicate a success message (not shown) to the history overlay node 408, based on the creation of the history edge node 646 and the active message node 648. Further, the history overlay node 408 may be configured to communicate an indication to the message publisher overlay node 416, which is indicative of whether the history edge node 646 and the active message node 648 are successfully created in the executable graph-based model 100. The message publisher overlay node 416 is configured to publish the active message 650 in the executable graph-based model 100 based on the indication that the history edge node 646 and the active message node 648 are successfully created in the executable graph-based model 100. The active message 650 corresponds to an event-type message.

In an embodiment, the history edge node 646 may be configured to communicate a failure message (not shown) to the history overlay node 408, in case the active message node 648 is not created in the executable graph-based model 100. Further, the history overlay node 408 may be configured to communicate an indication to the message publisher overlay node 416, that indicates that the active message node 648 is not created in the executable graph-based model 100. In another embodiment, the history edge node 646 may not be created in the executable graph-based model 100 and thus the history overlay node 408 does not receive any success message or failure message. In such scenarios, the creation of the history edge node 646 and the node instance 652 is rolled back. Further, the active message 648 is published in the executable graph-based model 100, by the message publisher overlay node 416. In such a scenario, the active message 648 indicates that an operation corresponding to the mutation of the node instance 628 in the executable graph-based model 100 has failed.

Referring back to the scenario when the history edge node 646 and the active message node 648 are successfully created in the executable graph-based model 100, the history edge node 646 is configured to couple the active message node 648 to the active node 644 via a fifth role node 654 and a message role node 656. The fifth role node 654 defines a relationship between the history edge node 646 and the active node 644. Similarly, the message role node 656 defines the relationship between the history edge node 646 and the active message node 648. The history edge node 646 is further associated with a sixth role node 658 and a seventh role node 660. The sixth role node 658 and the seventh role node 660 couples the history edge node 646 to the history edge node 622. The sixth role node 658 indicates that the history edge node 646 corresponds to a next history edge node and the seventh role node 660 indicates that the history edge node 622 corresponds to a previous history edge node. The history edge node 646 is additionally associated with an eighth role node 662 and a ninth role node 664. The eighth role node 662 and the ninth role node 664 couples the history edge node 646 to the history edge node 606. The eighth role node 662 indicates that the history edge node 646 corresponds to the latest history edge node and the ninth role node 664 indicates that the history edge node 606 corresponds to an initial history edge node. The role nodes are illustrated as arrows in FIG. 6I to keep the illustration concise and clear.

At T9, the executable graph-based model 100 includes a set of history message nodes that is associated with the active node 644, where the set of history message nodes includes the history message nodes 608 and 624. The executable graph-based model 100 further includes a set of history edge nodes that is associated with the active node 644, where the set of history edge nodes includes the history edge nodes 606, 622, and 646. Further, each history edge node is coupled to one or more remaining history edge nodes by way of one or more role nodes. The history edge nodes and the role nodes enable optimal traversal in the executable graph-based model 100. The historical message represented by a first history message node (i.e., the history message node 608) of the set of history message nodes includes data and transactional information required for the creation of a first history node (i.e., the history node 616) of the set of history nodes. Further, a historical message represented by each remaining history message node of the set of history message nodes includes data and transactional information that indicates a mutation to a corresponding version of the active node 644 that resulted in the creation of a corresponding history node of the set of history nodes. Additionally, the creation of each history node of the set of history nodes, after the first history node, requires the creation of one or more preceding history nodes by utilizing associated history message nodes of the set of history message nodes.

The node instance 652 and the history nodes 616 and 640 are retained in the executable graph-based model 100 for the predetermined time period. Thus, the history management module 224 in conjunction with the controller module 206, may be further configured to delete the node instance 652 and the history nodes 616 and 640 from the overlay system 202, based on a lapse of the predetermined time period after the execution of the operation associated with the third stimulus 638. The deletion of the history node 616 corresponds to a deletion of the node instance 340 of the history node 616. Similarly, the deletion of the history node 640 corresponds to a deletion of the node instance 628 of the history node 640. Thus, at a tenth-time instance (not shown), the node instance 652 and the history nodes 616 and 640 are absent in the executable graph-based model 100. The tenth-time instance is hereinafter referred to as 'T10'.

Although it is described that the executable graph-based model 100 includes one active node, the scope of the present disclosure is not limited to it. In other embodiments, the executable graph-based model 100 may include a plurality of active nodes. In such embodiments, the executable graph-based model 100 further includes a plurality of history message nodes and a plurality of history overlay nodes. Further, each active node of the plurality of active nodes is associated with a set of history message nodes, of the plurality of history message nodes, that represents a set of historical messages linked with a set of historical versions of the corresponding active node. Each active node of the plurality of active nodes is further associated with a set of history overlay nodes, of the plurality of history overlay nodes, that is configured to facilitate the creation and main-tenance of the set of history message nodes.

In reference to the above-described embodiment, at T10, the stimuli management module 212 may be further config-ured to receive a fourth stimulus (not shown) associated with the overlay system 202. The fourth stimulus may correspond to a command-type message or a query-type message. For the sake of ongoing discussion, it is assumed that a fourth context of the fourth stimulus may be indicative of a mutation to the active node 644 based on the history nodes 616 and 640. Further, the controller module 206, in con-junction with the history management module 224 and the message management module 222, may be configured to identify, based on the fourth context of the fourth stimulus, the active node 644 from the plurality of active nodes and one or more history message nodes (i.e., the history message nodes 608 and 624) from the set of history message nodes associated with the active node 644. The controller module 206, in conjunction with the history management module 224 and the message management module 222, may be further configured to create, in the executable graph-based model 100, one or more history nodes (i.e., the history nodes 616 and 640) based on one or more historical messages represented by the one or more history message nodes (i.e., the history message nodes 608 and 624), respectively. Each of the one or more history nodes corresponds to a historical version of the active node 644. The controller module 206, in conjunction with the history management module 224, and the message management module 222, may be config-ured to execute an operation associated with the fourth stimulus based on the active node 644, a set of history overlay nodes (i.e., the history overlay node 408), of the plurality of history overlay nodes, associated with the active node 644, and the created one or more history nodes.

Although it is illustrated that the set of history overlay nodes associated with the active node includes only one history overlay node, the scope of the present disclosure is not limited to it. In other embodiments, the set of history overlay nodes may include more than one history overlay node.

As described above, the controller module 206, in con-junction with the history management module 224 and the message management module 222, may create the set of history message nodes and the set of history nodes associ-ated with the active node 644 based on the set of stimuli 232 that is received prior to the fourth stimulus. Additionally, each history node of the set of history nodes is a version of the active node 644 at an instance when the corresponding stimulus is received. Each stimulus of the set of stimuli 232 corresponds to a command-type message.

The executable graph-based model 100 may further include a plurality of history edge nodes, where a history edge node (such as the history edge node 622), of the plurality of history edge nodes, couples a history message node (such as the history message node 624) to a corre-sponding active node (such as the active node 644) of the plurality of active nodes, and is indicative of an association therebetween. The controller module 206, in conjunction with the history management module 224 and the message management module 222, may be further configured to traverse one or more history edge nodes, associated with an active node (such as the active node 644), to identify the one or more history message nodes (such as the history message nodes 608 and 624) that are required for the creation of the one or more history nodes (i.e., the history nodes 616 and 640), respectively. Additionally, each history edge node, of the one or more history edge nodes, has at least a message role node (such as the message role node 632) and a role node (such as the second role node 630) associated there-with.

To execute the operation associated with the fourth stimu-lus, the controller module 206, in conjunction with the history management module 224, may be further configured to create, based on the set of history overlay nodes (i.e., the history overlay node 408) being associated with the active node 644, a cloned active node (not shown) that corresponds to a clone of a current version of the active node 644. The controller module 206, in conjunction with the history management module 224, may be further configured to transfer the set of history overlay nodes (e.g., the history overlay node 408) to the cloned active node (i.e., the cloned version of the active node 644), where the transfer of the set of history overlay nodes to the cloned active node results in conversion of the current version of the active node 644 into a history node. Additionally, the execution of the operation associated with the fourth stimulus corresponds to a muta-tion of the cloned active node based on the one or more history nodes created for the processing of the fourth stimu-lus. In an example, each of the active node 644 and the cloned active node corresponds to a data node, such that the mutation of the cloned active node corresponds to a modi-fication of data associated with the data node. The controller module 206, in conjunction with the history management module 224, may be further configured to delete the one or more history nodes from the overlay system 202 based on a lapse of a predetermined time period after the execution of the operation associated with the fourth stimulus.

As the active node 644 corresponds to a templatized node that comprises the node template 338, each of the set of history overlay nodes corresponds to an overlay of the node template 338. Additionally, the executable graph-based model 100 further includes a plurality of active message nodes associated with the plurality of active nodes such that an active message node (i.e., the active message node 648) is associated with the active node 644, where the active message node represents an active message that is linked with the current version of the active node 644. Each of the plurality of history message nodes may correspond to an event-type message node. The controller module 206, in conjunction with the history management module 224 and the message management module 222, may be further configured to create, in the executable graph-based model 100, based on the active message node 648 and the set of history message nodes (i.e., the history message nodes 608 and 624), at least the node instance 652 linked with the node template 338, such that the node template 338 and the node instance 652 constitute the active node 644. The node template 338 corresponds to a predefined node structure, whereas the node instance 652 corresponds to an implementation of the node template 338. Additionally, the cloned active node comprises the node template 338 and a cloned node instance that corresponds to a clone of a current version of the node instance 652. Thus, the mutation of the clone of the active node 644 corresponds to a modification of the cloned node instance.

In the present disclosure, data and processing logic are stored separately to ensure segregation and independent control thereof. Therefore, prior to the execution of the operation associated with the first stimulus 602, the data management module 238 in conjunction with the controller module 206, may be configured to determine that at least one of the node template 338, the message handler overlay node 406, the history overlay node 408, and the message publisher overlay node 416 that are required for executing the operation associated with the first stimulus, are currently not loaded in the executable graph-based model 100. Thus, the data management module 238 in conjunction with the controller module 206, may be configured to load the nodes that are currently not loaded, in the executable graph-based model 100, with corresponding data and processing logic. Similarly, prior to the execution of the operation associated with the second stimulus 614, the data management module 238 in conjunction with the controller module 206, may be configured to load, in the executable graph-based model 100 with corresponding data and processing logic, at least one of the node template 338, the message handler overlay node 406, the history overlay node 408, the message publisher overlay node 416, the history edge node 606, and the active message node 608 that are to be utilized for processing of the second stimulus 614. Additionally, prior to the execution of the operation associated with the third stimulus 638, the data management module 238, in conjunction with the controller module 206, may be configured to load, in the executable graph-based model 100 with corresponding data and processing logic, at least one of the node template 338, the message handler overlay node 406, the history overlay node 408, the message publisher overlay node 416, the history edge node 606, the history message node 608, the history edge node 622, and the active message node 608. Similarly, prior to the execution of the operation associated with the fourth stimulus, the data management module 238, in conjunction with the controller module 206, may be configured to load, in the executable graph-based model 100 with corresponding data and processing logic, at least one of the node template 338, the message handler overlay node 406, the history overlay node 408, the message publisher overlay node 416, the history edge node 606, the history message node 608, the history edge node 622, the history message node 624, the history edge node 646, and the active message node 648. The loading operation may be performed similarly as described in FIG. 5.

Although it is described that the active node 644 includes the node template 338 and the node instance 652, the scope of the present disclosure is not limited to it. In other embodiments, the active node 644 comprises the node template 338, and the history overlay node 408 corresponds to an overlay of the node template 338, where the node template 338 corresponds to a predefined node structure. In such an embodiment, the cloned active node comprises the cloned node template that corresponds to a clone of a current version of the node template 338. Thus, the mutation of the cloned active node corresponds to a modification of the cloned node template.

Although it is described that one node instance (i.e., the node instance 340) is associated with the node template 338, the scope of the present disclosure is not limited to it. In other embodiments, more than one node instance may be associated with the node template 338. In such a scenario, in-situ messaging history for each node instance associated with the node template 338 may be facilitated, in the executable graph-based model 100, in a similar manner as the facilitation of in-situ messaging history for the node instance 340.

In an embodiment, the set of history nodes associated with the active node 644 includes the created one or more history nodes, where prior to the creation of the one or more history nodes, at least one other history node is present in the executable graph-based model 100. As a result, the creation of the one or more history nodes is further based on the history node present in the executable graph-based model 100 prior to the processing of the fourth stimulus.

Although it is described that the active node 644 is associated with two history message nodes, the scope of the present disclosure is not limited to it. In other embodiments, more than two or less than two history message nodes may be associated with the active node 644.

Although it is described that only the message handler overlay node 406 and the history overlay node 408 are associated with the active node 336, the scope of the present disclosure is not limited to it. In other embodiments, the active node 336 may be associated with more than two overlay nodes which correspond to different overlay node types. In such a scenario, all the overlay nodes associated with the active node 336 may be transferred from an active version of the active node 336 to a clone of the active version of the active node 336 during execution of operations associated with the second stimulus 614, the third stimulus 638, and the fourth stimulus.

Although FIGS. 6A-6I collectively illustrate the creation, maintenance, and utilization of in-situ messaging history for the templatized version of the executable graph-based model 100, the scope of the present disclosure is not limited to it. In other embodiments, the creation, maintenance, and utilization of in-situ messaging history may be facilitated for a non-templated version of the executable graph-based model 100. The non-templated version of the executable graph-based model 100 includes nodes whose structure is similar to the structure of node 302 described in conjunction with FIG. 3A.

Throughout the description, each node that is represented in a corresponding figure as an inner circle enclosed within an outer circle is an executable node. The inner circle represents its base node, and the outer circle represents an overlay node associated therewith. A coupling between the outer circle and a node indicates that the node is an overlay of the executable node.

Figure 7:
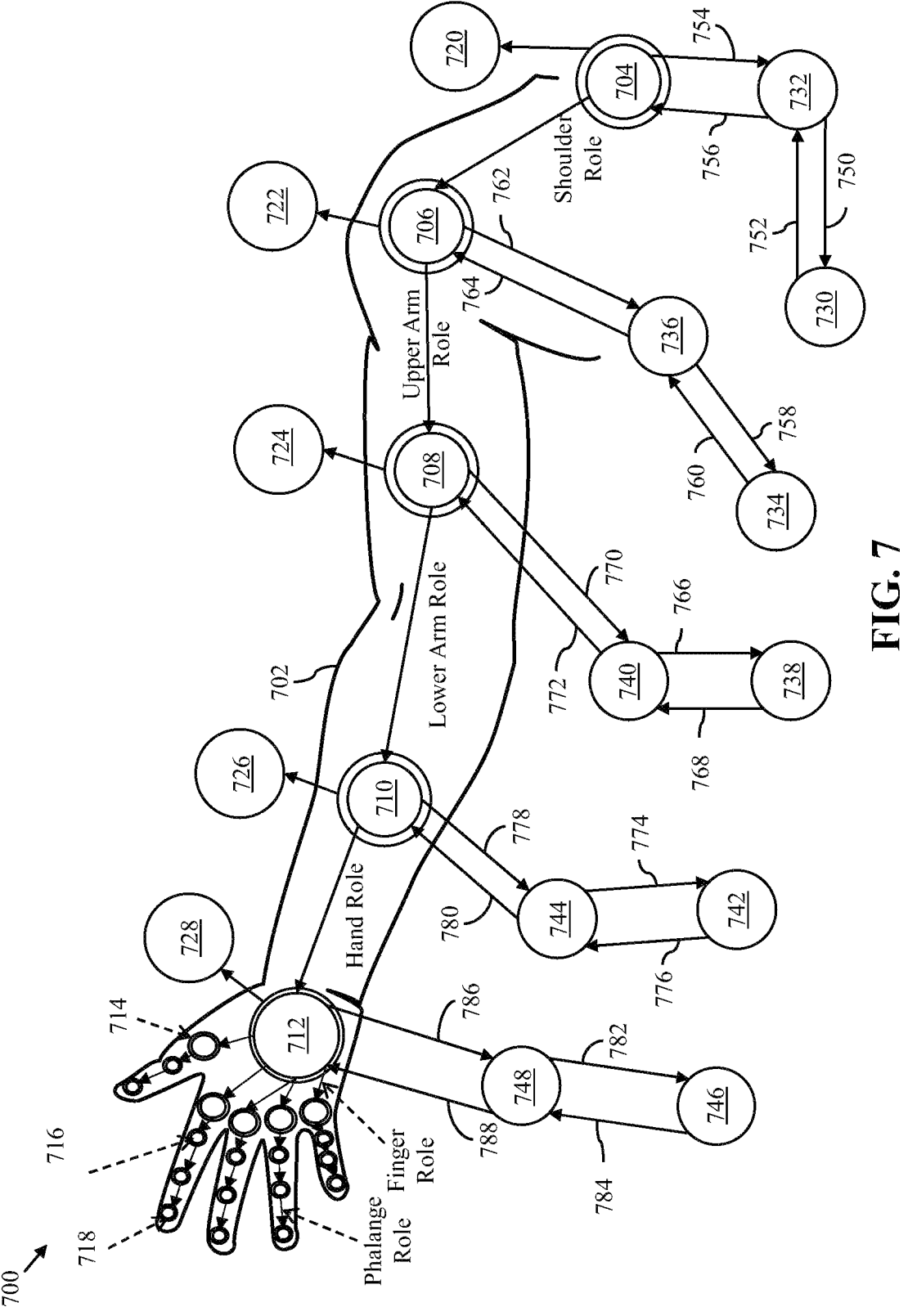
FIG. 7 is a schematic diagram that illustrates an example implementation of in-situ messaging history in an executable graph-based robotic arm model, in accordance with an embodiment of the present disclosure.

FIG. 7 is a schematic diagram that illustrates an example implementation of in-situ messaging history in an executable graph-based robotic arm model 700, in accordance with an embodiment of the present disclosure. Referring to FIG. 7, the executable graph-based robotic arm model 700 corresponds to an executable graph-based model generated for a robotic arm 702, and is hereinafter referred to as the "robotic arm model 700". The robotic arm 702 includes various components such as a brain, a shoulder, an upper arm, a lower arm, a hand, fingers, and phalanges. In such a scenario, the robotic arm model 700 may include active nodes that represent the components of the robotic arm 702. Such active nodes are connected in a hierarchical structure. For example, the brain acts as a root, the shoulder, the upper arm, the lower arm, the hand, the fingers, and some phalanges act as intermediate nodes, and the remaining phalanges act as leaves, of the hierarchical structure of the robotic arm model 700. The root and intermediate active nodes of the hierarchical structure have the edge node type, whereas leaf active nodes of the hierarchical structure have the vertex node type. Further, the executable nodes are linked by way of nodes of role node type (depicted by way of arrows). Hereinafter, each node with the edge node type is referred to as an edge, each node with the vertex node type is referred to as a vertex, and each node with the role node type is referred to as a role.

As shown, an executable graph-based model (e.g., the robotic arm model 700) generated for the robotic arm 702 includes a brain edge 704, a shoulder edge 706, an upper arm edge 708, a lower arm edge 710, a hand edge 712, and various finger edges (for example, a finger edge 714) that represent the brain, the shoulder, the upper arm, the lower arm, the hand, and the fingers of the robotic arm 702, respectively. The robotic arm model 700 further includes various phalange edges (for example, a phalange edge 716) and various phalange vertices (for example, a phalange vertex 718) that represent the phalanges of the robotic arm 702. Phalanges that represent intermediate nodes of the hierarchical structure are edges, whereas phalanges that represent leaf nodes of the hierarchical structure are vertices. The brain edge 704 and the shoulder edge 706 are linked by way of a shoulder role. The shoulder edge 706 and the upper arm edge 708 are linked by way of an upper arm role, whereas the upper arm edge 708 and the lower arm edge 710 are linked by way of a lower arm role. Similarly, the lower arm edge 710 and the hand edge 712 are linked by way of a hand role. Further, the hand edge 712 is linked with each finger edge by way of a finger role. Each finger edge is associated with an adjacent phalange edge by way of a phalange role, two phalange edges are associated with each other by way of corresponding phalange roles, and a phalange edge and a phalange vertex are associated with each other by way of a phalange role. Various nodes of the robotic arm model 700 work in tandem to enable movement of the robotic arm 702. The vertices, edges, and role nodes of the robotic arm model 700, collectively, enable movement of the robotic arm 702.

The robotic arm 702 may be utilized for various applications such as in warehouses for performing pick and place operations, in operation theatres for performing complex surgeries, or the like. Therefore, the robotic arm 702 has to be trained rigorously to mimic the seamless motion of a human arm. Such training requires monitoring improvement in the motion of the robotic arm 702. Hence, the history associated with the nodes of the robotic arm model 700 becomes crucial for monitoring improvement in the motion of the robotic arm 702. Further, the history associated with the nodes of the robotic arm model 700 is to be processed in real-time with minimum latency for monitoring the improvement in the motion of the robotic arm 702.

Each of the brain edge 704, the shoulder edge 706, the upper arm edge 708, the lower arm edge 710, and the hand edge 712 are extended to have history overlay nodes 720-728, respectively. The history overlay nodes 720-728 facilitate the creation, maintenance, and utilization of in-situ messaging history associated with the brain edge 704, the shoulder edge 706, the upper arm edge 708, the lower arm edge 710, and the hand edge 712, respectively. The brain edge 704, the shoulder edge 706, the upper arm edge 708, the lower arm edge 710, and the hand edge 712 correspond to active versions of the corresponding nodes at T10, as explained in FIGS. 6A-6I.

As shown, the history overlay node 720, that is associated with the brain edge 704, facilitates the creation and maintenance of brain edge history message nodes 730 and 732 in the robotic arm model 700. The brain edge history message nodes 730 and 732 include historical messages that are to be utilized for recreating history nodes (not shown) which correspond to historical versions of the brain edge 704 at previous time instances, e.g., T2 and T6, respectively. Similarly, the history overlay node 722, associated with the shoulder edge 706, facilitates the creation and maintenance of shoulder edge history message nodes 734 and 736 in the robotic arm model 700. The shoulder edge history message nodes 734 and 736 include historical messages that are to be utilized for recreating history nodes (not shown) which correspond to historical versions of the shoulder edge 706 at T2 and T6, respectively. Further, the history overlay node 724, associated with the upper arm edge 708, facilitates the creation and maintenance of upper arm edge history message nodes 738 and 740 in the robotic arm model 700. The upper arm edge history message nodes 738 and 740 include historical messages that are to be utilized for recreating history nodes (not shown) which correspond to historical versions of the upper arm edge 708 at T2 and T6, respectively. Additionally, the history overlay node 726, associated with the lower arm edge 710, facilitates the creation and maintenance of lower arm edge history message nodes 742 and 744 in the robotic arm model 700. The lower arm edge history message nodes 742 and 744 include historical messages that are to be utilized for recreating history nodes (not shown) which correspond to historical versions of the lower arm edge 710 at T2 and T6, respectively. Similarly, the history overlay node 728, associated with the hand edge 712, facilitates the creation and maintenance of hand edge history message nodes 746 and 748 in the robotic arm model 700. The hand edge history message nodes 746 and 748 include historical messages that are to be utilized for recreating history nodes (not shown) which correspond to historical versions of the hand edge 712 at T2 and T6, respectively.

Each edge is further associated with history edge nodes and role nodes to enable coupling to the history message nodes. In FIG. 7, the history edge nodes are not shown, and the role nodes are shown as arrows to keep the illustration concise and clear, and should not be considered a limitation of the present disclosure. Thus, role nodes 750 and 752 couple the brain edge history message node 730 to the brain edge history message node 732, whereas role nodes 754 and 756 couple the brain edge history message node 732 to the brain edge 704. The functionalities of the history edge nodes and the role nodes 750-756 remain the same as described in FIGS. 6A-6I. Similarly, role nodes 758 and 760 couple the shoulder edge history message node 734 to the shoulder edge history message node 736, whereas role nodes 762 and 764 couple the shoulder edge history message node 736 to the shoulder edge 706. Further, role nodes 766 and 768 couple the upper arm edge history message node 738 to the upper arm edge history message node 740, whereas role nodes 770 and 772 couple the upper arm edge history message node 740 to the upper arm edge 708. Role nodes 774 and 776 couple the lower arm edge history message node 742 to the lower arm edge history message node 744, whereas role nodes 778 and 780 couple the lower arm edge history message node 744 to the lower arm edge 710. Lastly, role nodes 782 and 784 couple the hand edge history message node 746 to the hand edge history message node 748, whereas role nodes 786 and 788 couple the hand edge history message node 748 to the hand edge 712. The history nodes of the brain edge 704, the shoulder edge 706, the upper arm edge 708, the lower arm edge 710, and the hand edge 712 are not stored in the robotic arm model 700 and instead the brain edge history message nodes 730 and 732, the shoulder edge history message nodes 734 and 736, the upper arm edge history message nodes 738 and 740, the lower arm edge history message nodes 742 and 744, and the hand edge history message nodes 746 and 748 are stored, as history message nodes require less memory space in comparison to history nodes. Thus, resource utilization in the robotic arm model 700 is improved.

The robotic arm model 700 corresponds to the executable graph-based model 100 present in the overlay system 202. In operation, the stimuli management module 212 receives a fifth stimulus. The fifth stimulus is a command. The command is associated with a fifth context. The context module 210, in conjunction with the stimuli management module 212, determines that the fifth stimulus is directed to the brain edge 704, the shoulder edge 706, the upper arm edge 708, the lower arm edge 710, and the hand edge 712. The stimuli management module 212 further determines that the fifth stimulus corresponds to a command that indicates a requirement to monitor improvement in the motion of the robotic arm 702.

Subsequently, the stimuli management module 212, in conjunction with the controller module 206, identifies the brain edge 704, the shoulder edge 706, the upper arm edge 708, the lower arm edge 710, and the hand edge 712, in the robotic arm model 700. Further, the stimuli management module 212, in conjunction with the controller module 206, identifies that the history overlay nodes 720-728 are associated with the brain edge 704, the shoulder edge 706, the upper arm edge 708, the lower arm edge 710, and the hand edge 712, respectively. Thus, the history management module 224, in conjunction with the controller module 206 and the message management module 222, traverses the history edge nodes and role nodes corresponding to the brain edge 704, the shoulder edge 706, the upper arm edge 708, the lower arm edge 710, and the hand edge 712, to identify the brain edge history message nodes 730 and 732, the shoulder edge history message nodes 734 and 736, the upper arm edge history message nodes 738 and 740, the lower arm edge history message nodes 742 and 744, and the hand edge history message nodes 746 and 748. Further, the history management module 224, in conjunction with the controller module 206 and the message management module 222, creates the history nodes associated with the brain edge 704 based on the brain edge history message nodes 730 and 732. That is to say, the history nodes associated with the brain edge 704 are recreated in the robotic arm model 700 by utilizing the brain edge history message nodes 730 and 732. Similarly, the history nodes associated with the shoulder edge 706 are created based on the shoulder edge history message nodes 734 and 736, and the history nodes associated with the upper arm edge 708 are created based on the upper arm edge history message nodes 738 and 740. Additionally, the history nodes associated with the lower arm edge 710 are created based on the lower arm edge history message nodes 742 and 744, and the history nodes associated with the hand edge 712 are created based on the hand edge history message nodes 746 and 748.

The controller module 206 then executes an operation associated with the fifth stimulus based on the brain edge 704, the shoulder edge 706, the upper arm edge 708, the lower arm edge 710, the hand edge 712, and the created history nodes. The operation includes the identification of improvement in the performance of the robotic arm 702 from T1 to T10 or decline in the performance of the robotic arm 702 from T1 to T10. The controller module 206 further generates an outcome (such as the outcome 236). The outcome may indicate improvement in the performance of the robotic arm 702 from T1 to T10 or decline in the performance of the robotic arm 702 from T1 to T10. Thus, the in-situ messaging history of the robotic arm model 700 is utilized. As the history associated with the robotic arm 702 and the processing logic required for monitoring the improvement in the motion of the robotic arm 702 is present in-situ in the robotic arm model 700, the latency associated with the monitoring of the improvement in the motion of the robotic arm 702 is significantly reduced (i.e., near-zero latency) in comparison to conventional techniques.

Figure 8:
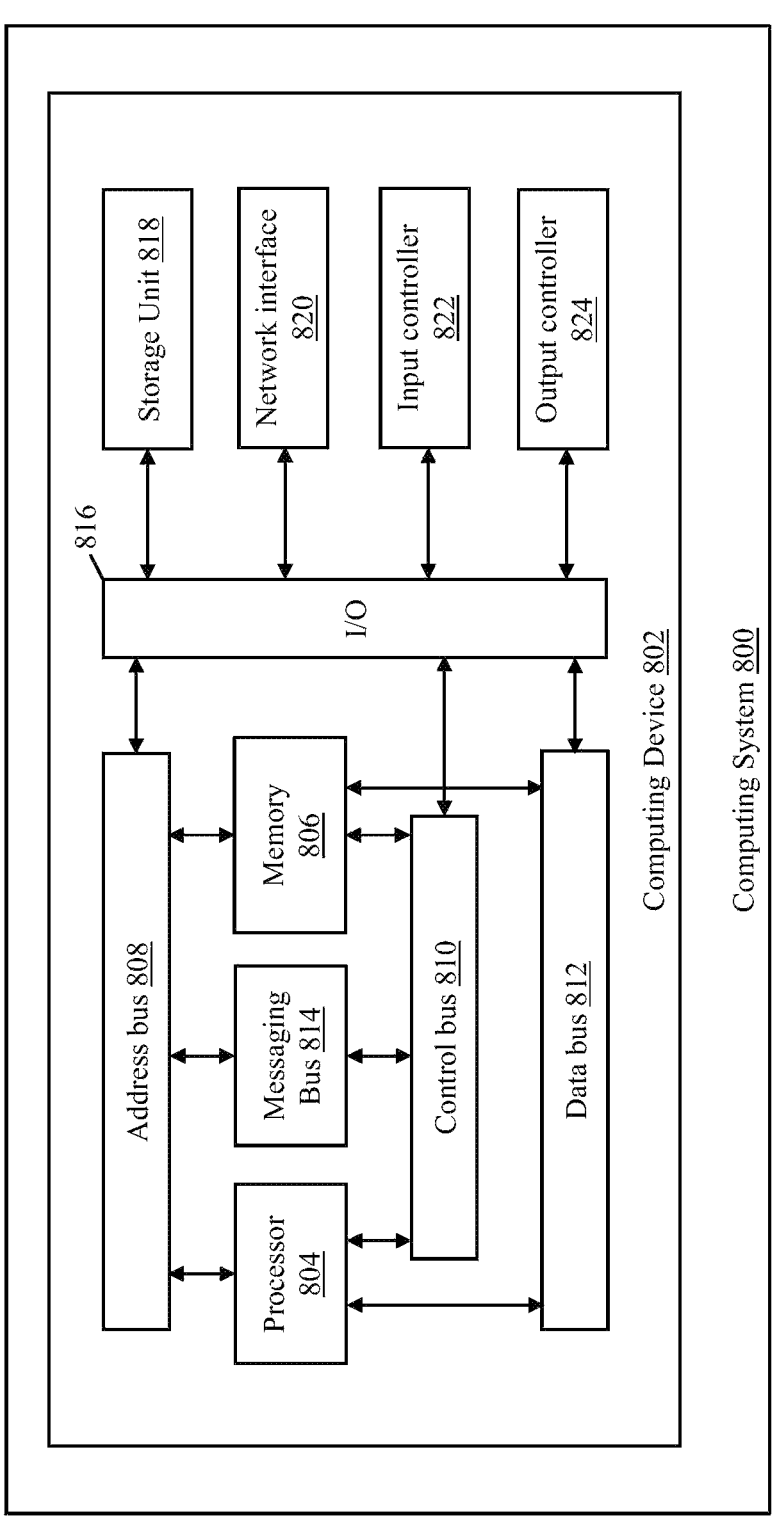
FIG. 8 shows an example computing system for carrying out the methods of the present disclosure, in accordance with an embodiment of the present disclosure.

FIG. 8 shows an example computing system 800 for carrying out the methods of the present disclosure, in accordance with an embodiment of the present disclosure. Specifically, FIG. 8 shows a block diagram of an embodiment of the computing system 800 according to example embodiments of the present disclosure.

The computing system 800 may be configured to perform any of the operations disclosed herein, such as, for example, any of the operations discussed with reference to the functional modules described in relation to FIG. 2. The computing system 800 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 800 is a distributed system configured to function using multiple computing machines interconnected via a data network or bus system.

The computing system 800 includes computing devices (such as a computing device 802). The computing device 802 includes one or more processors (such as a processor 804) and a memory 806. The processor 804 may be any general-purpose processor(s) configured to execute a set of instructions. For example, the processor 804 may be a processor core, a multiprocessor, a reconfigurable processor, a microcontroller, a digital signal processor (DSP), an application-specific integrated circuit (ASIC), a graphics processing unit (GPU), a neural processing unit (NPU), an accelerated processing unit (APU), a brain processing unit (BPU), a data processing unit (DPU), a holographic processing unit (HPU), an intelligent processing unit (IPU), a microprocessor/microcontroller unit (MPU/MCU), a radio processing unit (RPU), a tensor processing unit (TPU), a vector processing unit (VPU), a wearable processing unit (WPU), a field programmable gate array (FPGA), a programmable logic device (PLD), a controller, a state machine, gated logic, discrete hardware component, any other processing unit, or any combination or multiplicity thereof. In one embodiment, the processor 804 may be multiple processing units, a single processing core, multiple processing cores, special purpose processing cores, co-processors, or any combination thereof. The processor 804 may be communicatively coupled to the memory 806 via an address bus 808, a control bus 810, a data bus 812, and a messaging bus 814.

The memory 806 may include non-volatile memories such as a read-only memory (ROM), a programmable read-only memory (PROM), an erasable programmable read-only memory (EPROM), a flash memory, or any other device capable of storing program instructions or data with or without applied power. The memory 806 may also include volatile memories, such as a random-access memory (RAM), a static random-access memory (SRAM), a dynamic random-access memory (DRAM), and a synchronous dynamic random-access memory (SDRAM). The memory 806 may include single or multiple memory modules. While the memory 806 is depicted as part of the computing device 802, a person skilled in the art will recognize that the memory 806 can be separate from the computing device 802.

The memory 806 may store information that can be accessed by the processor 804. For instance, the memory 806 (e.g., one or more non-transitory computer-readable storage mediums, memory devices) may include computer-readable instructions (not shown) that can be executed by the processor 804. The computer-readable instructions may be software written in any suitable programming language or may be implemented in hardware. Additionally, or alternatively, the computer-readable instructions may be executed in logically and/or virtually separate threads on the processor 804. For example, the memory 806 may store instructions (not shown) that when executed by the processor 804 cause the processor 804 to perform operations such as any of the operations and functions for which the computing system 800 is configured, as described herein. Additionally, or alternatively, the memory 806 may store data (not shown) that can be obtained, received, accessed, written, manipulated, created, and/or stored. The data can include, for instance, the data and/or information described herein in relation to FIGS. 1-7. In some implementations, the computing device 802 may obtain from and/or store data in one or more memory device(s) that are remote from the computing system 800.

The computing device 802 may further include an input/output (I/O) interface 816 communicatively coupled to the address bus 808, the control bus 810, and the data bus 812. The data bus 812 and messaging bus 814 may include a plurality of tunnels that may support parallel execution of messages by the overlay system 202. The I/O interface 816 is configured to couple to one or more external devices (e.g., to receive and send data from/to one or more external devices). Such external devices, along with the various internal devices, may also be known as peripheral devices. The I/O interface 816 may include both electrical and physical connections for operably coupling the various peripheral devices to the computing device 802. The I/O interface 816 may be configured to communicate data, addresses, and control signals between the peripheral devices and the computing device 802. The I/O interface 816 may be configured to implement any standard interface, such as a small computer system interface (SCSI), a serial-attached SCSI (SAS), a fiber channel, a peripheral component interconnect (PCI), a PCI express (PCIe), a serial bus, a parallel bus, an advanced technology attachment (ATA), a serial ATA (SATA), a universal serial bus (USB), Thunderbolt, FireWire, various video buses, and the like. The I/O interface 816 is configured to implement only one interface or bus technology. Alternatively, the I/O interface 816 is configured to implement multiple interfaces or bus technologies. The I/O interface 816 may include one or more buffers for buffering transmissions between one or more external devices, internal devices, the computing device 802, or the processor 804. The I/O interface 816 may couple the computing device 802 to various input devices, including mice, touch screens, scanners, biometric readers, electronic digitizers, sensors, receivers, touchpads, trackballs, cameras, microphones, keyboards, any other pointing devices, or any combinations thereof. The I/O interface 816 may couple the computing device 802 to various output devices, including video displays, speakers, printers, projectors, tactile feedback devices, automation control, robotic components, actuators, motors, fans, solenoids, valves, pumps, transmitters, signal emitters, lights, and so forth.

The computing system 800 may further include a storage unit 818, a network interface 820, an input controller 822, and an output controller 824. The storage unit 818, the network interface 820, the input controller 822, and the output controller 824 are communicatively coupled to the central control unit (e.g., the memory 806, the address bus 808, the control bus 810, and the data bus 812) via the I/O interface 816. The network interface 820 communicatively couples the computing system 800 to one or more networks such as wide area networks (WAN), local area networks (LAN), intranets, the Internet, wireless access networks, wired networks, mobile networks, telephone networks, optical networks, or combinations thereof. The network interface 820 may facilitate communication with packet-switched networks or circuit-switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

The storage unit 818 is a computer-readable medium, preferably a non-transitory computer-readable medium, comprising one or more programs, the one or more programs comprising instructions which when executed by the processor 804 cause the computing system 800 to perform the method steps of the present disclosure. Alternatively, the storage unit 818 is a transitory computer-readable medium. The storage unit 818 can include a hard disk, a floppy disk, a compact disc read-only memory (CD-ROM), a digital versatile disc (DVD), a Blu-ray disc, a magnetic tape, a flash memory, another non-volatile memory device, a solid-state drive (SSD), any magnetic storage device, any optical storage device, any electrical storage device, any semiconductor storage device, any physical-based storage device, any other data storage device, or any combination or multiplicity thereof. In one embodiment, the storage unit 818 stores one or more operating systems, application programs, program modules, data, or any other information. The storage unit 818 is part of the computing device 802. Alternatively, the storage unit 818 is part of one or more other computing machines that are in communication with the computing device 802, such as servers, database servers, cloud storage, network attached storage, and so forth.

The input controller 822 may include suitable logic, circuitry, interfaces, and/or code, executable by the circuitry, that may be configured to control one or more input devices that may be configured to receive an input (the set of stimuli 232) for the overlay system 202. The output controller 824 may include suitable logic, circuitry, interfaces, and/or code, executable by the circuitry, that may be configured to control one or more output devices that may be configured to render/output the outcome of the operation executed to process the received input (the set of stimuli 232).

Figure 9B:
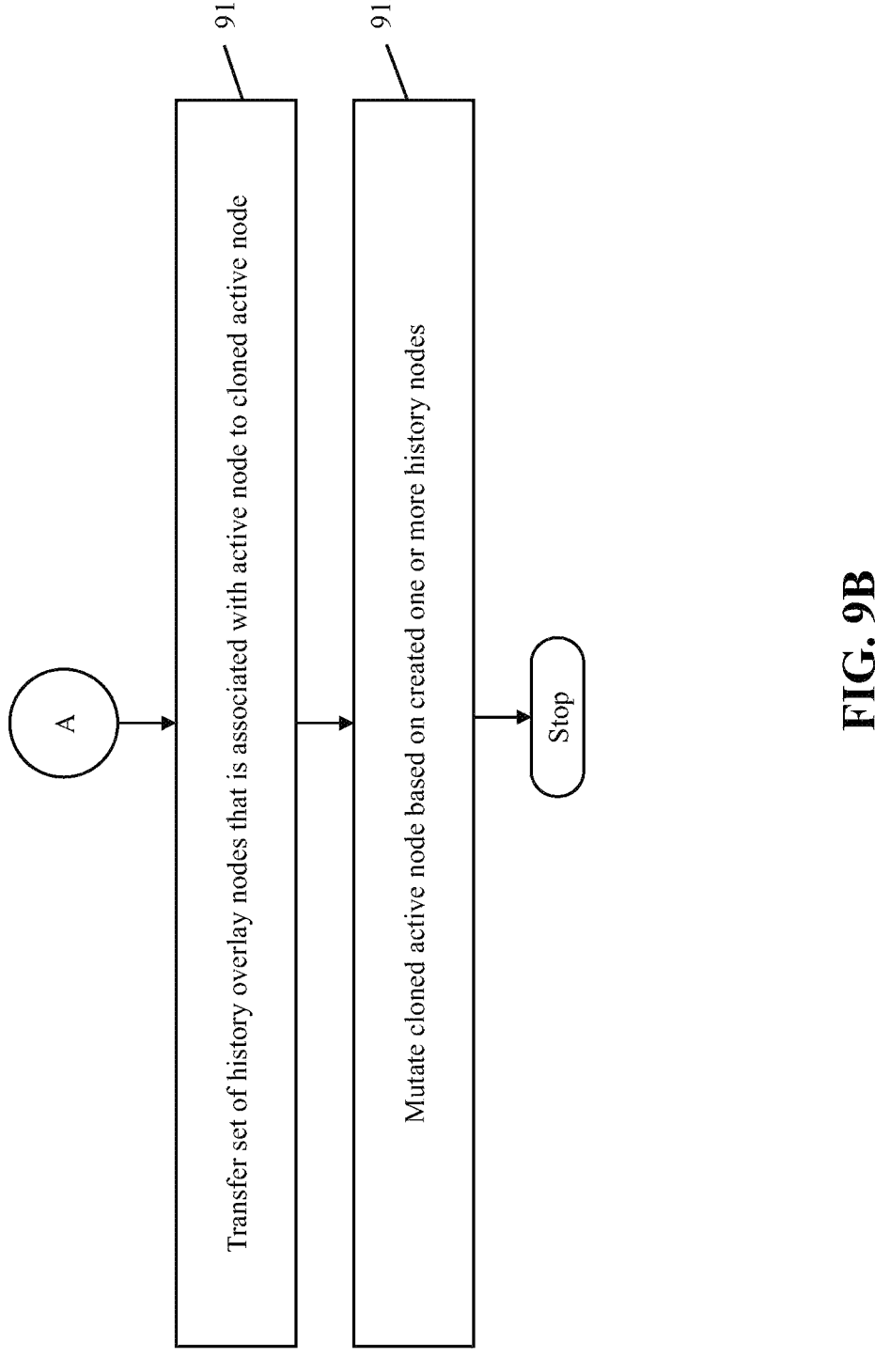

FIGS. 9A and 9B, collectively represents a flowchart 900 that illustrates a method for facilitating in-situ messaging history using the executable graph-based model 100, in accordance with an embodiment of the present disclosure. Referring to FIG. 9A, at 902, the processing circuitry (e.g., the stimuli management module 212) is configured to receive a stimulus (e.g., the fourth stimulus) associated with the overlay system 202. The stimulus may correspond to a command-type message or a query-type message. At 904, the processing circuitry (e.g., the controller module 206, in conjunction with the history management module 224 and the message management module 222), is configured to identify an active node (e.g., the active node 644) from the plurality of active nodes and one or more history message nodes (e.g., the history message nodes 608 and 624) from the plurality of history message nodes associated with the active node, in overlay system 202, based on a context of the received stimulus.

At 906, the processing circuitry (e.g., the controller module 206, in conjunction with the history management module 224 and the message management module 222) is configured to create one or more history nodes (e.g., the history nodes 616 and 640) based on one or more historical messages represented by the identified one or more history message nodes. At 908, the processing circuitry (e.g., the controller module 206, in conjunction with the history management module 224) is further configured to create a clone of the active node based on a set of history overlay nodes (i.e., the history overlay node 408) associated with the active node.

Referring to FIG. 9B, at 910, the processing circuitry (e.g., the controller module 206, in conjunction with the history management module 224) is further configured to transfer the set of history overlay nodes that is associated with the active node to the cloned active node. At 912, the processing circuitry (e.g., the controller module 206, in conjunction with the history management module 224) is further configured to mutate the cloned active node based on the created one or more history nodes (the history nodes 616 and 640). Thus, the operation associated with the stimulus is executed.

The disclosed embodiments encompass numerous advantages including an efficient and seamless approach for facilitation of in-situ messaging history using executable graph-based models. The systems and methods disclosed herein provide an ability to dynamically utilize the in-situ messaging history in the executable graph-based model 100. Moreover, the disclosed system and methods may exhibit a consistent performance even with limited storage and processing resources as all the data and processing logic associated with the executable graph-based model 100 is loaded as per the requirement thereof. The systems and methods disclosed herein allow for the segregation of data and processing logic and hence ensure mutual independence thereof. Dynamic utilization of in-situ messaging history allows for a significant reduction in latency during the execution of operations. Application areas of the systems and methods disclosed herein may include, but are not limited to, industrial processes, robotics, home security, automation industry, warehouse, or the like.

Certain embodiments of the disclosure may be found in the disclosed systems, methods, and non-transitory computer-readable medium, for facilitating in-situ messaging history in overlay systems. The methods and systems disclosed herein include various operations performed by the processing circuitry (e.g., the controller module 206, the context module 210, the stimuli management module 212, the history management module 224, any other element of the overlay system 202, or a combination of two or more elements of the overlay system 202). The overlay system disclosed herein includes the storage element configured to store an executable graph-based model that comprises a plurality of history message nodes, a plurality of history overlay nodes, and a plurality of active nodes. Further, each active node is associated with a set of history message nodes, of the plurality of history message nodes, that represents a set of historical messages linked with a set of historical versions of the corresponding active node. Each active node is further associated with a set of history overlay nodes, of the plurality of history overlay nodes, that is configured to facilitate the creation and maintenance of the set of history message nodes. The overlay system further includes the processing circuitry that is coupled to the storage element. The processing circuitry is configured to receive a first stimulus associated with the overlay system. The processing circuitry is further configured to identify, based on a first context of the first stimulus, a first active node from the plurality of active nodes and one or more history message nodes from a first set of history message nodes associated with the first active node. Further, the processing circuitry is configured to create, in the executable graph-based model, one or more history nodes based on one or more historical messages represented by the one or more history message nodes, respectively. Each of the one or more history nodes corresponds to a historical version of the first active node. The processing circuitry is further configured to execute an operation associated with the first stimulus based on the first active node, a first set of history overlay nodes, of the plurality of history overlay nodes, associated with the first active node, and the created one or more history nodes.

In some embodiments, the executable graph-based model further comprises a plurality of history edge nodes, where a history edge node, of the plurality of history edge nodes, couples a history message node to an active node, and is indicative of an association therebetween. The processing circuitry is further configured to traverse one or more history edge nodes, associated with the first active node, to identify the one or more history message nodes that are required for the creation of the one or more history nodes, respectively.

In some embodiments, each history edge node, of the one or more history edge nodes, has at least a message role node and a first role node associated therewith. The message role node defines a relationship between the corresponding history edge node and a history message node coupled thereto, whereas the first role node defines a relationship between the corresponding history edge node and the first active node coupled thereto.

In some embodiments, prior to the execution of the operation associated with the first stimulus, the processing circuitry is further configured to load, in the executable graph-based model, at least one of a group consisting of (i) the first active node, (ii) the one or more history message nodes, (iii) the one or more history edge nodes, and (iv) the first set of history overlay nodes, with corresponding data and processing logic.

In some embodiments, a first set of history nodes is associated with the first active node, with the first set of history nodes comprising the created one or more history nodes. Additionally, a first historical message represented by a first history message node of the first set of history message nodes includes data and transactional information required for the creation of a first history node of the first set of history nodes. Further, a historical message represented by each remaining history message node of the first set of history message nodes includes data and transactional information that indicates a mutation to a corresponding version of the first active node that resulted in the creation of a corresponding history node of the first set of history nodes. Additionally, the creation of each history node of the first set of history nodes, after the first history node, requires the creation of one or more preceding history nodes by utilizing associated history message nodes of the first set of history message nodes.

In some embodiments, the processing circuitry is further configured to delete the one or more history nodes from the overlay system based on a lapse of a predetermined time period.

In some embodiments, to execute the operation associated with the first stimulus, the processing circuitry is further configured to create, based on the first set of history overlay nodes being associated with the first active node, a cloned first active node that corresponds to a clone of a current version of the first active node. The processing circuitry is further configured to transfer the first set of history overlay nodes to the cloned first active node, where the transfer of the first set of history overlay nodes to the cloned first active node results in conversion of the current version of the first active node into a history node. The execution of the operation associated with the first stimulus corresponds to a mutation of the cloned first active node based on the one or more history nodes created for the processing of the first stimulus.

In some embodiments, each of the first active node and the cloned first active node corresponds to a data node, and the mutation of the cloned first active node corresponds to modification of data associated with the data node.

In some embodiments, the first active node corresponds to a templatized node that comprises a first node template, and each of the first set of history overlay nodes corresponds to an overlay of the first node template. The executable graph-based model further comprises a plurality of active message nodes associated with the plurality of active nodes such that an active message node is associated with the first active node, where the active message node represents an active message that is linked with the current version of the first active node. The processing circuitry is further configured to create, in the executable graph-based model, based on the active message node and the first set of history message nodes, at least a first node instance linked with the first node template, such that the first node template and the first node instance constitute the first active node. The first node template corresponds to a predefined node structure, whereas the first node instance corresponds to an implementation of the first node template. Additionally, the cloned first active node comprises the first node template and a cloned first node instance that corresponds to a clone of a current version of the first node instance. The mutation of the cloned first active node corresponds to a modification of the cloned first node instance. Each of the one or more history nodes corresponds to a templatized node that comprises the first node template and a history node instance.

In some embodiments, each of the plurality of active message nodes corresponds to an event-type message node.

In some embodiments, the first active node corresponds to a templatized node that comprises a first node template, and each of the first set of history overlay nodes corresponds to an overlay of the first node template. The first node template corresponds to a predefined node structure. The cloned first active node comprises a cloned first node template that corresponds to a clone of a current version of the first node template. The mutation of the cloned first active node corresponds to a modification of the cloned first node template.

In some embodiments, each of the plurality of history message nodes corresponds to an event-type message node.

In some embodiments, based on a set of stimuli that is received prior to the first stimulus, the processing circuitry is further configured to create the first set of history message nodes and a first set of history nodes associated with the first active node. Each history node of the first set of history nodes is a version of the first active node at an instance when the corresponding stimulus is received.

In some embodiments, each stimulus of the set of stimuli corresponds to a command-type message.

In some embodiments, the processing circuitry is further configured to receive a second stimulus prior to the set of stimuli and create, based on the second stimulus, a first active version of the first active node, with the first set of history overlay nodes associated therewith. A first history edge node and a first active message node are created in the executable graph-based model based on the creation of the first active version of the first active node. The first active message node represents a first active message that includes data and transactional information required for the creation of the first active version of the first active node. Further, the first history edge node couples the first active message node to the first active version of the first active node.

In some embodiments, the executable graph-based model further comprises a message handler overlay node associated with the first active version of the first active node, and a message publisher overlay node associated with the message handler overlay node. The first active version of the first active node corresponds to a templatized node that comprises a first node template, and each of the first set of history overlay nodes corresponds to an overlay of the first node template. Further, the message handler overlay node is configured to subscribe to and process the second stimulus. The processing of the second stimulus results in the creation of at least a first node instance linked with the first node template, such that the first node template and the first node instance constitute the first active version of the first active node. The first node template corresponds to a predefined node structure, whereas the first node instance corresponds to an implementation of the first node template. A first history overlay node of the first set of history overlay nodes is associated with the message publisher overlay node. Additionally, the message publisher overlay node is configured to generate the first active message based on the processing of the second stimulus and communicate an indication to the first history overlay node for the creation of the first history edge node and the first active message node in the executable graph-based model, based on the creation of the first active message. The first history overlay node, based on the indication received from the message publisher overlay node, is configured to create the first history edge node and the first active message node such that the first active message node includes the first active message and is associated with the first history edge node.

In some embodiments, the processing circuitry is further configured to delete the first node instance from the overlay system based on a lapse of a predetermined time period.

In some embodiments, the processing circuitry is further configured to receive a third stimulus, of the set of stimuli, create a clone of the first active version of the first active node based on the third stimulus, and transfer the first set of history overlay nodes to the clone of the first active version of the first active node. The transfer of the first set of history overlay nodes to the clone of the first active version of the first active node results in conversion of the first active version of the first active node into a first history node, and consequently, in the conversion of the first active message node into a first history message node. Further, the processing circuitry is configured to execute an operation associated with the third stimulus on the clone of the first active version of the first active node, thereby resulting in a second active version of the first active node. The execution of the operation associated with the third stimulus corresponds to a mutation of the clone of the first active version of the first active node. A second history edge node and a second active message node are created in the executable graph-based model, based on the creation of the second active version of the first active node. Additionally, the second active message node represents a second active message that includes data and transactional information that indicates the mutation that resulted in the creation of the second active version of the first active node. The second history edge node couples the second active message node to the second active version of the first active node, and the second history edge node is further coupled to the first history edge node.

In some embodiments, the first active version of the first active node corresponds to a templatized node that comprises a first node template, and each of the first set of history overlay nodes corresponds to an overlay of the first node template. Upon the receipt of the third stimulus, the processing circuitry is configured to create at least a first node instance linked to the first node template based on the first active message node, such that the first node template and the first node instance constitute the first active version of the first active node. The first node template corresponds to a predefined node structure, whereas the first node instance corresponds to an implementation of the first node template. The clone of the first active version of the first active node corresponds to the first node template and a clone of the first node instance, and the mutation of the clone of the first active version of the first active node corresponds to a modification of the clone of the first node instance.

In some embodiments, the executable graph-based model further comprises a message handler overlay node associated with the first active version of the first active node, and a message publisher overlay node associated with the message handler overlay node. The message handler overlay node is configured to subscribe to and process the third stimulus, where the processing of the third stimulus results in the creation of the second active version of the first active node. A first history overlay node of the first set of history overlay nodes is associated with the message publisher overlay node. Further, the message publisher overlay node is configured to generate the second active message based on the processing of the third stimulus, and communicate an indication to the first history overlay node for the creation of the second history edge node and the second active message node in the executable graph-based model, based on the creation of the second active message. Further, the first history overlay node, based on the indication received from the message publisher overlay node, is configured to create the second history edge node and the second active message node such that the second active message node includes the second active message and is associated with the second history edge node.

In some embodiments, the processing circuitry is further configured to delete the first history node from the overlay system based on a lapse of a predetermined time period.

In some embodiments, the second active version of the first active node corresponds to a version of the first active node utilized for executing the operation associated with the first stimulus.

In some embodiments, the processing circuitry is further configured to receive a fourth stimulus of the set of stimuli, create a clone of the second active version of the first active node based on the fourth stimulus, and transfer the first set of history overlay nodes to the clone of the second active version of the first active node. Further, the transfer of the first set of history overlay nodes to the clone of the second active version of the first active node results in conversion of the second active version of the first active node into a second history node, and consequently, in the conversion of the second active message node into a second history message node. The processing circuitry is further configured to execute an operation associated with the fourth stimulus on the clone of the second active version of the first active node, thereby resulting in a third active version of the first active node. Further, the execution of the operation associated with the fourth stimulus corresponds to a mutation of the clone of the second active version of the first active node. A third history edge node and a third active message node are created in the executable graph-based model, based on the creation of the third active version of the first active node. Further, the third active message node represents a third active message that includes data and transactional information that indicates the mutation that resulted in the creation of the third active version of the first active node. Also, the third history edge node couples the third active message node to the third active version of the first active node, and the third history edge node is further coupled to the second history edge node.

In some embodiments, the first history edge node and the second history edge node are coupled to each other by way of two or more role nodes, with each role node defining a relationship therebetween. Additionally, the second history edge node and the third history edge node are coupled to each other by way of two or more role nodes, with each role node defining a relationship therebetween.

In some embodiments, the processing circuitry is further configured to delete the second history node from the overlay system based on a lapse of a predetermined time period.

In some embodiments, the third active version of the first active node corresponds to a version of the first active node utilized for executing the operation associated with the first stimulus.

In some embodiments, a first set of history nodes is associated with the first active node, with the first set of history nodes comprising the created one or more history nodes. Additionally, prior to the creation of the one or more history nodes, at least one other history node is present in the executable graph-based model. The creation of the one or more history nodes is further based on the history node present in the executable graph-based model prior to the processing of the first stimulus.

In some embodiments, the first stimulus corresponds to one of a group consisting of a command-type message and a query-type message.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems, and methods for facilitating in-situ messaging history in executable graph-based models. While various embodiments of the disclosed systems and methods have been described above, it should be understood that they have been presented for purposes of example only, and not limitations. It is not exhaustive and does not limit the present disclosure to the precise form disclosed. Modifications and variations are possible in light of the above teachings or may be acquired from practicing the present disclosure, without departing from the breadth or scope.

Moreover, for example, the present technology/system may achieve the following configurations:

1. An overlay system, comprising:
   a storage element configured to store an executable graph-based model that comprises:
   a plurality of history message nodes;
   a plurality of history overlay nodes; and
   a plurality of active nodes, where each active node is associated with
   (i) a set of history message nodes, of the plurality of history message nodes, that represents a set of historical messages linked with a set of historical versions of the corresponding active node, and
   (ii) a set of history overlay nodes, of the plurality of history overlay nodes, that is configured to facilitate creation and maintenance of the set of history message nodes; and
   processing circuitry that is coupled to the storage element, and configured to:
   receive a first stimulus associated with the overlay system;
   identify, based on a first context of the first stimulus,
   (i) a first active node from the plurality of active nodes and (ii) one or more history message nodes from a first set of history message nodes associated with the first active node;
   create, in the executable graph-based model, one or more history nodes based on one or more historical messages represented by the one or more history message nodes, respectively, wherein each of the one or more history nodes corresponds to a historical version of the first active node; and
   execute an operation associated with the first stimulus based on (i) the first active node, (ii) a first set of history overlay nodes, of the plurality of history overlay nodes, associated with the first active node, and (iii) the created one or more history nodes.

2. The overlay system of 1,
   wherein the executable graph-based model further comprises a plurality of history edge nodes,
   wherein a history edge node, of the plurality of history edge nodes, couples a history message node to an active node, and is indicative of an association therebetween, and
   wherein the processing circuitry is further configured to traverse one or more history edge nodes, associated with the first active node, to identify the one or more history message nodes that are required for the creation of the one or more history nodes, respectively.

3. The overlay system of 2, wherein each history edge node, of the one or more history edge nodes, has at least a message role node and a first role node associated therewith, and wherein the message role node defines a relationship between the corresponding history edge node and a history message node coupled thereto, whereas the first role node defines a relationship between the corresponding history edge node and the first active node coupled thereto.

4. The overlay system of 2, wherein prior to the execution of the operation associated with the first stimulus, the processing circuitry is further configured to load, in the executable graph-based model, at least one of a group consisting of (i) the first active node, (ii) the one or more history message nodes, (iii) the one or more history edge nodes, and (iv) the first set of history overlay nodes, with corresponding data and processing logic.

5. The overlay system of 1,
   wherein a first set of history nodes is associated with the first active node, with the first set of history nodes comprising the created one or more history nodes,
   wherein a first historical message represented by a first history message node of the first set of history message nodes includes data and transactional information required for the creation of a first history node of the first set of history nodes,
   wherein a historical message represented by each remaining history message node of the first set of history message nodes includes data and transactional information that indicates a mutation to a corresponding version of the first active node that resulted in the creation of a corresponding history node of the first set of history nodes, and
   wherein the creation of each history node of the first set of history nodes, after the first history node, requires creation of one or more preceding history nodes by utilizing associated history message nodes of the first set of history message nodes.

6. The overlay system of claim 1, wherein the processing circuitry is further configured to delete the one or more history nodes from the overlay system based on a lapse of a predetermined time period after the execution of the operation associated with the first stimulus.

7. The overlay system of 1,
   wherein to execute the operation associated with the first stimulus, the processing circuitry is further configured to (i) create, based on the first set of history overlay nodes being associated with the first active node, a cloned first active node that corresponds to a clone of a current version of the first active node, and (ii) transfer the first set of history overlay nodes to the cloned first active node, where the transfer of the first set of history overlay nodes to the cloned first active node results in conversion of the current version of the first active node into a history node, and
   wherein the execution of the operation associated with the first stimulus corresponds to a mutation of the cloned first active node based on the one or more history nodes created for the processing of the first stimulus.

8. The overlay system of 7, wherein each of the first active node and the cloned first active node corresponds to a data node, and wherein the mutation of the cloned first active node corresponds to modification of data associated with the data node.

9. The overlay system of 7,
   wherein the first active node corresponds to a templatized node that comprises a first node template, and each of the first set of history overlay nodes corresponds to an overlay of the first node template, wherein the executable graph-based model further comprises a plurality of active message nodes associated with the plurality of active nodes such that a first active message node is associated with the first active node, where the first active message node represents a first active message that is linked with the current version of the first active node, wherein the processing circuitry is further configured to (i) create, in the executable graph-based model, based on the first active message node and the first set of history message nodes, at least a first node instance linked with the first node template, such that the first node template and the first node instance constitute the first active node, wherein the first node template corresponds to a predefined node structure, whereas the first node instance corresponds to an implementation of the first node template, wherein the cloned first active node comprises (i) the first node template and (ii) a cloned first node instance that corresponds to a clone of a current version of the first node instance, and wherein the mutation of the cloned first active node corresponds to a modification of the cloned first node instance.

10. The overlay system of 9, wherein each of the one or more history nodes corresponds to a templatized node that comprises the first node template and a history node instance.

11. The overlay system of 9, wherein each of the plurality of active message nodes corresponds to an event-type message node.

12. The overlay system of 7, wherein the first active node corresponds to a templatized node that comprises a first node template, and each of the first set of history overlay nodes corresponds to an overlay of the first node template, wherein the first node template corresponds to a predefined node structure, wherein the cloned first active node comprises a cloned first node template that corresponds to a clone of a current version of the first node template, and wherein the mutation of the cloned first active node corresponds to a modification of the cloned first node template.

13. The overlay system of 1, wherein each of the plurality of history message nodes corresponds to an event-type message node.

14. The overlay system of 1, wherein based on a set of stimuli that is received prior to the first stimulus, the processing circuitry is further configured to create the first set of history message nodes and a first set of history nodes associated with the first active node, and wherein each history node of the first set of history nodes is a version of the first active node at an instance when the corresponding stimulus is received.

15. The overlay system of 14, wherein each stimulus of the set of stimuli corresponds to a command-type message.

16. The overlay system of 14, wherein the processing circuitry is further configured to:

receive a second stimulus prior to the set of stimuli; and create, based on the second stimulus, a first active version of the first active node, with the first set of history overlay nodes associated therewith, wherein a first history edge node and a first active message node are created in the executable graph-based model based on the creation of the first active version of the first active node, wherein the first active message node represents a first active message that includes data and transactional information required for the creation of the first active version of the first active node, and wherein the first history edge node couples the first active message node to the first active version of the first active node.

17. The overlay system of 16, wherein the executable graph-based model further comprises (i) a message handler overlay node associated with the first active version of the first active node, and (ii) a message publisher overlay node associated with the message handler overlay node, wherein the first active version of the first active node corresponds to a templatized node that comprises a first node template, and each of the first set of history overlay nodes corresponds to an overlay of the first node template, wherein the message handler overlay node is configured to subscribe to and process the second stimulus, where the processing of the second stimulus results in creation of at least a first node instance linked with the first node template, such that the first node template and the first node instance constitute the first active version of the first active node, wherein the first node template corresponds to a predefined node structure, whereas the first node instance corresponds to an implementation of the first node template, wherein a first history overlay node of the first set of history overlay nodes is associated with the message publisher overlay node, wherein the message publisher overlay node is configured to generate the first active message based on the processing of the second stimulus, and communicate an indication to the first history overlay node for creation of the first history edge node and the first active message node in the executable graph-based model, and wherein the first history overlay node, based on the indication received from the message publisher overlay node, is configured to create the first history edge node and the first active message node in the executable graph-based model.

18. The overlay system of 17, wherein the processing circuitry is further configured to delete the first node instance from the overlay system based on a lapse of a predetermined time period after the execution of the operation associated with the second stimulus.

19. The overlay system of 16, wherein the processing circuitry is further configured to (i) receive a third stimulus, of the set of stimuli, (ii) create a clone of the first active version of the first active node based on the third stimulus, and (iii) transfer the first set of history overlay nodes to the clone of the first active version of the first active node, wherein the transfer of the first set of history overlay nodes to the clone of the first active version of the first active node results in conversion of the first active version of the first active node into a first history node, and consequently, in conversion of the first active message node into a first history message node, wherein the processing circuitry is further configured to execute an operation associated with the third stimulus on the clone of the first active version of the first active node, thereby resulting in a second active version of the first active node, wherein the execution of the operation associated with the third stimulus corresponds to a mutation of the clone of the first active version of the first active node, wherein a second history edge node and a second active message node are created in the executable graph-based model, based on the creation of the second active version of the first active node, wherein the second active message node represents a second active message that includes data and transactional information that indicates the mutation that resulted in creation of the second active version of the first active node, and the second history edge node couples the second active message node to the second active version of the first active node, and wherein the second history edge node is further coupled to the first history edge node.

20. The overlay system of 19, wherein the first active version of the first active node corresponds to a templatized node that comprises a first node template, and each of the first set of history overlay nodes corresponds to an overlay of the first node template, wherein upon the receipt of the third stimulus, the processing circuitry is configured to create at least a first node instance linked to the first node template based on the first active message, such that the first node template and the first node instance constitute the first active version of the first active node, wherein the first node template corresponds to a predefined node structure, whereas the first node instance corresponds to an implementation of the first node template, wherein the clone of the first active version of the first active node corresponds to the first node template and a clone of the first node instance, and wherein the mutation of the clone of the first active version of the first active node corresponds to a modification of the clone of the first node instance.

21. The overlay system of 19, wherein the executable graph-based model further comprises (i) a message handler overlay node associated with the first active version of the first active node, and (ii) a message publisher overlay node associated with the message handler overlay node, wherein the message handler overlay node is configured to subscribe to and process the third stimulus, where the processing of the third stimulus results in creation of the second active version of the first active node, wherein a first history overlay node of the first set of history overlay nodes is associated with the message publisher overlay node, and wherein the message publisher overlay node is configured to generate the second active message based on the processing of the third stimulus, and communicate an indication to the first history overlay node for creation of the second history edge node and the second active message node in the executable graph-based model, and wherein the first history overlay node, based on the indication received from the message publisher overlay node, is configured to create the second history edge node and the second active message node in the executable graph-based model.

22. The overlay system of 19, wherein the processing circuitry is further configured to delete the first history node from the overlay system based on a lapse of a predetermined time period after the execution of the operation associated with the third stimulus.

23. The overlay system of 19, wherein the second active version of the first active node corresponds to a version of the first active node utilized for executing the operation associated with the first stimulus.

24. The overlay system of 19, wherein the processing circuitry is further configured to (i) receive a fourth stimulus of the set of stimuli, (ii) create a clone of the second active version of the first active node based on the fourth stimulus, and (iii) transfer the first set of history overlay nodes to the clone of the second active version of the first active node, thereby converting the second active version of the first active node into a second history node, and consequently, the second active message node into a second history message node, wherein the processing circuitry is further configured to execute an operation associated with the fourth stimulus on the clone of the second active version of the first active node, thereby resulting in a third active version of the first active node, where the execution of the operation associated with the fourth stimulus corresponds to a mutation of the clone of the second active version of the first active node, wherein a third history edge node and a third active message node are created in the executable graph-based model, based on the creation of the third active version of the first active node, where the third active message node represents a third active message that includes data and transactional information that indicates the mutation that resulted in creation of the third active version of the first active node, and the third history edge node couples the third active message node to the third active version of the first active node, and wherein the third history edge node is further coupled to the second history edge node.

25. The overlay system of 24, wherein the first history edge node and the second history edge node are coupled to each other by way of two or more role nodes, with each role node defining a relationship therebetween, and wherein the second history edge node and the third history edge node are coupled to each other by way of two or more role nodes, with each role node defining a relationship therebetween.

26. The overlay system of 24, wherein the processing circuitry is further configured to delete the second history node from the overlay system based on a lapse of a predetermined time period after the execution of the operation associated with the fourth stimulus.

27. The overlay system of 24, wherein the third active version of the first active node corresponds to a version of the first active node utilized for executing the operation associated with the first stimulus.

28. The overlay system of 1,
   wherein a first set of history nodes is associated with the first active node, with the first set of history nodes comprising the created one or more history nodes,
   wherein prior to the creation of the one or more history nodes, at least one other history node is present in the executable graph-based model, and
   wherein the creation of the one or more history nodes is further based on the history node present in the executable graph-based model prior to the processing of the first stimulus.

29. The overlay system of 1, wherein the first stimulus corresponds to one of a group consisting of a command-type message and a query-type message.

30. A method, comprising:
   receiving, by processing circuitry of an overlay system, a first stimulus associated with the overlay system, wherein an executable graph-based model stored in a storage element of the overlay system, comprises:
   a plurality of history message nodes;
   a plurality of history overlay nodes; and
   a plurality of active nodes, where each active node is associated with
      (i) a set of history message nodes, of the plurality of history message nodes, that represents a set of historical messages linked with a set of historical versions of the corresponding active node, and
      (ii) a set of history overlay nodes, of the plurality of history overlay nodes, where creation and maintenance of the set of history message nodes is facilitated by the set of history overlay nodes;
   identifying, by the processing circuitry, based on a first context of the first stimulus, (i) a first active node from the plurality of active nodes and (ii) one or more history message nodes from a first set of history message nodes associated with the first active node;
   creating, by the processing circuitry, in the executable graph-based model, one or more history nodes based on one or more historical messages represented by the one or more history message nodes, respectively, wherein each of the one or more history nodes corresponds to a historical version of the first active node; and
   executing, by the processing circuitry, an operation associated with the first stimulus based on (i) the first active node, (ii) a first set of history overlay nodes of the plurality of history overlay nodes associated with the first active node, and (iii) the created one or more history nodes.

What is claimed is:

1. An overlay system, comprising:
   a storage element configured to store an executable graph-based model that comprises:
   a plurality of history message nodes;
   a plurality of history overlay nodes; and
   a plurality of active nodes, where each active node is associated with
   (i) a set of history message nodes, of the plurality of history message nodes, that represents a set of historical messages linked with a set of historical versions of the corresponding active node, and
   (ii) a set of history overlay nodes, of the plurality of history overlay nodes, that is configured to facilitate creation and maintenance of the set of history message nodes; and processing circuitry that is coupled to the storage element, and configured to:
   receive a first stimulus associated with the overlay system;
   identify, based on a first context of the first stimulus, (i) a first active node from the plurality of active nodes and (ii) one or more history message nodes from a first set of history message nodes associated with the first active node;
   create, in the executable graph-based model, one or more history nodes based on one or more historical messages represented by the one or more history message nodes, respectively, wherein each of the one or more history nodes corresponds to a historical version of the first active node; and
   execute an operation associated with the first stimulus based on (i) the first active node, (ii) a first set of history overlay nodes, of the plurality of history overlay nodes, associated with the first active node, and (iii) the created one or more history nodes.

2. The overlay system of claim 1,
   wherein the executable graph-based model further comprises a plurality of history edge nodes,
   wherein a history edge node, of the plurality of history edge nodes, couples a history message node to an active node, and is indicative of an association therebetween,
   wherein the processing circuitry is further configured to traverse one or more history edge nodes, associated with the first active node, to identify the one or more history message nodes that are required for the creation of the one or more history nodes, respectively, and
   wherein each history edge node, of the one or more history edge nodes, has at least (i) a message role node that defines a relationship between the corresponding history edge node and a history message node coupled thereto, and (ii) a first role node that defines a relationship between the corresponding history edge node and the first active node coupled thereto.

3. The overlay system of claim 1,
   wherein a first set of history nodes is associated with the first active node, with the first set of history nodes comprising the created one or more history nodes,
   wherein a first historical message represented by a first history message node of the first set of history message nodes includes data and transactional information required for the creation of a first history node of the first set of history nodes,
   wherein a historical message represented by each remaining history message node of the first set of history message nodes includes data and transactional information that indicates a mutation to a corresponding version of the first active node that resulted in the creation of a corresponding history node of the first set of history nodes, and
   wherein the creation of each history node of the first set of history nodes, after the first history node, requires creation of one or more preceding history nodes by utilizing associated history message nodes of the first set of history message nodes.

4. The overlay system of claim 1, wherein the processing circuitry is further configured to delete the one or more history nodes from the overlay system based on a lapse of a predetermined time period after the execution of the operation associated with the first stimulus.

5. The overlay system of claim 1,
   wherein to execute the operation associated with the first stimulus, the processing circuitry is further configured to (i) create, based on the first set of history overlay nodes being associated with the first active node, a cloned first active node that corresponds to a clone of a current version of the first active node, and (ii) transfer the first set of history overlay nodes to the cloned first active node, where the transfer of the first set of history overlay nodes to the cloned first active node results in conversion of the current version of the first active node into a history node, and wherein the execution of the operation associated with the first stimulus corresponds to a mutation of the cloned first active node based on the one or more history nodes created for the processing of the first stimulus.

6. The overlay system of claim 5, wherein the first active node corresponds to a templatized node that comprises a first node template, and each of the first set of history overlay nodes corresponds to an overlay of the first node template, wherein each of the one or more history nodes corresponds to a templatized node that comprises the first node template and a history node instance, wherein the executable graph-based model further comprises a plurality of active message nodes associated with the plurality of active nodes such that a first active message node is associated with the first active node, where the first active message node represents a first active message that is linked with the current version of the first active node, wherein the processing circuitry is further configured to (i) create, in the executable graph-based model, based on the first active message node and the first set of history message nodes, at least a first node instance linked with the first node template, such that the first node template and the first node instance constitute the first active node, wherein the first node template corresponds to a predefined node structure, whereas the first node instance corresponds to an implementation of the first node template, wherein the cloned first active node comprises (i) the first node template and (ii) a cloned first node instance that corresponds to a clone of a current version of the first node instance, and wherein the mutation of the cloned first active node corresponds to a modification of the cloned first node instance.

7. The overlay system of claim 5, wherein the first active node corresponds to a templatized node that comprises a first node template, and each of the first set of history overlay nodes corresponds to an overlay of the first node template, wherein the first node template corresponds to a predefined node structure, wherein the cloned first active node comprises a cloned first node template that corresponds to a clone of a current version of the first node template, and wherein the mutation of the cloned first active node corresponds to a modification of the cloned first node template.

8. The overlay system of claim 1, wherein based on a set of stimuli that is received prior to the first stimulus, the processing circuitry is further configured to create the first set of history message nodes and a first set of history nodes associated with the first active node, and wherein each history node of the first set of history nodes is a version of the first active node at an instance when the corresponding stimulus is received.

9. The overlay system of claim 8, wherein the processing circuitry is further configured to:

receive a second stimulus prior to the set of stimuli; and create, based on the second stimulus, a first active version of the first active node, with the first set of history overlay nodes associated therewith, wherein a first history edge node and a first active message node are created in the executable graph-based model based on the creation of the first active version of the first active node, wherein the first active message node represents a first active message that includes data and transactional information required for the creation of the first active version of the first active node, and wherein the first history edge node couples the first active message node to the first active version of the first active node.

10. The overlay system of claim 9, wherein the executable graph-based model further comprises (i) a message handler overlay node associated with the first active version of the first active node, and (ii) a message publisher overlay node associated with the message handler overlay node, wherein the first active version of the first active node corresponds to a templatized node that comprises a first node template, and each of the first set of history overlay nodes corresponds to an overlay of the first node template, wherein the message handler overlay node is configured to subscribe to and process the second stimulus, where the processing of the second stimulus results in creation of at least a first node instance linked with the first node template, such that the first node template and the first node instance constitute the first active version of the first active node, wherein the first node template corresponds to a predefined node structure, whereas the first node instance corresponds to an implementation of the first node template, wherein a first history overlay node of the first set of history overlay nodes is associated with the message publisher overlay node, wherein the message publisher overlay node is configured to generate the first active message based on the processing of the second stimulus, and communicate an indication to the first history overlay node for creation of the first history edge node and the first active message node in the executable graph-based model, and wherein the first history overlay node, based on the indication received from the message publisher overlay node, is configured to create the first history edge node and the first active message node in the executable graph-based model.

11. The overlay system of claim 10, wherein the processing circuitry is further configured to delete the first node instance from the overlay system based on a lapse of a predetermined time period after the execution of the operation associated with the second stimulus.

12. The overlay system of claim 9, wherein the processing circuitry is further configured to (i) receive a third stimulus, of the set of stimuli, (ii) create a clone of the first active version of the first active node based on the third stimulus, and (iii) transfer the first set of history overlay nodes to the clone of the first active version of the first active node, where the transfer of the first set of history overlay nodes to the clone of the first active version of the first active node results in conversion of the first active version of the first active node into a first history node, and consequently, in conversion of the first active message node into a first history message node, wherein the processing circuitry is further configured to execute an operation associated with the third stimulus on the clone of the first active version of the first active node, thereby resulting in a second active version of the first active node, where the execution of the operation associated with the third stimulus corresponds to a mutation of the clone of the first active version of the first active node, wherein a second history edge node and a second active message node are created in the executable graph-based model, based on the creation of the second active version of the first active node, where the second active message node represents a second active message that includes data and transactional information that indicates the mutation that resulted in creation of the second active version of the first active node, and the second history edge node couples the second active message node to the second active version of the first active node, and wherein the second history edge node is further coupled to the first history edge node.

13. The overlay system of claim 12, wherein the first active version of the first active node corresponds to a templatized node that comprises a first node template, and each of the first set of history overlay nodes corresponds to an overlay of the first node template, wherein upon the receipt of the third stimulus, the processing circuitry is configured to create at least a first node instance linked to the first node template based on the first active message node, such that the first node template and the first node instance constitute the first active version of the first active node, wherein the first node template corresponds to a predefined node structure, whereas the first node instance corresponds to an implementation of the first node template, wherein the clone of the first active version of the first active node corresponds to the first node template and a clone of the first node instance, and wherein the mutation of the clone of the first active version of the first active node corresponds to a modification of the clone of the first node instance.

14. The overlay system of claim 12, wherein the executable graph-based model further comprises (i) a message handler overlay node associated with the first active version of the first active node, and (ii) a message publisher overlay node associated with the message handler overlay node, wherein the message handler overlay node is configured to subscribe to and process the third stimulus, where the processing of the third stimulus results in creation of the second active version of the first active node, wherein a first history overlay node of the first set of history overlay nodes is associated with the message publisher overlay node, wherein the message publisher overlay node is configured to generate the second active message based on the processing of the third stimulus and communicate an indication to the first history overlay node for creation of the second history edge node and the second active message node in the executable graph-based model, and wherein the first history overlay node, based on the indication received from the message publisher overlay node, is configured to create the second history edge node and the second active message node in the executable graph-based model.

15. The overlay system of claim 12, wherein the processing circuitry is further configured to delete the first history node from the overlay system based on a lapse of a predetermined time period after the execution of the operation associated with the third stimulus.

16. The overlay system of claim 12, wherein the second active version of the first active node corresponds to the version of the first active node utilized for executing the operation associated with the first stimulus.

17. The overlay system of claim 12, wherein the processing circuitry is further configured to (i) receive a fourth stimulus of the set of stimuli, (ii) create a clone of the second active version of the first active node based on the fourth stimulus, and (iii) transfer the first set of history overlay nodes to the clone of the second active version of the first active node, thereby converting the second active version of the first active node into a second history node, and consequently, the second active message node into a second history message node, wherein the processing circuitry is further configured to execute an operation associated with the fourth stimulus on the clone of the second active version of the first active node, thereby resulting in a third active version of the first active node, where the execution of the operation associated with the fourth stimulus corresponds to a mutation of the clone of the second active version of the first active node, wherein a third history edge node and a third active message node are created in the executable graph-based model, based on the creation of the third active version of the first active node, where the third active message node represents a third active message that includes data and transactional information that indicates the mutation that resulted in creation of the third active version of the first active node, and the third history edge node couples the third active message node to the third active version of the first active node, and wherein the third history edge node is further coupled to the second history edge node.

18. The overlay system of claim 17, wherein the first history edge node and the second history edge node are coupled to each other by way of two or more role nodes, with each role node defining a relationship therebetween, and wherein the second history edge node and the third history edge node are coupled to each other by way of two or more role nodes, with each role node defining a relationship therebetween.

19. The overlay system of claim 1, wherein a first set of history nodes is associated with the first active node, with the first set of history nodes comprising the created one or more history nodes, wherein prior to the creation of the one or more history nodes, at least one other history node is present in the executable graph-based model, and wherein the creation of the one or more history nodes is further based on the history node present in the executable graph-based model prior to the processing of the first stimulus.

20. A method, comprising:

receiving, by processing circuitry of an overlay system, a first stimulus associated with the overlay system, wherein an executable graph-based model, stored in a storage element of the overlay system, comprises:

a plurality of history message nodes;

a plurality of history overlay nodes; and a plurality of active nodes, where each active node is associated with (i) a set of history message nodes, of the plurality of history message nodes, that represents a set of historical messages linked with a set of historical versions of the corresponding active node, and (ii) a set of history overlay nodes, of the plurality of history overlay nodes, where creation and maintenance of the set of history message nodes is facilitated by the set of history overlay nodes;

identifying, by the processing circuitry, based on a first context of the first stimulus, (i) a first active node from the plurality of active nodes and (ii) one or more history message nodes from a first set of history message nodes associated with the first active node;

creating, by the processing circuitry, in the executable graph-based model, one or more history nodes based on one or more historical messages represented by the one or more history message nodes, respectively, wherein each of the one or more history nodes corresponds to a historical version of the first active node; and executing, by the processing circuitry, an operation associated with the first stimulus based on (i) the first active node, (ii) a first set of history overlay nodes of the plurality of history overlay nodes associated with the first active node, and (iii) the created one or more history nodes.

*  *  *  *  *